(12) United States Patent
Cozzo et al.

(10) Patent No.: US 11,902,027 B2
(45) Date of Patent: Feb. 13, 2024

(54) MECHANISMS AND CONDITIONS FOR SUPPORTING REPETITIONS FOR A PUCCH TRANSMISSION

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 17/304,644

(22) Filed: Jun. 23, 2021

(65) Prior Publication Data

US 2022/0006575 A1   Jan. 6, 2022

Related U.S. Application Data

(60) Provisional application No. 63/094,638, filed on Oct. 21, 2020, provisional application No. 63/091,555, (Continued)

(51) Int. Cl.
*H04L 1/18* (2023.01)
*H04W 72/12* (2023.01)
(Continued)

(52) U.S. Cl.
CPC .......... *H04L 1/1819* (2013.01); *H04L 1/1896* (2013.01); *H04W 72/046* (2013.01);
(Continued)

(58) Field of Classification Search
None
See application file for complete search history.

(56) References Cited

U.S. PATENT DOCUMENTS 11,553,482 B2 * 1/2023 Fakoorian ............ H04L 5/0053
2015/0131579 A1   5/2015 Li et al.
(Continued)

FOREIGN PATENT DOCUMENTS

EP     3684123 A1    7/2020
WO   2019050381 A1   3/2019
(Continued)

OTHER PUBLICATIONS

International Search Report and Written Opinion of the International Searching Authority dated Oct. 1, 2021, in connection with International Application No. PCT/KR2021/008222, 10 pages.
(Continued)

*Primary Examiner* — Steve R Young

(57) ABSTRACT

Methods and apparatuses for physical uplink control channel (PUCCH) transmissions with repetitions. A method for operating a user equipment includes receiving first information indicating a configuration for directions of symbols and receiving second information indicating whether a repetition of a transmission is counted when the repetition of the transmission is canceled. The method further includes determining that a first repetition of the transmission includes a symbol with downlink direction based on the first information determining a counter number of repetitions based on the second information, and canceling the first repetition of the transmission.

20 Claims, 43 Drawing Sheets

Related U.S. Application Data filed on Oct. 14, 2020, provisional application No. 63/084,316, filed on Sep. 28, 2020, provisional application No. 63/060,969, filed on Aug. 4, 2020, provisional application No. 63/057,630, filed on Jul. 28, 2020, provisional application No. 63/046,854, filed on Jul. 1, 2020.

(51) Int. Cl.
| | | |
|---|---|---|
| *H04W 72/04* | (2023.01) | |
| *H04W 74/08* | (2009.01) | |
| *H04L 1/1812* | (2023.01) | |
| *H04L 1/1867* | (2023.01) | |
| *H04W 72/1268* | (2023.01) | |
| *H04W 72/044* | (2023.01) | |
| *H04W 72/21* | (2023.01) | |
| *H04W 72/23* | (2023.01) | |
| *H04W 72/54* | (2023.01) | |

(52) U.S. Cl.
CPC ....... *H04W 72/1268* (2013.01); *H04W 72/21* (2023.01); *H04W 72/23* (2023.01); *H04W 72/54* (2023.01); *H04W 74/0833* (2013.01)

(56) References Cited

U.S. PATENT DOCUMENTS

| | | |
|---|---|---|
| 2019/0045552 A1 | 2/2019 | Blankenship et al. |
| 2019/0223205 A1* | 7/2019 | Papasakellariou .... H04L 5/0044 |
| 2020/0214006 A1* | 7/2020 | Choi ................. H04W 74/0833 |
| 2021/0068140 A1* | 3/2021 | Yang ..................... H04L 5/0091 |
| 2021/0120559 A1* | 4/2021 | Li ...................... H04W 72/0446 |
| 2021/0136791 A1* | 5/2021 | Akkarakaran ........ H04L 5/0053 |
| 2021/0368508 A1* | 11/2021 | Chen ..................... H04L 5/0053 |

FOREIGN PATENT DOCUMENTS

| | | |
|---|---|---|
| WO | 2019093841 A1 | 5/2019 |
| WO | 2019135597 A1 | 7/2019 |

OTHER PUBLICATIONS

CMCC, "Discussion on PUCCH repetition," R1-1804100, 3GPP TSG RAN WG1 Meeting #92bis, Sanya, China, Apr. 16-20, 2018, 2 pages.

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and ahannel coding (Release 16)", 3GPP TS 38/12 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"5G; NR; Medium Access Control (MAC) protocol specification (3GPP TS 38321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

Extended European Search Report dated Nov. 6, 2023 regarding Application No. 21834208.7, 15 pages.

Samsung, "PUCCH coverage enhancement", 3GPP TSG RAN WG1 #103-e, R1-2008182, Oct. 2020, 9 pages.

AT&T, "On long PUCCH over multiple slots", 3GPP TSG RAN WG1 #90bis, R1-1718399, Aug. 2017, 4 pages.

Intel Corporation, "Short PUCCH for UCI of more than 2 bits", 3GPP TSG RAN WG1 Meeting 90bis, R1-1717383, Oct. 2017, 4 pages.

Samsung, "PUCCH Repetitions in NR Rel-15", 3GPP TSG RAN WG1 #96, R1-1902236, Feb. 2019, 2 pages.

Qualcomm Incorporated, "Remaining issues for overlapping UL transmissions", 3GPP TSG RAN WG1 Meeting #93, R1- 1807359, May 2018, 12 pages.

Samsung, "Update on Summary of Collision Handling Aspects for LC/CE UEs", 3GPP TSG RAN WG1 #84, R1-161377, Feb. 2016, 13 pages.

\* cited by examiner

```
PUCCH-FormatConfig ::=            SEQUENCE {
    interslotFrequencyHopping         ENUMERATED {enabled}            OPTIONAL,   -- Need R
    additionalDMRS                    ENUMERATED {true}               OPTIONAL,   -- Need R
    maxCodeRate                       PUCCH-MaxCodeRate               OPTIONAL,   -- Need R
    nrofSlots                         ENUMERATED {n2,n4,n8}           OPTIONAL,   -- Need S
    nrofSlots-rep-typeB               ENUMERATED {m2,m4,m8}           OPTIONAL,   -- Need S
    nrofSymbols-rep-typeB             ENUMERATED {s2,s4,s8}           OPTIONAL,   -- Need S
    pi2PBSK                           ENUMERATED {enabled}            OPTIONAL,   -- Need R
    simultaneousHARQ-ACK-CSI          ENUMERATED {true}               OPTIONAL    -- Need R
}
```

3101

```
PUCCH-FormatConfig ::=            SEQUENCE {
    interslotFrequencyHopping         ENUMERATED {enabled}            OPTIONAL,   -- Need R
    additionalDMRS                    ENUMERATED {true}               OPTIONAL,   -- Need R
    maxCodeRate                       PUCCH-MaxCodeRate               OPTIONAL,   -- Need R
    nrofSlots                         ENUMERATED {n2,n4,n8}           OPTIONAL,   -- Need S
    nrofSlots-Symbols-rep-typeB       ENUMERATED {m2,s2,m4,s4,m8,s8}  OPTIONAL,   -- Need S
    pi2PBSK                           ENUMERATED {enabled}            OPTIONAL,   -- Need R
    simultaneousHARQ-ACK-CSI          ENUMERATED {true}               OPTIONAL    -- Need R
}
```

MECHANISMS AND CONDITIONS FOR SUPPORTING REPETITIONS FOR A PUCCH TRANSMISSION

CROSS-REFERENCE TO RELATED APPLICATION AND CLAIM OF PRIORITY

This application claims priority under 35 U.S.C. § 119(e) to: U.S. Provisional Patent Application No. 63/046,854 filed on Jul. 1, 2020; U.S. Provisional Patent Application No. 63/057,630 filed on Jul. 28, 2020; U.S. Provisional Patent Application No. 63/060,969 filed on Aug. 4, 2020; U.S. Provisional Patent Application No. 63/084,316 filed on Sep. 28, 2020; U.S. Provisional Patent Application No. 63/091,555 filed on Oct. 14, 2020; and U.S. Provisional Patent Application No. 63/094,638 filed on Oct. 21, 2020. The above-identified provisional patent applications are hereby incorporated by reference in their entirety.

TECHNICAL FIELD

The present disclosure relates generally to wireless communication systems and, more specifically, the present disclosure relates to physical uplink control channel (PUCCH) transmissions with repetitions.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to PUCCH transmissions with repetitions.

In one embodiment, a user equipment (UE) is provided. The UE includes a transceiver configured to receive first information indicating a configuration for directions of symbols and second information indicating whether a repetition of a transmission is counted when the repetition of the transmission is canceled. The UE includes a processor operably connected to a transceiver. The processor is configured to determine that a first repetition of the transmission includes a symbol with a downlink direction based on the first information and a counter number of repetitions based on the second information. The transceiver is further configured to cancel the first repetition of the transmission.

In another embodiment, a base station (BS) is provided. The BS includes a transceiver configured to transmit first information indicating a configuration for directions of symbols and second information indicating whether a repetition of a transmission is counted when the repetition of the transmission is canceled. The base station also includes a processor operably connected to a transceiver. The processor configured to determine that a first repetition of the transmission includes a symbol with a downlink direction based on the first information and a counter number of repetitions based on the second information. The transceiver is further configured to cancel a reception for the first repetition of the transmission.

In yet another embodiment, a method is provided. The method includes receiving first information indicating a configuration for directions of symbols and receiving second information indicating whether a repetition of a transmission is counted when the repetition of the transmission is canceled. The method further includes determining that a first repetition of the transmission includes a symbol with downlink direction based on the first information; determining a counter number of repetitions based on the second information; and canceling the first repetition of the transmission.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 31 illustrates example PUCCH configurations according to embodiments of the present disclosure;

DETAILED DESCRIPTION

Figure 1:
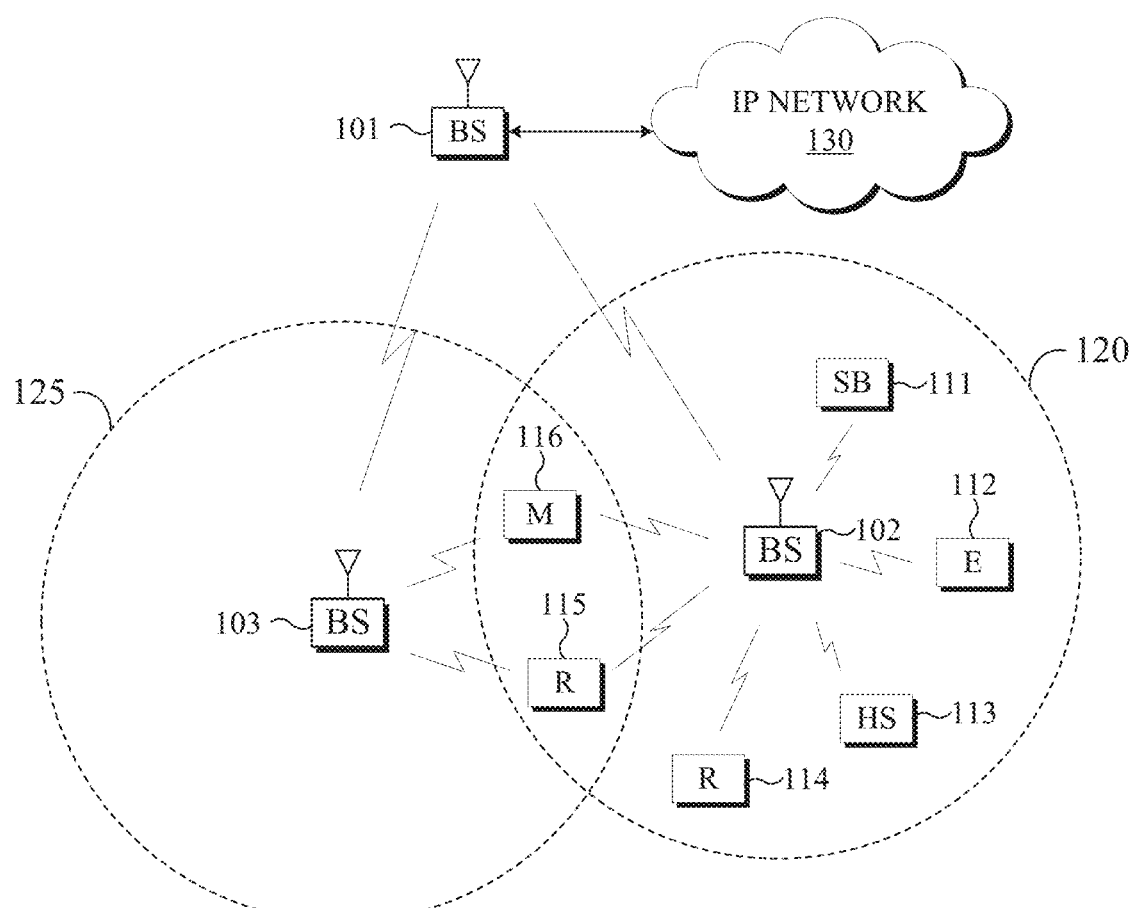
FIG. 1 illustrates an example wireless network according to embodiments of the present disclosure.

FIGS. 1 through 41, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein:

(i) 3GPP TS 38.211 v16.0.0, "NR; Physical channels and modulation;"
(ii) 3GPP TS 38.212 v16.0.0, "NR; Multiplexing and channel coding;"
(iii) 3GPP TS 38.213 v16.0.0, "NR; Physical layer procedures for control;"
(iv) 3GPP TS 38.214 v16.0.0, "NR; Physical layer procedures for data;"
(v) 3GPP TS 38.321 v15.8.0, "NR; Medium Access Control (MAC) Protocol Specification;" and
(vi) 3GPP TS 38.331 v15.8.0, "NR; Radio Resource Control (+) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
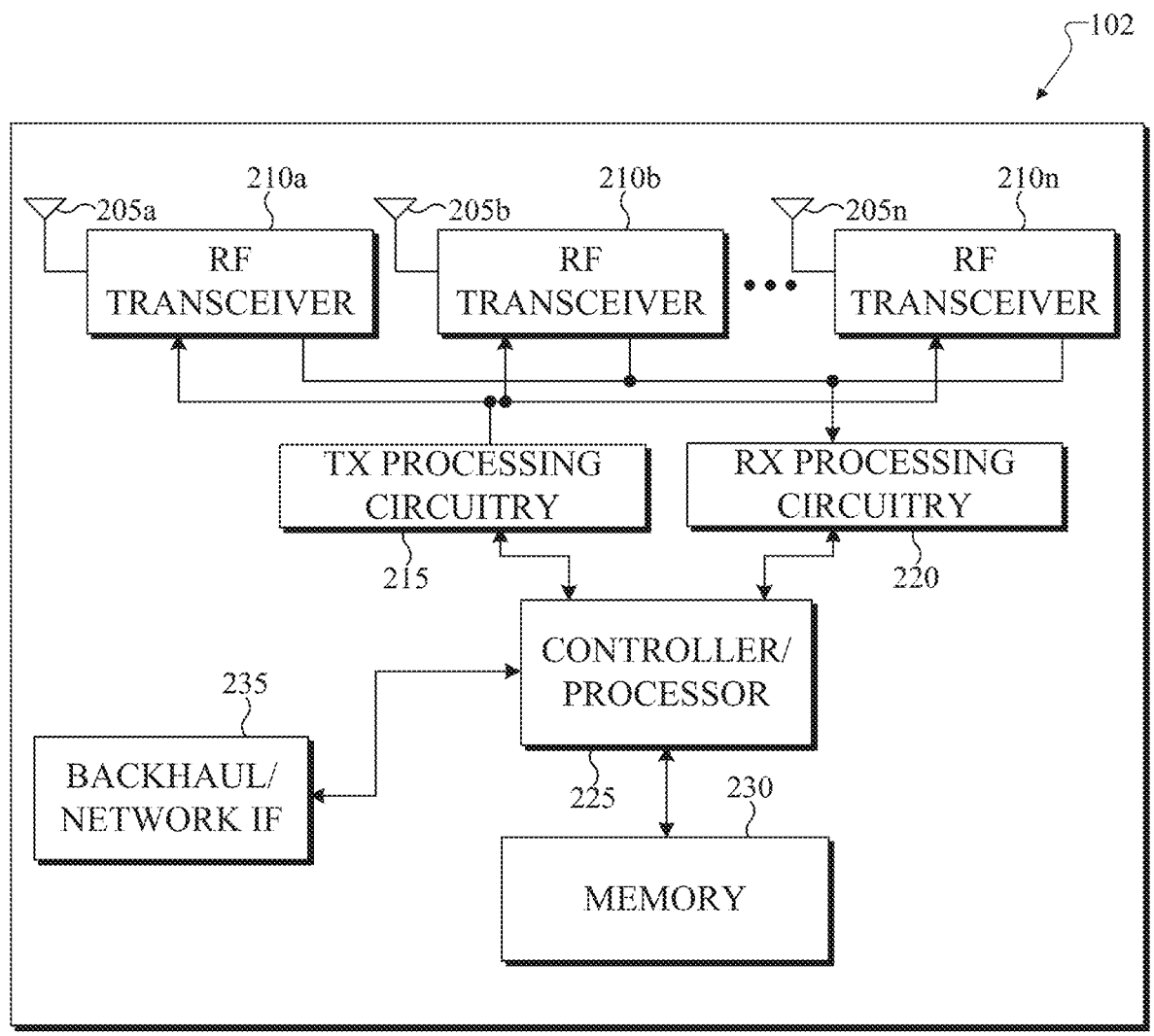
FIG. 2 illustrates an example base station (BS) according to embodiments of the present disclosure.
Figure 3:
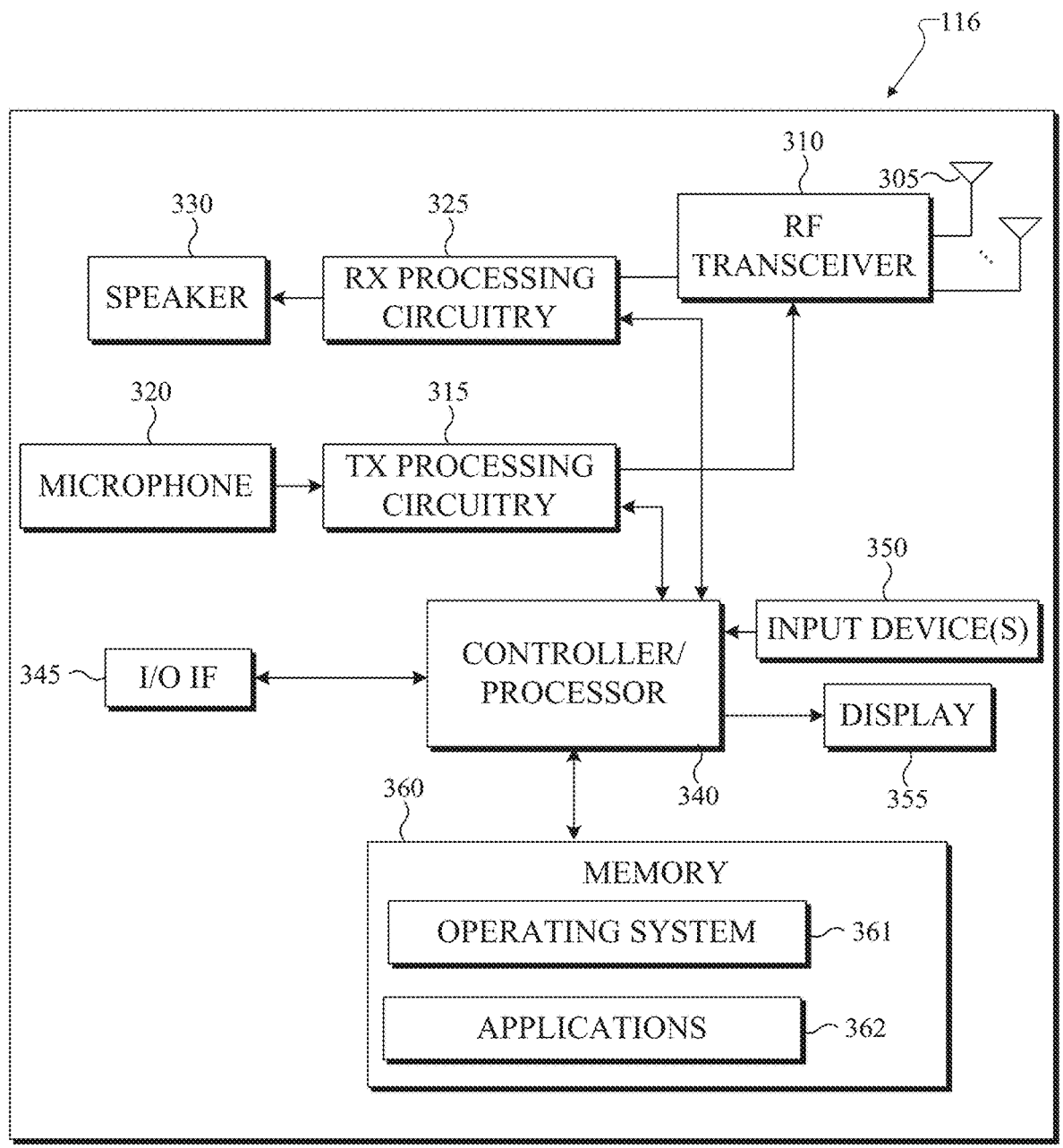
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for spatial setting determination for transmissions during initial access, transmitting physical uplink channel control (PUCCH) with repetitions, or both. In certain embodiments, and one or more of the BSs 101-103 includes circuitry, programing, or a combination thereof for spatial setting determination for transmissions during initial access, transmitting physical uplink channel control (PUCCH) with repetitions, or both.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support determining spatial setting for transmissions during initial access, transmitting PUCCH with repetitions, or both. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, for determining spatial setting for transmissions during initial access, transmitting PUCCH with repetitions, or both are stored in memory. The plurality of instructions are configured to cause the controller/processor 225 to perform a spatial setting determination for transmissions during initial access, transmitting PUCCH with repetitions, or both.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
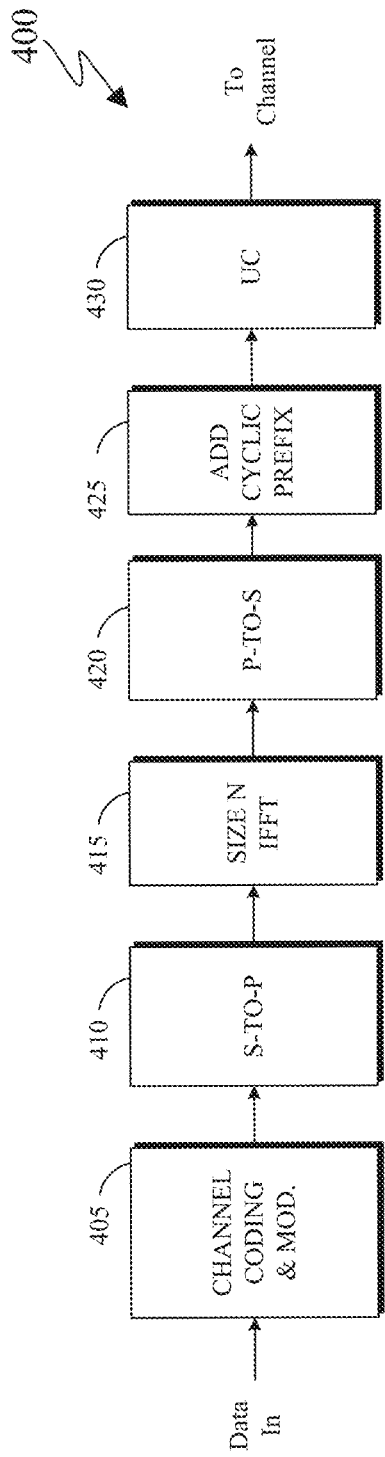
FIGS. 4 and 5 illustrate example wireless transmit and receive paths according to embodiments of the present disclosure.
Figure 5:
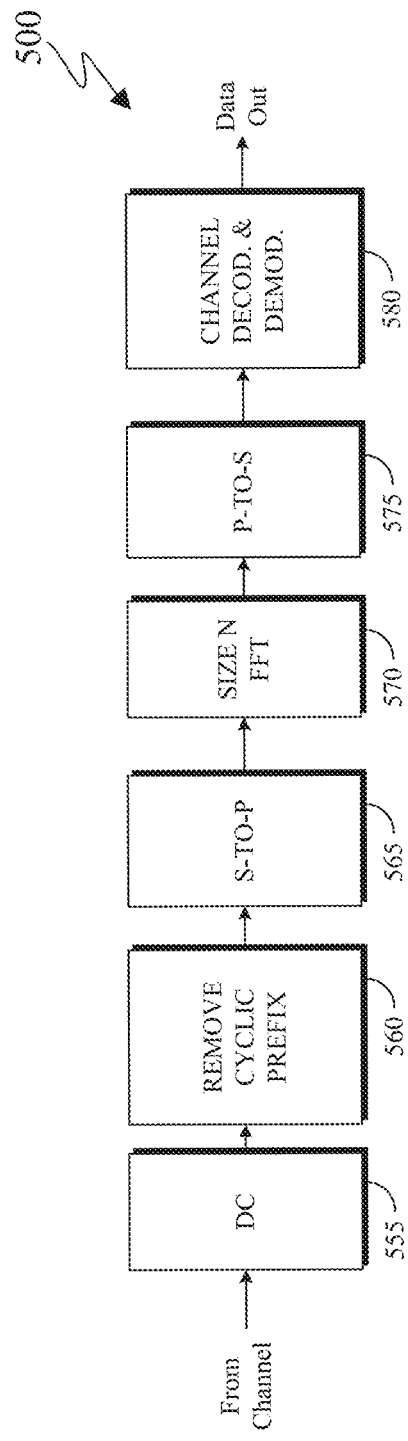

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support determining spatial setting for transmissions during initial access, transmitting PUCCH with repetitions, or both, as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure relate to determining spatial settings for transmission during initial access. Embodiments of the present disclosure also relate to determining a spatial setting for a physical random access channel (PRACH) transmission based on a corresponding PRACH preamble. Embodiments of the present disclosure further relate to determining and/or indicating a spatial setting for Msg3 transmission. Additionally, Embodiments of the present disclosure relate to determining and/or indicating a spatial setting for MsgA transmission. Embodiments of the present disclosure also relate to determining a spatial setting associated to a UE type. Embodiments of the present disclosure further relate to determining a partition of PRACH preambles associated to a UE type. Additionally, Embodiments of the present disclosure relate to determining spatial settings for repetitions of PRACH transmission and Msg3 physical uplink shared channel (PUSCH) transmission. Embodiments of the present disclosure also relate to determining a spatial setting from a CSI-RS configured in SIB and to including a CSI report in a Msg3 transmission.

A random access (RA) procedure can be initiated to fulfill several purposes. For example, an RA procedure can establish a radio resource control (RRC) connection (to go from RRC_IDLE to RRC_CONNECTED), re-establish RRC connection after radio link failure (RLF), on-demand system information (SI) request, uplink (UL) synchronization, scheduling request (SR), positioning, link recovery (also known as beam failure recovery (BFR)), and the like.

A physical random access procedure is triggered upon request of a PRACH transmission by higher layers at a UE or by a physical downlink control channel (PDCCH) order from a serving gNB.

RA can operate in two modes. A first mode is contention-based random access (CBRA) where UEs within a serving cell can share same RA resources and there is therefore a possibility of collision among RA attempts from different UEs, the second mode is a contention-free random access (CFRA) where a UE has dedicated RA resources that can be, for example, indicated by a serving gNB and may not be shared with other UEs so that RA collisions can be avoided.

Embodiments of the present disclosure take into consideration that a random access procedure, also known as a Type-1 L1 random access procedure includes four steps. The first step includes a UE (such as the UE 116) transmission of a PRACH preamble (Msg1). For example, prior to initiation of the physical random access procedure, Layer 1 of a UE receives from higher layers a set of synchronization signal physical broadcast channel (SS/PBCH) block indexes and provides to higher layers a corresponding set of reference signal received power (RSRP) measurements. Layer 1 receives the configuration of PRACH transmission parameters (PRACH preamble format, time resources, and frequency resources for PRACH transmission). In step-1, the UE transmits a PRACH using the selected PRACH format with a transmission power determined depending on whether the PRACH transmission is triggered upon request by higher layers or is in response to a detection of a PDCCH order from a serving gNB and depending on the action associated with the PDCCH order.

The second step includes a gNB transmission of Random Access Response (RAR) message with a PDCCH/physical downlink shared channel (PDSCH) (Msg2). For example, RAR (or Msg2) in step-2 is a PDCCH/PDSCH transmission that the UE receives on a downlink (DL) bandwidth path (BWP): the initial DL BWP of the PCell/SpCell for the case of initial access, i.e., (re-)establishing RRC connection, or the active DL BWP (with the same BWP-index as the active UL BWP) of an SpCell for other random access triggers except for initial access. If the active DL BWP index (of the SpCell) is not equal to active UL BWP index (of the serving cell), then switch the active DL BWP to one with the same BWP index. The sub-carrier spacing (SCS) for PDCCH in RAR message is the SCS for Type1-PDCCH CSS set. The PDCCH scheduling the PDSCH with the RAR provides a DCI format 1_0 and the UE monitors PDCCH candidates during a configured time window in a Type1-PDCCH common search space (CSS) set of the SpCell identified by the RA radio network temporary identifier (RNTI) or, for the case of BFR with CFRA, in the search space indicated by recoverySearchSpaceId of the SpCell identified by the C-RNTI. The sub-carrier spacing (SCS) for PDCCH in RAR message is the SCS for Type1-PDCCH CSS set. The SCS for any future PDSCH is also the same SCS as that of the PDSCH providing the RAR, unless the UE is configured an SCS.

In the third step, the UE transmission of a contention resolution message and when applicable, the transmission of a PUSCH scheduled by a RAR UL grant (Msg3). The fourth step includes a gNB transmission of a contention resolution message (Msg4). For the case of CFRA or SI request, a correct reception of Msg2/RAR is the last step for the random access procedure. For the case of CBRA, multiple UEs may have used the same PRACH preamble, and further steps are needed to resolve the contention. Furthermore, for the case of random access before a UE is in the RRC_CONNECTED state (i.e., for initial access), the UE and a serving gNB exchange further information to set up the connection and that information is provided by a PUSCH transmission (Msg3) for contention resolution request and possibly also for connection setup request, and a PDSCH transmission (Msg4) for contention resolution response and possibly for connection setup response. The contention resolution (and connection set up, if applicable) is considered successful if the UE receives Msg4 within a certain time window after transmission of Msg3 and, for the case that the UE does not have a C-RNTI yet, if the contention resolution ID in Msg4 matches the ID that the UE transmitted in Msg3. Otherwise, the RACH attempt is considered unsuccessful, and the UE needs to perform another RACH attempt unless a configured maximum number of RACH attempts have been already exhausted in which case the entire random access procedure is declared as unsuccessful.

Embodiments of the present disclosure take into consideration that instead of a 4-step RA procedure, a 2-step RA procedure can be used. A 2-step RA procedure can be used can be used where a UE (such as the UE 116) transmits both a PRACH preamble and a PUSCH (MsgA) prior to reception of a corresponding RAR (MsgB).

Embodiments of the present disclosure relates to determining spatial settings for transmission during initial access. The present disclosure also relates to determining a spatial setting for a PRACH transmission based on a corresponding PRACH preamble. The present disclosure further also relates to determining and/or indicating a spatial setting for Msg3 transmission. Additionally, the present disclosure relates to determining and/or indicating a spatial setting for MsgA transmission. The present disclosure also relates to determining a spatial setting associated to a UE type. The present disclosure further relates to determining a partition of PRACH preambles associated to a UE type. Additionally, the present disclosure relates to determining spatial settings for repetitions of PRACH transmission and Msg3 PUSCH transmission.

During the initial cell search, a UE (such as the UE 116) acquires (or detects) an SS/PBCH block transmitted by a gNB (such as the BS 102). The gNB can transmit multiple SS/PBCH blocks with different quasi-collocation properties (also referred to as beams) and the UE typically acquires the SS/PBCH block associated with the quasi-collocation properties that best match the ones of the UE. Then, assuming beam reciprocity for the DL and UL transmissions, the UE transmits PRACH according to a spatial setting that is determined from the detected SS/PBCH block.

In order to minimize an overhead associated with the SS/PBCH blocks, a gNB (such as the BS 102) transmits a SS/PBCH block with a relatively "wide" beam in order to cover a corresponding wide area on a cell. Typically, there is a coverage imbalance between DL transmissions and UL transmissions that results due to, for example, a different antenna gain (larger at the gNB) or a different noise figure (larger at the UE). To compensate for such coverage imbalance, the UE can transmit a PRACH with a narrower beam including changing the beam/spatial setting of the PRACH transmission when the UE does not detect a random access response (RAR) message addressing the UE in response to the PRACH transmission. The UE can use a same spatial setting as for a PRACH transmission to transmit a Msg3 that is scheduled by a RAR message that the UE detects in response to the PRACH transmission. The spatial setting that the UE uses to transmit PRACH and Msg3 is unknown to the gNB.

Upon establishment of RRC connection and when the UE is provided by the gNB a configuration for PUCCH resources, the UE is also provided a spatial setting for PUCCH transmissions. As the gNB is not aware of the spatial setting the UE used to transmit PRACH or Msg3 PUSCH, or other PUSCH prior to the UE being provided PUCCH resources and a spatial setting for PUCCH transmissions by the gNB dedicated higher layer signaling, the spatial setting for the PUCCH transmissions can be different than the one the UE used to establish RRC connection. Unlike PUSCH transmissions, PUCCH transmissions cannot benefit from HARQ retransmissions and an incorrect spatial setting can result to link failure. The UE may then have to re-establish an RRC connection or initiate a link failure recovery procedure, thereby resulting in additional latency and degrade quality of service.

Accordingly, embodiments of the present disclosure takes into consideration that there is a need to establish a common understanding between a serving gNB and a UE of a spatial setting the UE applies to a PRACH transmission or to a Msg3 PUSCH transmission. There is another need to provide a means for determining a spatial setting of a PRACH transmission or of a Msg3 PUSCH transmission by a gNB. Additionally, there is another need to provide signaling mechanisms for a UE to indicate a spatial setting of a PRACH transmission or a Msg3 PUSCH transmission to a serving gNB.

Figure 6:
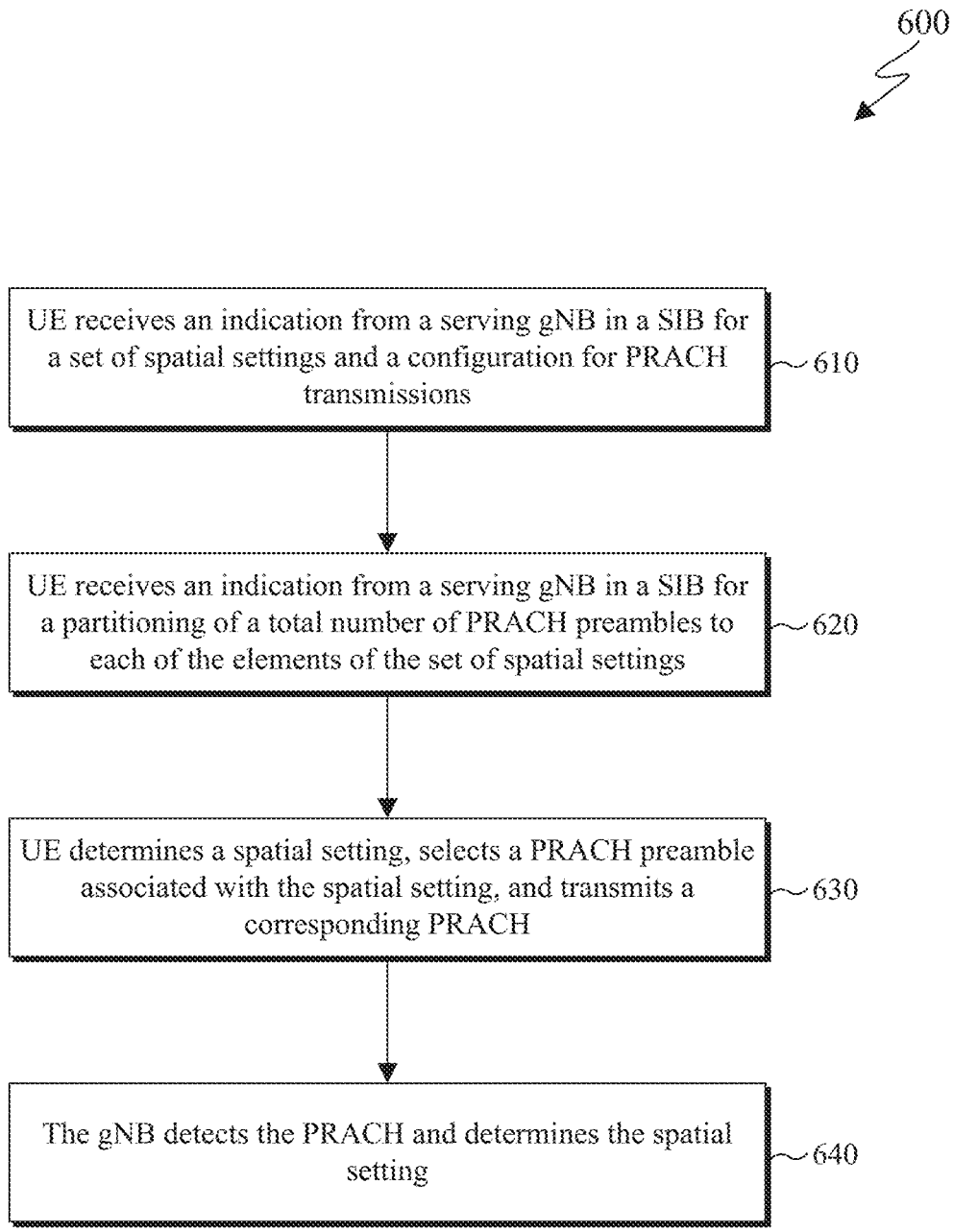
FIG. 6 illustrates an example method for a UE or for a BS to determine a spatial setting of a physical random access channel (PRACH) transmission or of a PRACH reception, respectively according to embodiments of the present disclosure.
Figure 7:
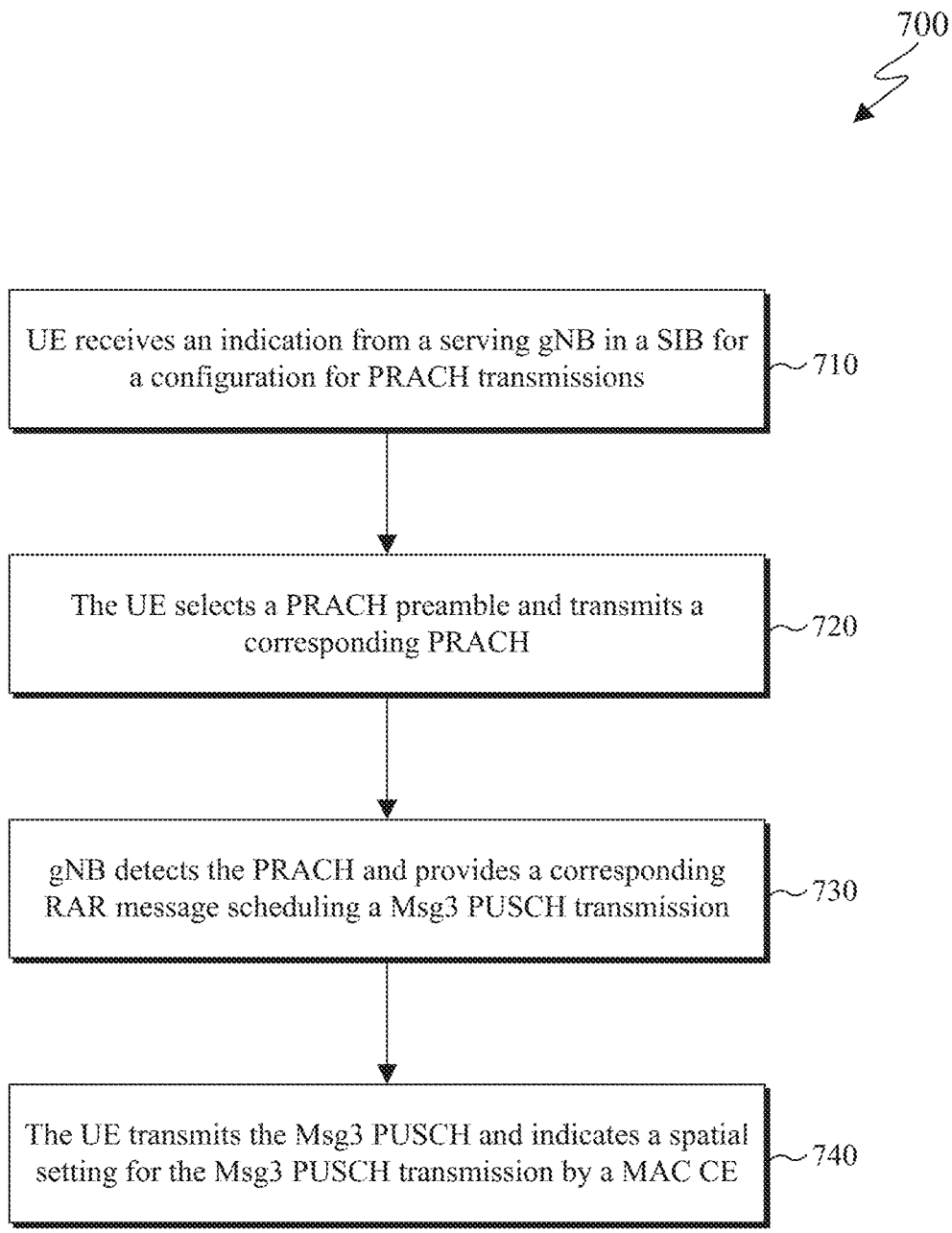
FIG. 7 illustrates an example method for a UE to indicate a spatial setting of a Msg3 physical uplink shared channel (PUSCH) according to embodiments of the present disclosure.
Figure 8:
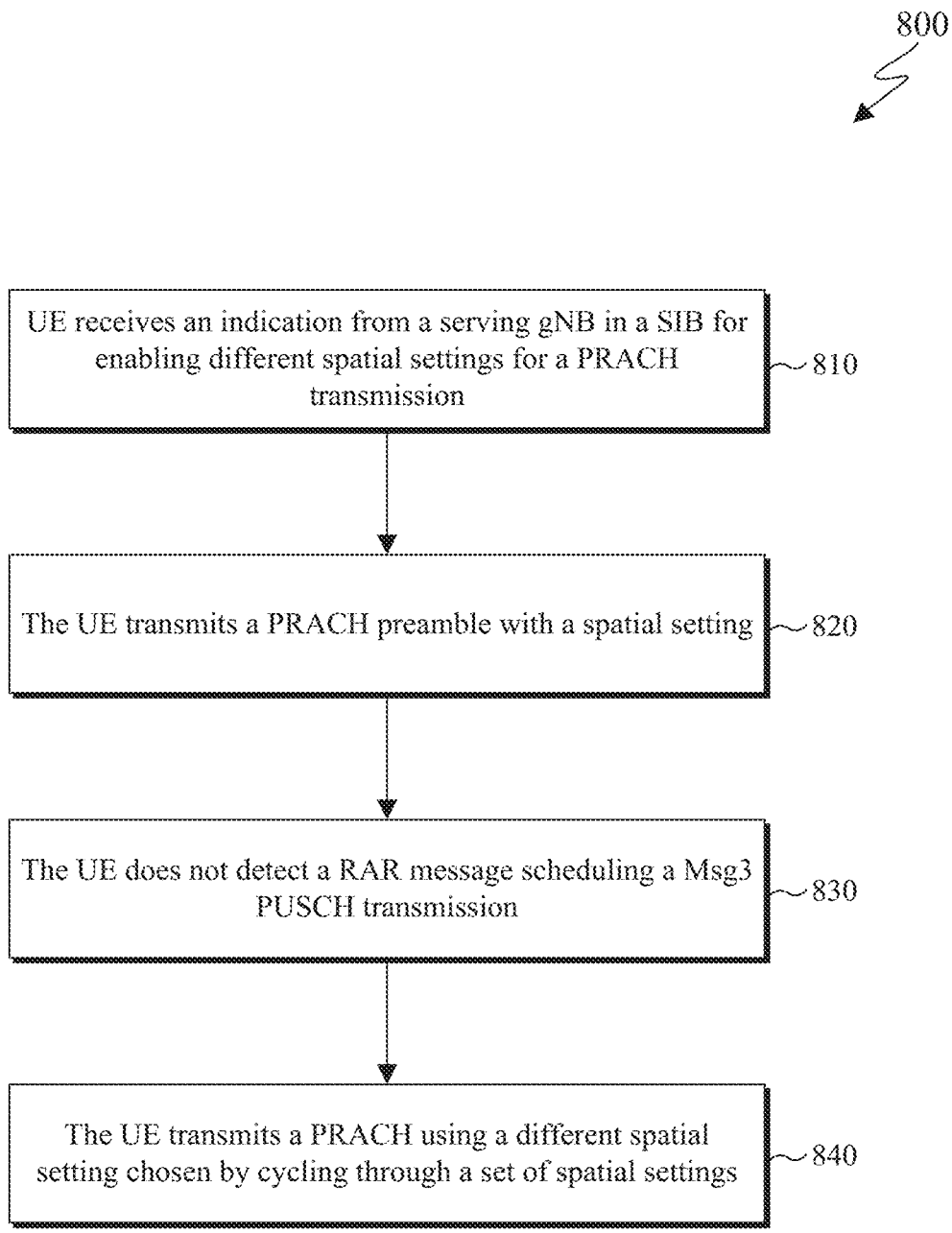
FIG. 8 illustrates an example method for a UE to determine a spatial setting for different PRACH transmission according to embodiments of the present disclosure.
Figure 9:
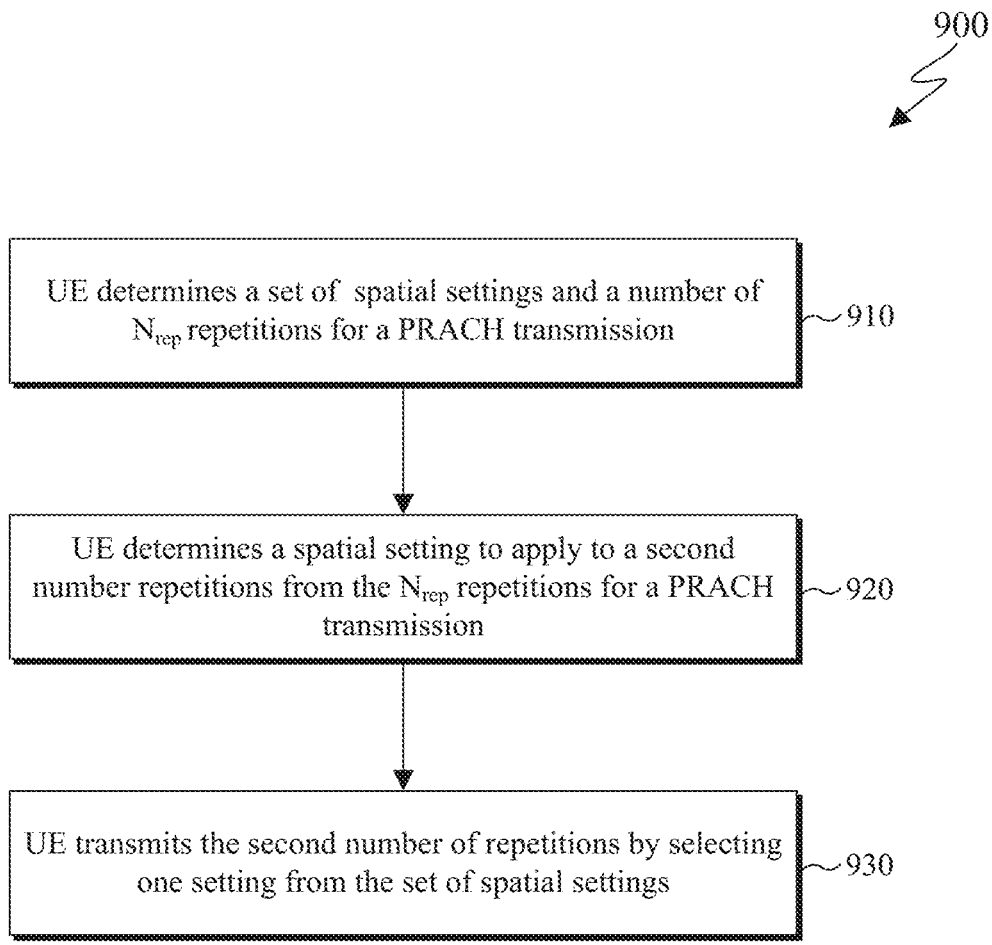
FIG. 9 illustrates an example method for a UE to cycle a spatial setting for different repetitions of a PRACH transmission according to embodiments of the present disclosure.
Figure 10:
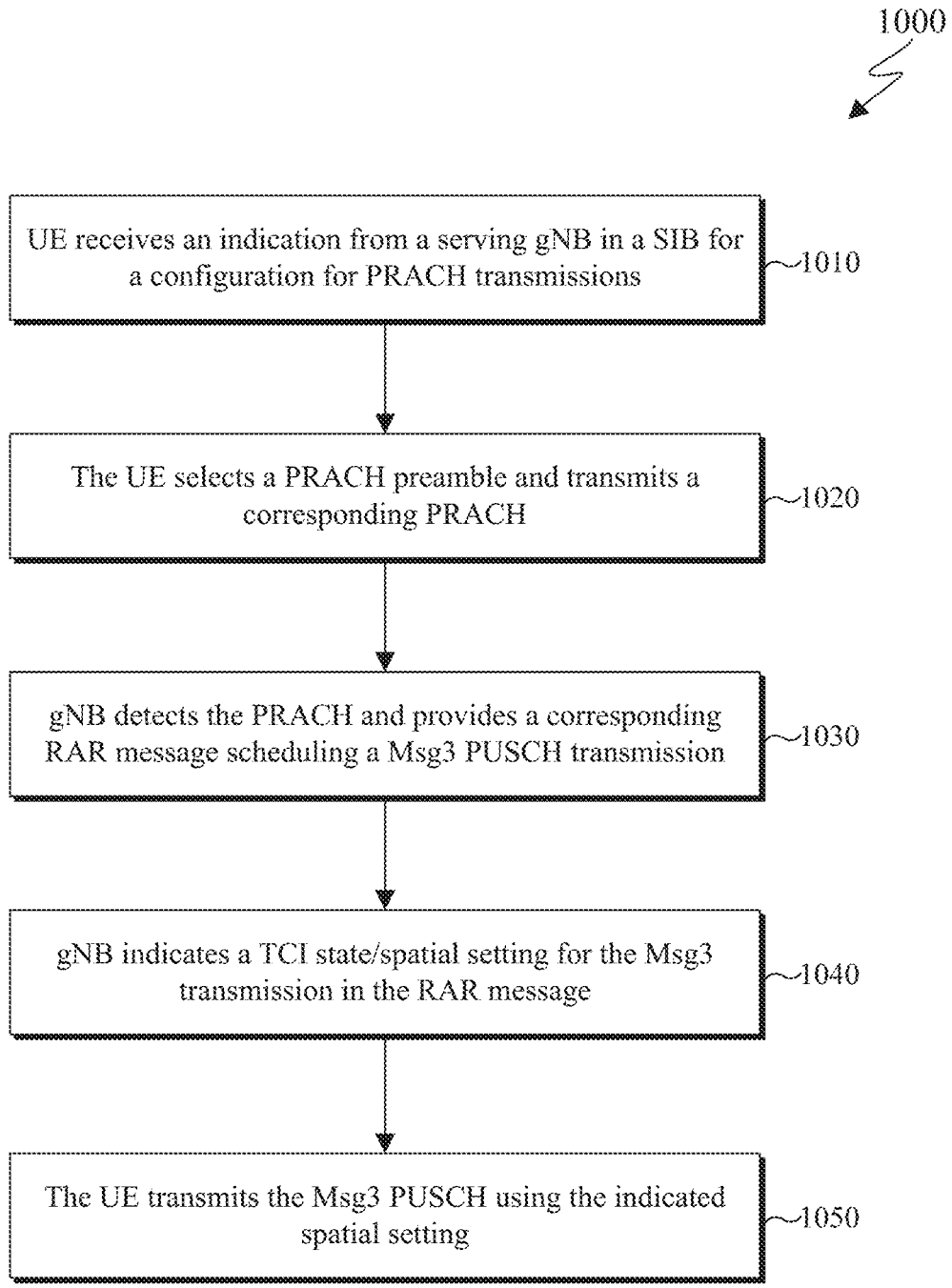
FIG. 10 illustrates an example method for a BS to indicate a spatial setting for a Msg3 PUSCH transmission according to embodiments of the present disclosure.
Figure 11:
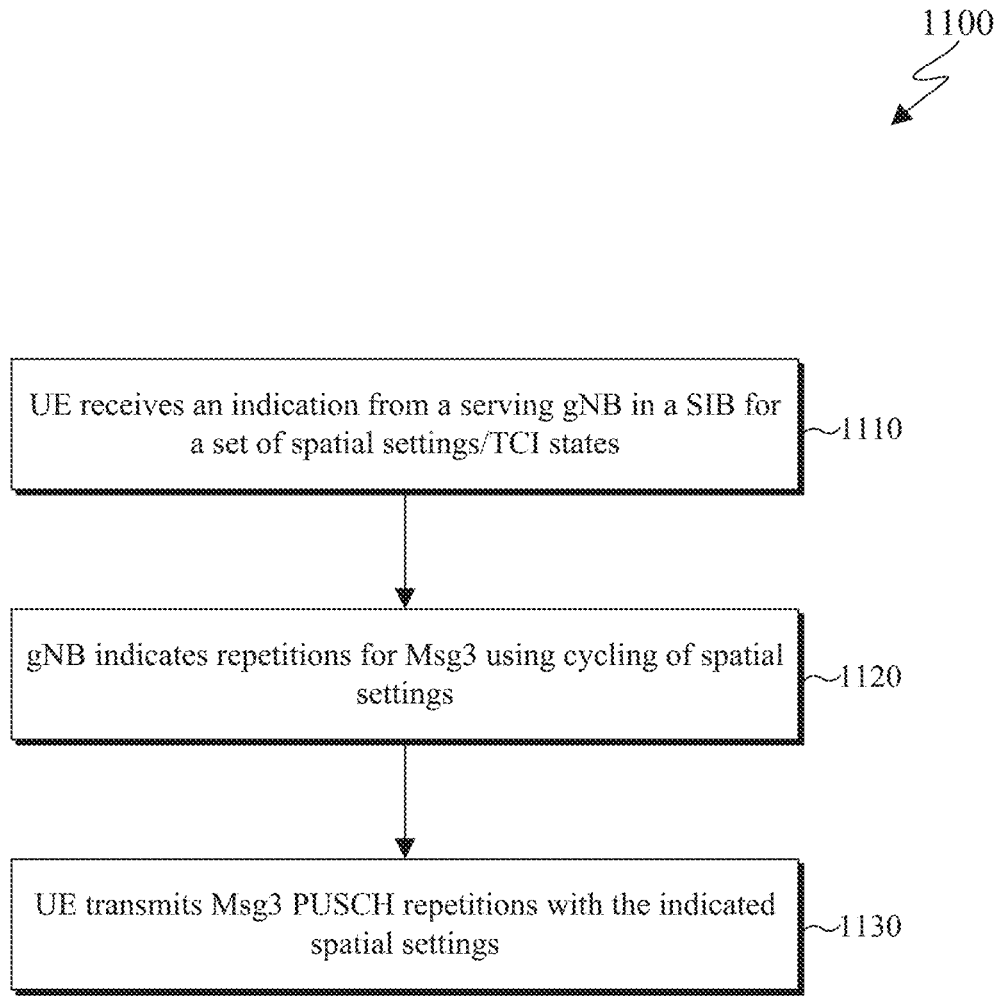
FIG. 11 illustrates an example method for a BS to indicate spatial settings for a Msg3 PUSCH transmission with repetitions according to embodiments of the present disclosure.
Figure 12:
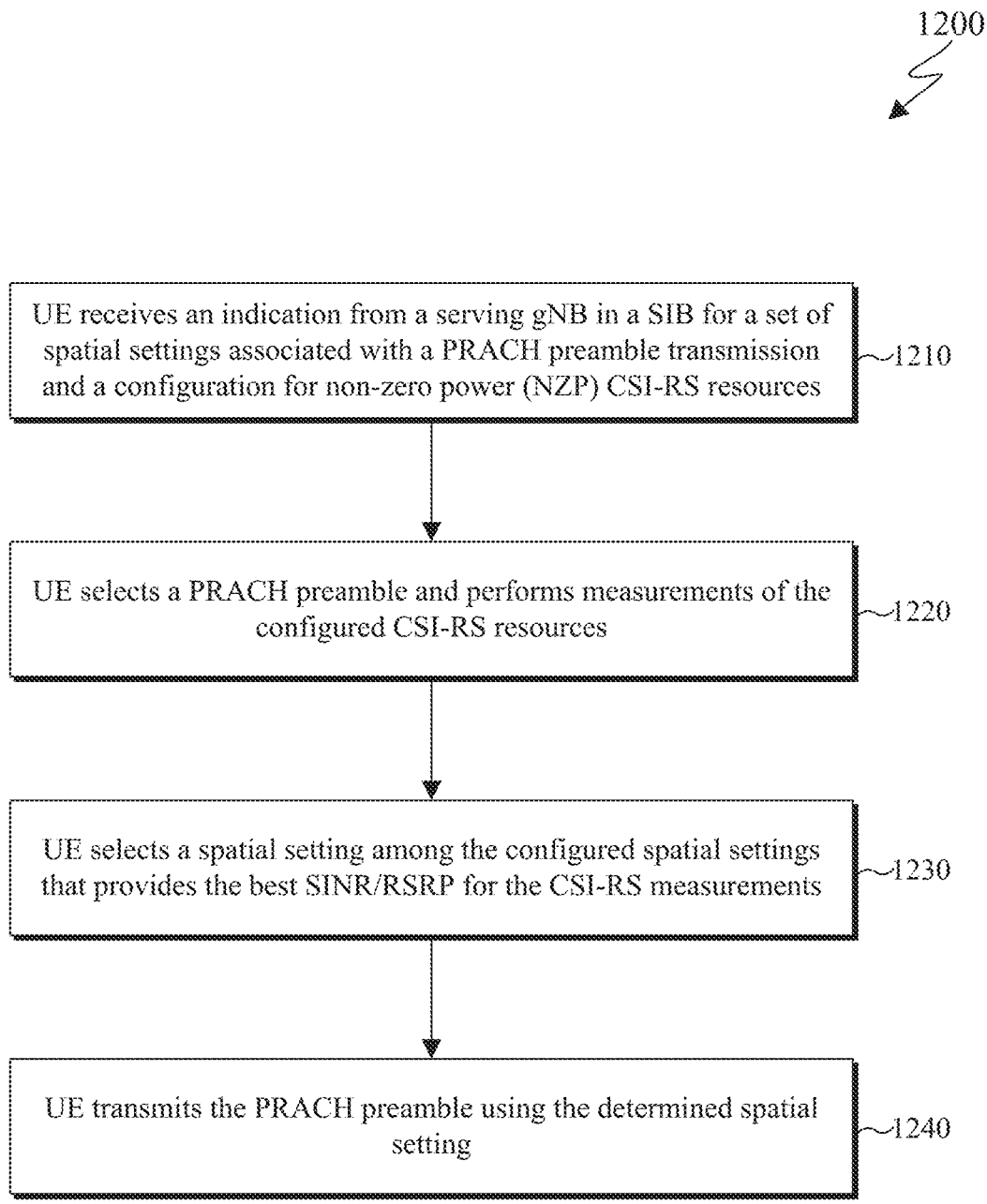
FIG. 12 illustrates an example method for a UE to determining a spatial setting for a PRACH preamble transmission according to embodiments of the present disclosure.
Figure 13:
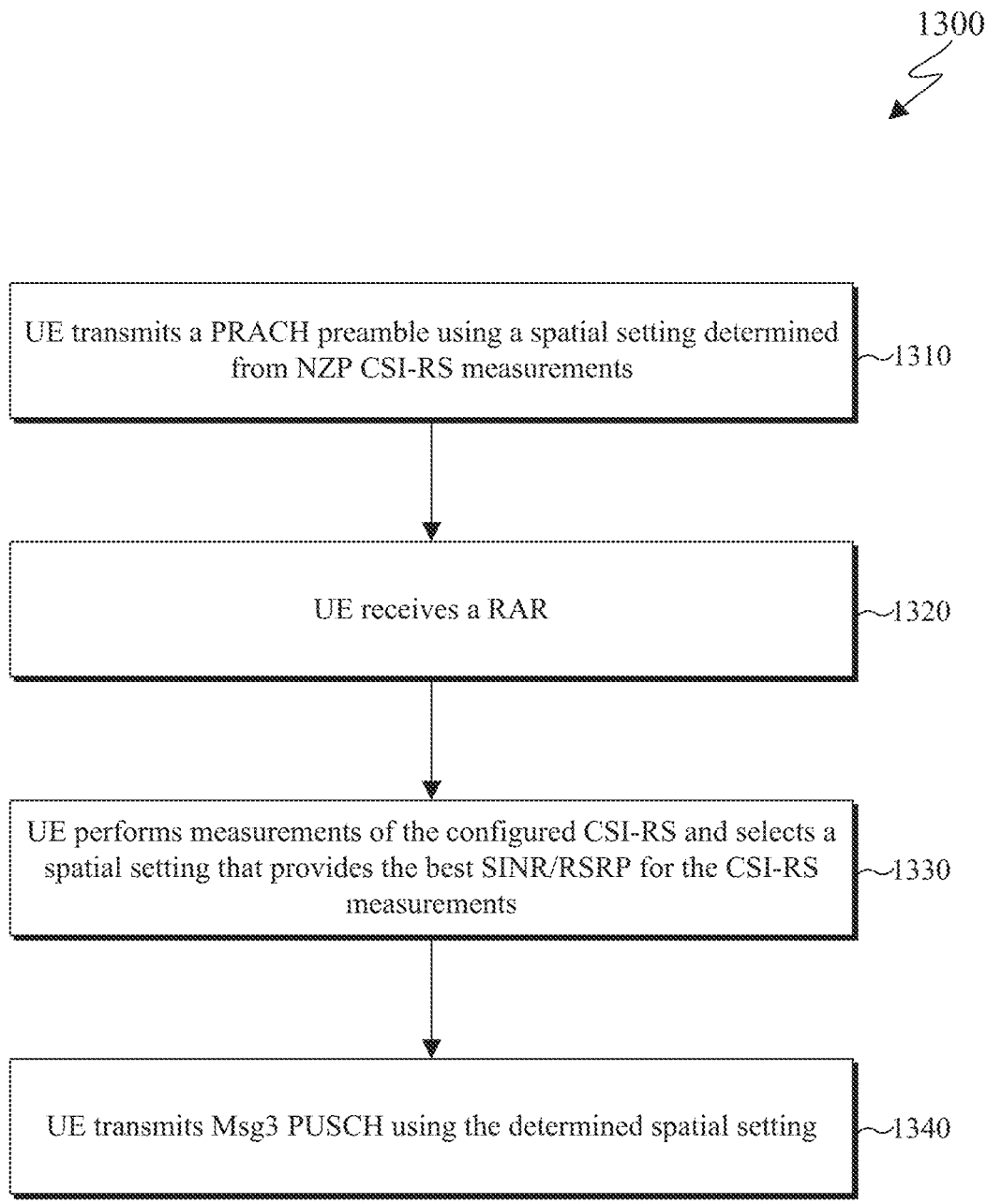
FIG. 13 illustrates an example method for a UE to determine a spatial setting for a Msg3 PUSCH transmission according to embodiments of the present disclosure.

FIG. 6 illustrates an example method 600 for a UE or for a BS to determine a spatial setting of a physical random access channel (PRACH) transmission or of a PRACH reception, respectively according to embodiments of the present disclosure. FIG. 7 illustrates an example method 700 for a UE to indicate a spatial setting of a Msg3 physical uplink shared channel (PUSCH) according to embodiments of the present disclosure. FIG. 8 illustrates an example method 800 for a UE to determine a spatial setting for different PRACH transmission according to embodiments of the present disclosure. FIG. 9 illustrates an example method 900 for a UE to cycle a spatial setting for different repetitions of a PRACH transmission according to embodiments of the present disclosure. FIG. 10 illustrates an example method 1000 for a BS to indicate a spatial setting for a Msg3 PUSCH transmission according to embodiments of the present disclosure. FIG. 11 illustrates an example method 1100 for a BS to indicate spatial settings for a Msg3 PUSCH transmission with repetitions according to embodiments of the present disclosure. FIG. 12 illustrates an example method 1200 for a UE to determining a spatial setting for a PRACH preamble transmission according to embodiments of the present disclosure. FIG. 13 illustrates an example method 1300 for a UE to determine a spatial setting for a Msg3 PUSCH transmission according to embodiments of the present disclosure.

The steps of the methods 600-1300 can be performed by any of the UEs 111-116 of FIG. 1, such as the UE 116 of FIG. 3, and any of the BSs 101-103 of FIG. 1, such as the BS 102 of FIG. 2. The methods 600-1300 of FIGS. 6-13 are for illustration only and other embodiments can be used without departing from the scope of the present disclosure.

In a first approach, a gNB (such as the BS 102) can determine a spatial setting for a PRACH transmission based on a corresponding PRACH preamble. The gNB can indicate in a system information block (SIB) a set of spatial settings (transmission configuration indication (TCI) states). The gNB can also indicate a partitioning/mapping of a total number of PRACH preambles among spatial setting from the set of spatial settings. Alternatively, an equal partitioning can be assumed by default. For example, the gNB can indicate a set of four spatial settings and, for a total of 64 PRACH preambles, a partitioning of the first, second, third, and fourth 16-tuples of PRACH preambles to the first, second, third, and fourth spatial setting, respectively. Then, a UE (such as the UE 116) can choose a PRACH preamble associated with a selected spatial setting and the gNB can determine the spatial setting based on the detected PRACH preamble. The UE can choose an initial spatial setting based on the UE implementation or pseudo-randomly based on example on a UE ID or a RA-RNTI for a corresponding RAR message, and so on. The UE can choose a next spatial setting based on the UE implementation or sequentially (modulo the number of spatial setting in the set), and so no. The first approach also enables a gNB to receive PRACH with a narrower spatial setting that the one corresponding to a SS/PBCH block, thereby increasing a detection probability for the PRACH preamble.

As illustrated in FIG. 6, the method 600 describes a UE (such as the UE 116) determining spatial settings of a PRACH transmission or a gNB (such as the BS 102) determining spatial settings of a PRACH reception. In step 610, a UE receives an indication from a serving gNB in a SIB for a set of spatial settings and a configuration for PRACH transmissions. In step 620, unless a predetermined partitioning (such as a uniform partitioning) of a total number of PRACH preambles to elements of the set of spatial settings is used, the gNB can additionally indicate in the SIB a partitioning of a total number of PRACH preambles to each of the elements of the set of spatial settings. That is a UE can receive the indication form a serving gNB in a SIB for partitioning of a total number of PRACH preambles to each of the elements of the spatial settings. In step 430, the UE determines a spatial setting, selects a PRACH preamble associated with the spatial setting, and transmits a corresponding PRACH. In step 440, the gNB detects the PRACH and determines the spatial setting. The UE can use the spatial setting for a PRACH transmission that the UE detects a corresponding RAR message for subsequent transmissions unless a new spatial setting is indicated by the gNB through physical layer signaling, such as by a DCI format, or higher layer signaling such as a MAC control element (CE) or UE-dedicated RRC signaling in a PDSCH reception.

When the UE does not detect a RAR message in response to a PRACH transmission, the UE can transmit a new PRACH preamble using a same spatial setting or using a new spatial setting. The UE behavior can be left to UE implementation or can be controlled by the gNB. For example, the gNB can indicate in the SIB a number of PRACH transmissions (with same or different PRACH preamble) that a UE needs to apply before changing a spatial setting when the UE does not detect a RAR message for the corresponding PRACH preamble during a RAR response window.

In a second approach, a UE can indicate a spatial setting of a Msg3 PUSCH transmission by higher layer signaling such as a MAC CE. The spatial setting can be from a set of spatial setting that the gNB indicates in a SIB. Alternatively, the spatial setting can be indicated relative to the spatial setting/TCI state of the SS/PBCH block that the UE detects and can be defined in the specifications of the system operation. Unlike the first approach, the second approach allows use of all PRACH preambles for any spatial setting that a UE can choose and enables use of the second approach together with existing UEs that do not use either the first or the second approach. The UE can use the spatial setting indicated in the Msg3 PUSCH transmission for all subsequent transmissions unless the UE is provided another spatial setting by the serving gNB.

FIG. 7 illustrates the method 700 for a UE (such as the UE 116) indicating a spatial setting of a Msg3 PUSCH transmission to a serving gNB (such as the BS 102). In step 710, a UE receives an indication from a serving gNB in a SIB for a configuration for PRACH transmissions. In step 720, the UE selects a PRACH preamble and transmits a corresponding PRACH. In step 730, the gNB detects the PRACH and provides a corresponding RAR message scheduling a Msg3 PUSCH transmission. In step 740, the UE transmits the Msg3 PUSCH and indicates a spatial setting for the Msg3 PUSCH transmission by a MAC CE.

For a 2-step random access procedure, where a UE (such as the UE 116) transmits a PRACH and a PUSCH (MsgA) prior to a reception of a RAR message, the UE can select a spatial setting and transmit MsgA according to the selected spatial setting. Either the first approach or the second approach can be applicable for the MsgA transmission. The first approach can be applicable for the selection of the PRACH preamble while the second approach can be applicable to the indication of the spatial setting by higher layers in the PUSCH transmission.

In certain embodiments, it is possible to incorporate elements of the first approach in the second approach. For example, a gNB (such as the BS 102) can indicate in a SIB a set of spatial settings but without having an association among PRACH preambles and spatial settings. Instead, the UE can select any PRACH preamble and transmit a PRACH using any spatial setting from the set of spatial settings. The UE can indicate the spatial setting for a PRACH transmission that the UE received a corresponding RAR message by higher layers in a Msg3 PUSCH or in a MsgA PUSCH transmission when the UE applies a 4-step or a 2-step random access procedure, respectively.

The first and second approaches, and combinations of such approaches as indicated above, apply when the partitioning/mapping is associated to UEs with certain characteristics. It is noted that in a network there can be UEs with different characteristics. For example, UEs with different characteristics include UEs with reduced capabilities, or generally UEs with different sets of capabilities. The gNB can associate a partition of preambles and/or a spatial setting to UEs with certain configured set of capabilities. The gNB can indicate a set of spatial setting and preambles for a type of UEs. As in approach 1, a UE determines a spatial setting, selects a PRACH preamble associated with the spatial setting, and transmits a corresponding PRACH.

Another aspect is related to determining a spatial setting for repetitions of a PRACH transmission, either with approach 1 (where the UE determines a spatial setting and selects a PRACH preamble associated with the spatial setting) or with approach 2 (where the UE selects a spatial setting and a PRACH preamble from all configured PRACH preambles and spatial settings). When the PRACH transmission is without repetitions or when the UE uses a same spatial setting for all repetitions of a PRACH transmission, if the UE does not detect a RAR message within a time window for RAR reception, the UE can transmit a PRACH with a different spatial setting at the next attempt.

In approach 1, for example for a set of $N_S$ spatial settings each associated to $N_{PRACH}$ PRACH preambles and for $N_{rep}$ repetitions, the $N_S$ spatial settings are used for different repetitions of a PRACH transmission. The spatial setting can change in every repetition or in every $N_{rep}/N_S$ repetitions ($N_{rep}$ is assumed to be a multiple of $N_S$). In approach 2, a UE can use different spatial settings for different repetitions of a PRACH transmission. For example, the different spatial settings can be obtained by cycling through the set of spatial settings/TCI states indicated in the SIB. It is also possible that the spatial settings are predetermined relative to the spatial setting of the SS/PBCH block the UE used to obtain system information (for example, defined by $N_S$ partitions in an angular for the SS/PBCH block beam). The use of different spatial settings for different repetitions of a PRACH transmission can be enable/disabled by SIB signaling.

The spatial setting to be used can also be associated with a slot index of a corresponding PRACH transmission. For example, per a predetermined number of slots such as 10 slots, a first spatial setting can be applicable for a first slot, a second spatial setting can be applicable for a second slot, and so on. Such association among spatial settings and slot can simplify the gNB receiver operation by enabling PRACH receptions with only same spatial settings at a given time.

As illustrated in FIG. 8, the method 800 describes a UE (such as the UE 116) determining a spatial setting for different PRACH transmissions. In step 810, a UE receives an indication from a serving gNB in a SIB for enabling a configuration of a PRACH transmission with different spatial settings for different repetitions. In step 820, the UE transmits a PRACH preamble with a spatial setting. In step 830, the UE does not detect a RAR message scheduling a Msg3 PUSCH transmission. In step 840, the UE repeats a PRACH transmission using a different spatial setting chosen by cycling from a set of predetermined spatial settings.

As illustrated in FIG. 9, the method 900 describes a UE (such as the UE 116) cycling spatial settings for different receptions of a PRACH transmission. In step 910, the UE determines a set of $N_S$ spatial settings and a number of $N_{rep}$ repetitions for a PRACH transmission. For example, the set of spatial settings can be provided in a SIB or be determined relative to a spatial setting of a SS/PBCH block providing system information. In step 920, the UE determines a spatial setting to apply to a second number repetitions from the $N_{rep}$ repetitions for a PRACH transmission. For example, the second number can be 1 or $N_{rep}/N_S$. In step 930, the UE transmits the second number of repetitions by selecting one setting from the set of spatial settings, starting for example from the first spatial setting, and cycles through the set of spatial settings per second number of repetitions for the remaining $N_{rep}$ repetitions for a PRACH transmission.

In certain embodiments, an additional aspect is related to the spatial setting of a Msg3 PUSCH transmission. A gNB can indicate a TCI state/spatial setting for the Msg3 transmission in the RAR message. For example, the indicated spatial setting is determined from the cycling of the spatial settings of the PRACH.

As illustrated in FIG. 10, the method 1000 describes a procedure for a gNB (such as the BS 102) to indicate a spatial setting for a Msg3 PUSCH transmission. In step 1010, a UE (such as the UE 116) receives an indication from a serving gNB in a SIB for a configuration for PRACH transmissions. In step 1020, the UE selects a PRACH preamble and transmits a corresponding PRACH. In step 1030, the gNB detects the PRACH and provides a corresponding RAR message scheduling a Msg3 PUSCH transmission. In step 1040, the gNB indicates a TCI state/spatial setting for the Msg3 transmission in the RAR message. In step 850, the UE transmits the Msg3 PUSCH using the indicated spatial setting.

A further aspect is related to the spatial settings of a Msg3 PUSCH transmission with repetitions. In certain embodiments, a gNB indicates repetitions for Msg3 using cycling of spatial settings. The different spatial settings can be obtained by cycling through a set of spatial settings/TCI states indicated in the SIB or predetermined relative to the spatial setting of the SS/PBCH block the UE used to obtain system information.

As illustrated in FIG. 11, the method 1100 describes a procedure for a gNB (such as the BS 102) to indicate spatial settings for a Msg3 PUSCH transmission with repetitions. In step 1110, a UE (such as the UE 116) receives an indication from a serving gNB in a SIB for a set of spatial settings/TCI states. In step 1120, the gNB indicates to the UE a Msg3 PUSCH transmission with repetitions. In step 1130, the UE transmits Msg3 PUSCH repetitions using cycling for the spatial setting per repetition or per number of repetitions.

When a UE transmits a PRACH preamble with a corresponding spatial setting indicated in a SIB, as described in approaches 1 and 2, the UE can select a spatial setting among the spatial settings indicated in the SIB based on measurements that the UE performs. A gNB can indicate spatial settings associated with CSI-RS configurations that the SIB indicates. The gNB can indicate CSI-RS configurations in the SIB that enable the UE to perform measurements and determine spatial settings from CSI-RS configurations. The UE can perform measurements of the (non-zero power) CSI-RS and select a spatial setting, among the indicated spatial settings, that provides the best signal-to-interference and noise ratio (SINR) or RSRP of such measurements. The UE then transmits a selected PRACH preamble with the determined spatial setting. Upon reception of a RAR, the UE can perform measurements of the CSI-RS and select a spatial setting among the indicated spatial settings that provides the best SINR of the measurements. The UE then transmits a Msg3 PUSCH with the determined spatial setting. The UE can also include a CSI report in the Msg3 PUSCH. It is also possible that the UE transmits a Msg3 PUSCH with a same spatial setting as the spatial setting the UE used to transmit a PRACH preamble associated with the Msg3 PUSCH transmission, wherein the UE derives the spatial setting from measurements that the UE performs based on the reception on the configured CSI-RS resources. It is also possible that the UE uses a combination of CSI-RS measurements performed at different time instances to determine the spatial setting to use for Msg3 PUSCH transmission or to determine the CSI report provided in the Msg3 PUSCH. When a UE does not receive a RAR in a configured time window (RA response window) after the transmission of a PRACH preamble, the UE can repeat the transmission of a PRACH preamble using spatial a same or different spatial setting determined from measurements on the configured CSI-RS resources, wherein for example the measurements are performed before or after the transmission of a previous repetitions or are a combination of measurements taken at different time instances. Transmission with spatial settings determined from CSI-RS measurements also applies to the transmission of a 2-step random access procedure wherein the first step includes the PRACH preamble and a MsgA PUSCH.

As illustrated in FIG. 12, the method 1200 describes a procedure for a UE (such as the UE 116) to determine a spatial setting for a PRACH preamble transmission. In step 1210, a UE receives an indication from a serving gNB in a SIB for a set of spatial settings associated with a PRACH preamble transmission and a configuration for non-zero power (NZP) CSI-RS resources. In step 1220, the UE selects a PRACH preamble and performs measurements of the configured CSI-RS resources. In step 1230, the UE selects a spatial setting among the configured spatial settings that provides the best SINR/RSRP for the CSI-RS measurements. In step 1240, the UE transmits the PRACH preamble using the determined spatial setting After transmission of the PRACH preamble, if the UE does not receive a RAR, the UE can repeat the transmission of the PRACH preamble with a same or different spatial setting that can be determined, for example, by performing new CSI-RS measurements or re-using previous CSI-RS measurements. Alternatively, the UE can select a different PRACH preamble and repeat steps 1220 through 1240.

As illustrated in FIG. 13, the method 1300 describes a procedure for a UE (such as the UE 116) to determine a spatial setting for a Msg3 PUSCH transmission. In step 1310, a UE transmits a PRACH preamble using a spatial setting determined from NZP CSI-RS measurements. In step 1320, the UE receives a RAR. In step 1330, the UE performs measurements of the configured CSI-RS and selects a spatial setting that provides the best SINR/RSRP for the CSI-RS measurements. Alternatively, the UE can use the same spatial setting the UE used to transmit the PRACH corresponding to the received RAR. In step 1340, the UE transmits Msg3 PUSCH using the determined spatial setting.

Although FIGS. 6-13 illustrates the methods 600-1300, respectively, various changes may be made to these FIGURES. For example, while the method 600 of FIG. 6, is shown as a series of steps, various steps could overlap, occur in parallel, occur in a different order, or occur multiple times. In another example, steps may be omitted or replaced by other steps. For example, steps of the methods 600-1300 can be executed in a different order.

Embodiments of the present disclosure also describe reporting a channel quality associated to a spatial setting in Msg3. The following examples and embodiments, such as those described in FIGS. 14-17 describe procedures for reporting channel quality associated to a spatial setting in Msg3.

Figure 14:
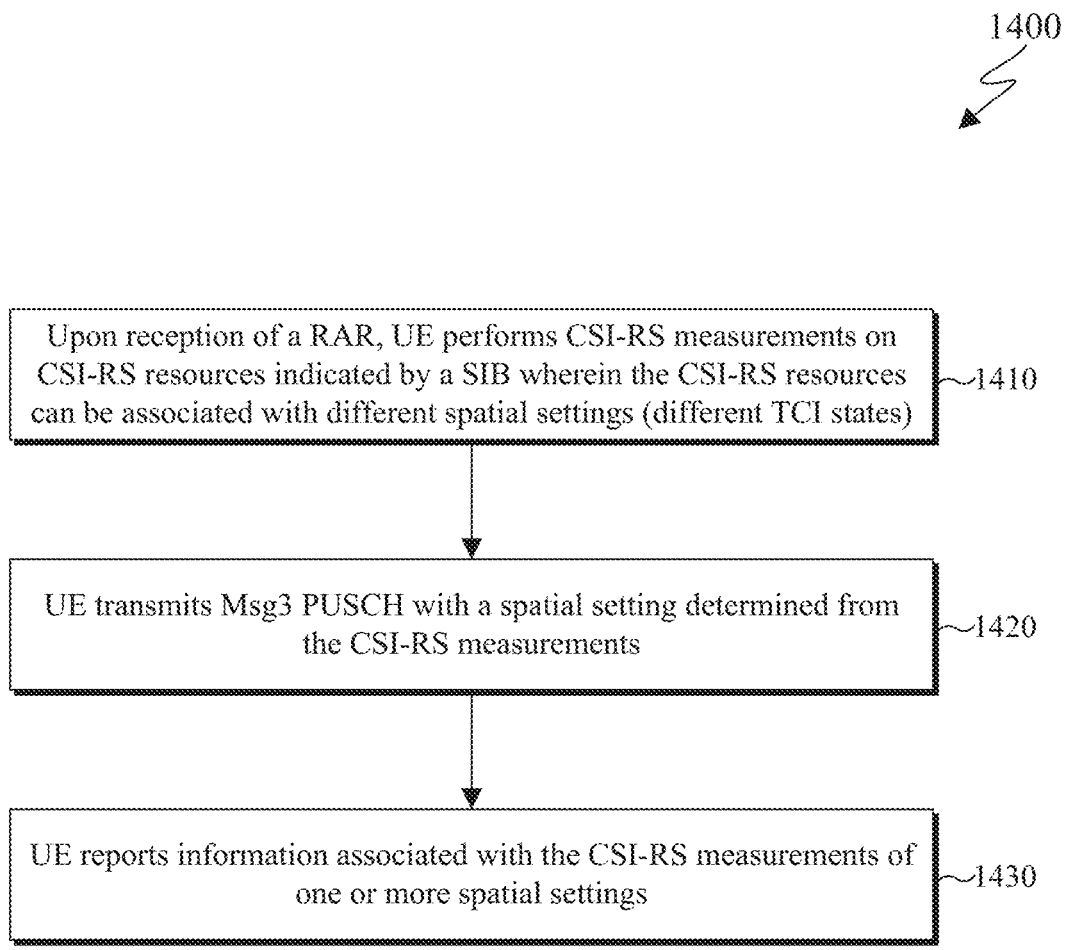
FIG. 14 illustrates an example method for a UE to include a channel state information (CSI) reference signal (RS) report in a Msg3 PUSCH transmission according to embodiments of the present disclosure.
Figure 15:
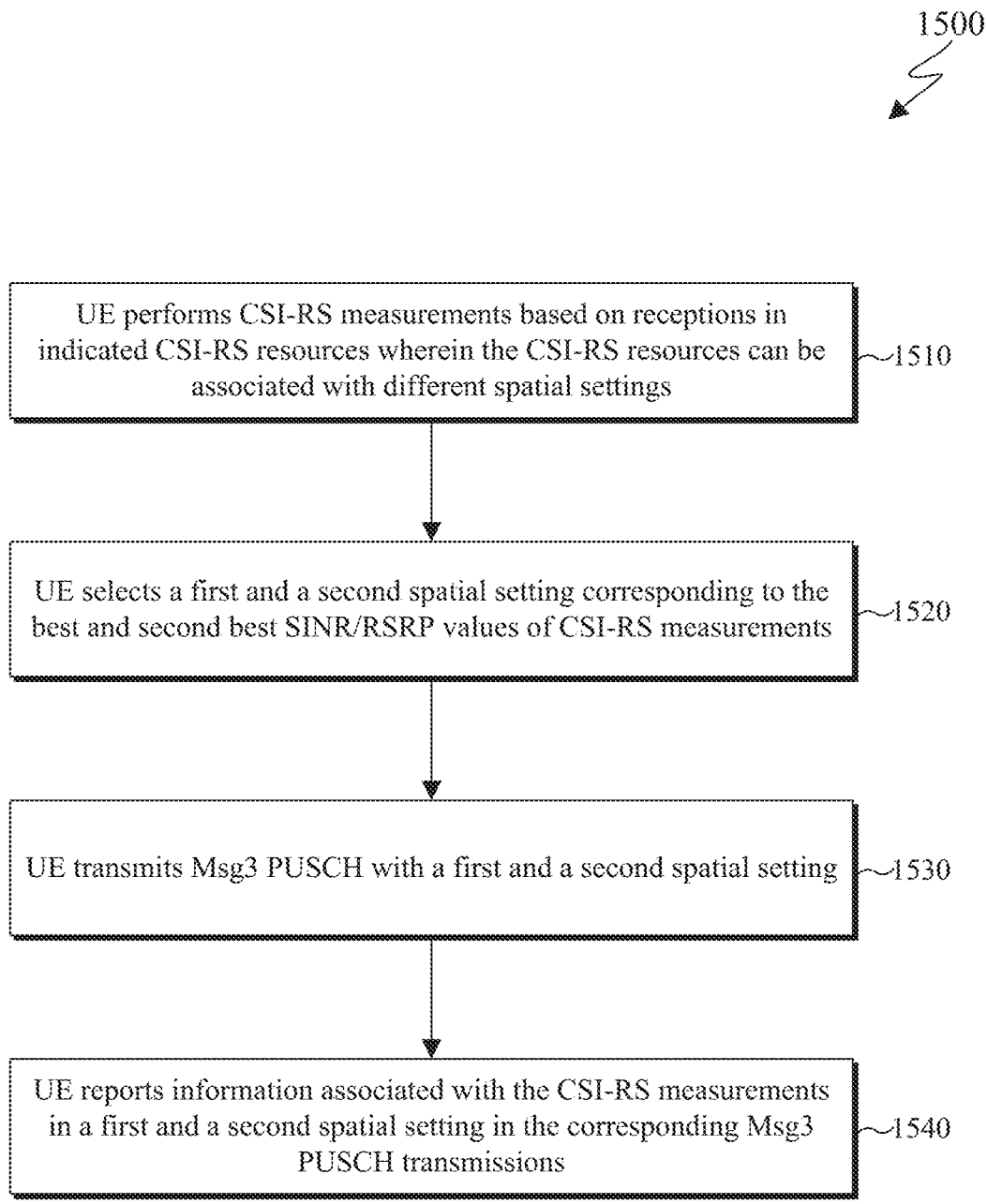
FIG. 15 illustrates an example method for a UE to include a CSI-RS report in a MSG3 PUSCH transmission, according to embodiments of the present disclosure.
Figure 16:
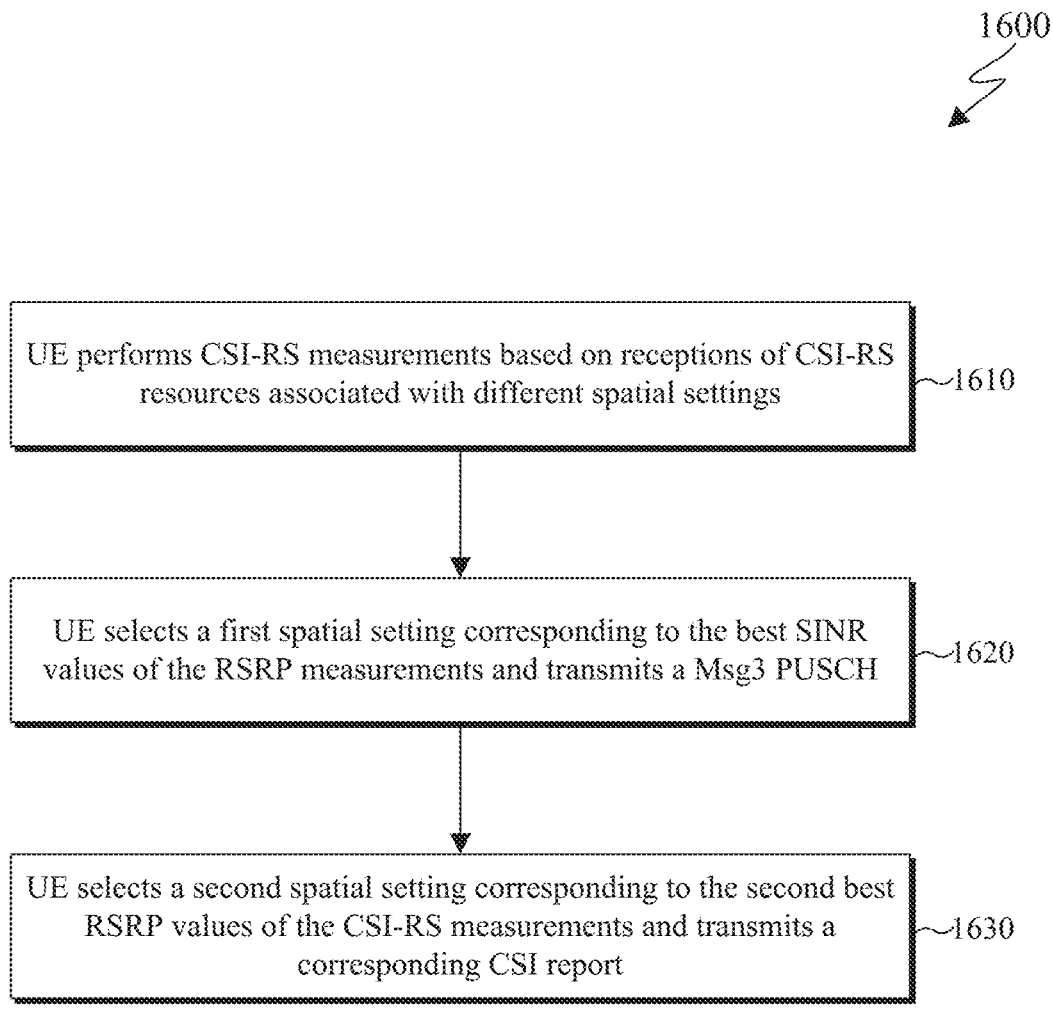
FIG. 16 illustrates an example method for UE to transmit a Msg3 PUSCH with a first spatial setting and a CSI report in another PUSCH with a second spatial setting, according to embodiments of the present disclosure.
Figure 17:
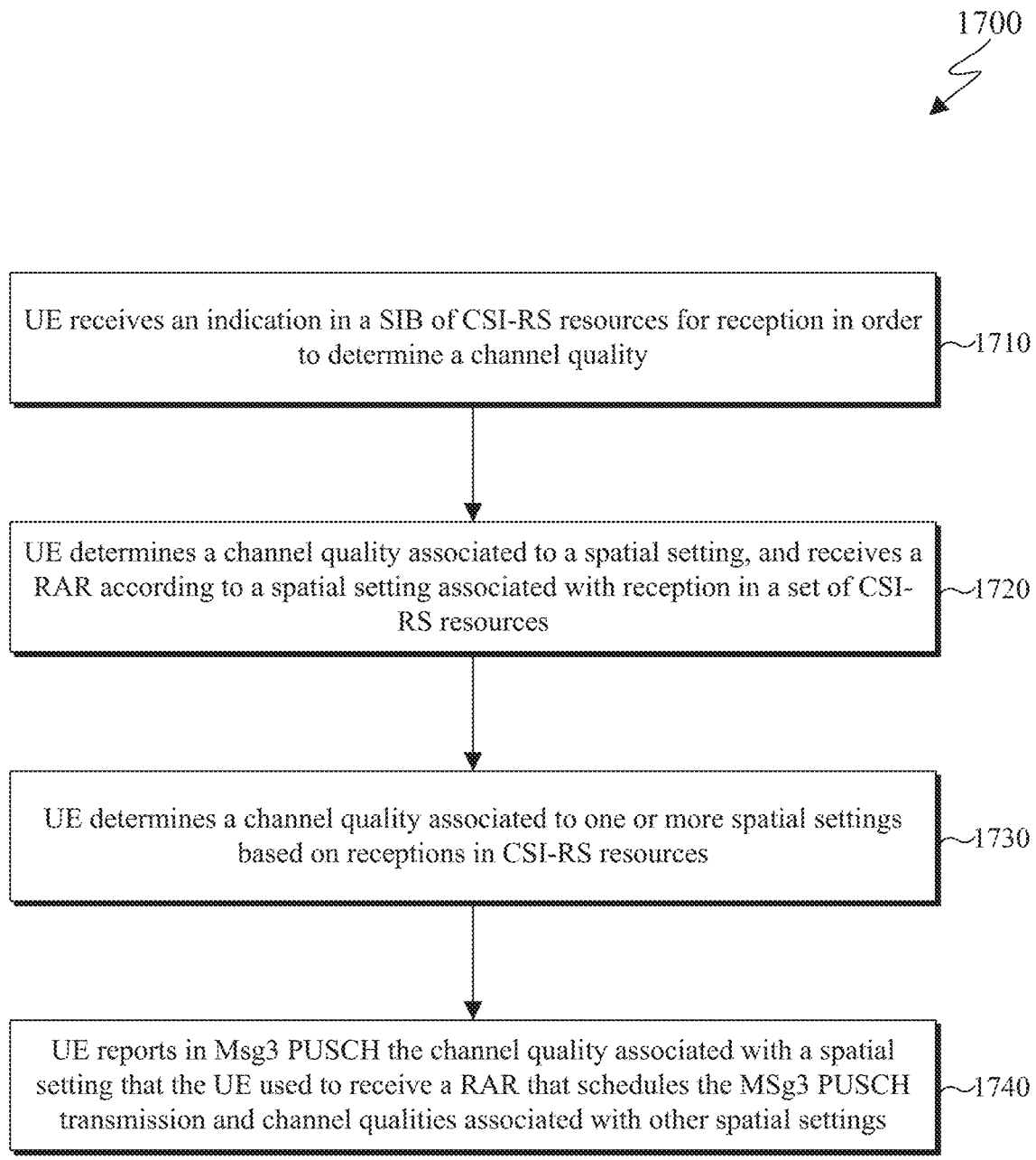
FIG. 17 illustrates an example method for a UE to report a channel quality in a Msg3 PUSCH transmission based on measurements in CSI-RS resources indicated in a system information block (SIB) according to embodiments of the present disclosure.

FIG. 14 illustrates an example method 1400 for a UE to include a channel state information (CSI) reference signal (RS) report in a Msg3 PUSCH transmission according to embodiments of the present disclosure. FIG. 15 illustrates an example method 1500 for a UE to include a CSI-RS report in a MSG3 PUSCH transmission where the Msg3 can be transmitted with multiple spatial settings, according to embodiments of the present disclosure. FIG. 16 illustrates an example method 1600 for UE to transmit a Msg3 PUSCH with a first spatial setting and a CSI report in another PUSCH with a second spatial setting, according to embodiments of the present disclosure. In the method 1600 the CSI report corresponds to a reception in CSI-RS resources associated with the second spatial setting. FIG. 17 illustrates an example method 1700 for a UE to report a channel quality in a Msg3 PUSCH transmission based on measurements in CSI-RS resources indicated in a SIB according to embodiments of the present disclosure.

The steps of the methods 1400-1700 can be performed by any of the UEs 111-116 of FIG. 1, such as the UE 116 of FIG. 3. The methods 1400-1700 of FIGS. 14-17 are for illustration only and other embodiments can be used without departing from the scope of the present disclosure.

In certain embodiments, when a UE performs NZP CSI-RS measurements using different spatial settings to determine a spatial setting for a Msg3 PUSCH transmission (wherein the spatial settings can be (i) provided by a gNB in a SIB, (ii) chosen by the UE, or (iii) a combination of the two), the UE can also include a CSI report in the Msg3 PUSCH. The UE can report information associated to the best spatial setting and/or information associated to measurements of multiple spatial settings, wherein the quality of the spatial setting is based on the SINR or RSRP of the CSI-RS measured by the UE. A UE can also estimate a channel quality by determining an RSRP of SSB measurements using a spatial setting. A gNB can configure in SIB whether a UE uses CSI-RS or SSB transmissions to determine a channel quality associated to a spatial setting. A configuration in SIB of CSI-RS can be interpreted as an indication to the UE to use CSI-RS transmissions to determine a channel quality associated to a spatial setting. A UE can also use both SSB transmissions and CSI-RS transmissions, when available, to determine a channel quality associated to a spatial setting.

When a gNB configures NZP CSI-RS resources in SIB, a UE can determine a channel quality associated to a spatial setting by performing measurements based on receptions in the CSI-RS resources and can report a channel quality associated to a spatial setting to the gNB.

For example, when the spatial settings are provided by a gNB, a CSI report can be associated to the best and second best spatial settings, or can be associated to all spatial settings, and the CSI report(s) associated to one or more spatial settings can be multiplexed in Msg3 PUSCH, wherein the UE transmits the Msg3 PUSCH using the best spatial setting.

For another example when the spatial settings are chosen by a UE, a CSI report can be associated to the best and second best spatial settings, or can be associated to all spatial settings, and the transmission of the CSI report(s) associated to one or more spatial settings can be done using the corresponding spatial settings. The UE can transmit Msg3 with the best spatial setting and transmit the CSI reports in the corresponding spatial settings. The CSI report of the best spatial setting can be also reported in Msg3.

Such report by the UE can be used by the gNB for determining link adaptation for a Msg4 PDSCH transmission and for subsequent PDSCH transmissions.

As illustrated in FIG. 14, the method 1400 describes a procedure for a UE (such as the UE 116) to include CSI-RS report in a Msg3 PUSCH transmission. In step 1410 upon reception of a RAR, a UE performs CSI-RS measurements on CSI-RS resources indicated by a SIB wherein the CSI-RS resources can be associated with different spatial settings (different TCI states). In step 1420, the UE transmits Msg3 PUSCH with a spatial setting determined from the CSI-RS measurements. In step 1430, the UE reports information associated with the CSI-RS measurements of one or more spatial settings. Alternatively, the UE can transmit Msg3 PUSCH using the same spatial setting the UE used to transmit a PRACH that is associated with the Msg3 PUSCH for the random access procedure. The UE can report information associated with the CSI-RS measurements of one or more spatial settings.

As illustrated in FIG. 15, the method 1500 describes a procedure for UE (such as the UE 116) to include a CSI-RS report in a Msg3 PUSCH transmission. In step 1510, the UE performs CSI-RS measurements based on receptions in indicated CSI-RS resources wherein the CSI-RS resources can be associated with different spatial settings. In step 1520, the UE selects a first and a second spatial setting corresponding to the best and second best SINR/RSRP values of CSI-RS measurements. In step 1530, the UE transmits Msg3 PUSCH with a first and a second spatial setting. In step 1540, the UE reports information associated with the CSI-RS measurements in a first and a second spatial setting in the corresponding Msg3 PUSCH transmissions.

The procedure as described in FIG. 15 can be generalized to a number Msg3 PUSCH transmissions for a respective number of spatial settings, wherein the number can be same as the number of spatial settings (TCI states) of CSI-RS configurations indicated in the SIB, or separately indicated in the SIB, or specified in the system operation. The Msg3 PUSCH transmissions can occur in different time durations. For example, each Msg3 PUSCH transmission from the number of transmissions can be over a same number of symbols in time and the number of symbols is indicated by a time domain resource assignment field in an UL grant provided by the RAR and scheduling a Msg3 PUSCH transmission.

As illustrated in FIG. 16, the method 1600 describes a procedure for a UE (such as the UE 116) to transmit a Msg3 PUSCH with a first spatial setting and a CSI report in another PUSCH with a second spatial setting. In step 1610, the UE performs CSI-RS measurements based on receptions of CSI-RS resources associated with different spatial settings. In step 1620, the UE selects a first spatial setting corresponding to the best RSRP value of the CSI-RS measurements and transmits a Msg3 PUSCH. In step 1630, the UE selects a second spatial setting corresponding to the second best RSRP value of the CSI-RS measurements and transmits a corresponding CSI report in a second PUSCH with the second spatial setting. The parameters for the second PUSCH transmission can be same as for the Msg3 PUSCH transmission wherein a time of the second PUSCH transmission is after a time of the Msg3 PUSCH transmission and is over a same number of symbols as the Msg3 PUSCH transmission.

In certain embodiments, a UE can also determine a channel quality associated to a spatial setting by performing measurements based on SSB receptions and can report a channel quality associated with a spatial setting to the gNB. The above descriptions and examples (as described in FIGS. 14,15,16) which describe a UE determining a channel quality and reporting such channel quality to a gNB based on receptions in CSI-RS resources also apply when measurements by the UE are based on SSB receptions.

As illustrated in FIG. 17, the method 1700 describes a procedure for a UE (such as the UE 116) report a channel quality in a Msg3 PUSCH transmission based on measurements in CSI-RS resources indicated in a SIB. In step 1710, the UE receives an indication in a SIB of CSI-RS resources for reception in order to determine a channel quality. In step 1720, the UE determines a channel quality associated to a spatial setting and the UE receives a RAR according to a spatial setting associated with reception in a set of CSI-RS resources. In step 1730, the UE determines a channel quality associated to one or more spatial settings based on receptions in CSI-RS resources. In step 1740, the UE reports in Msg3 PUSCH the channel quality associated with a spatial setting that the UE used to receive a RAR that schedules the Msg3 PUSCH transmission and channel qualities associated with other spatial settings.

Although FIGS. 14-17 illustrates the methods 1400-1700, respectively, various changes may be made to these FIGURES. For example, while the method 1400 of FIG. 14, is shown as a series of steps, various steps could overlap, occur in parallel, occur in a different order, or occur multiple times. In another example, steps may be omitted or replaced by other steps. For example, steps of the methods 1400-1700 can be executed in a different order.

Embodiments of the present disclosure also describe Msg3 transmission. The following examples and embodiments, such as those described in FIGS. 18, 19A, and 19B, describe procedures for Msg3 transmission.

Figure 18:
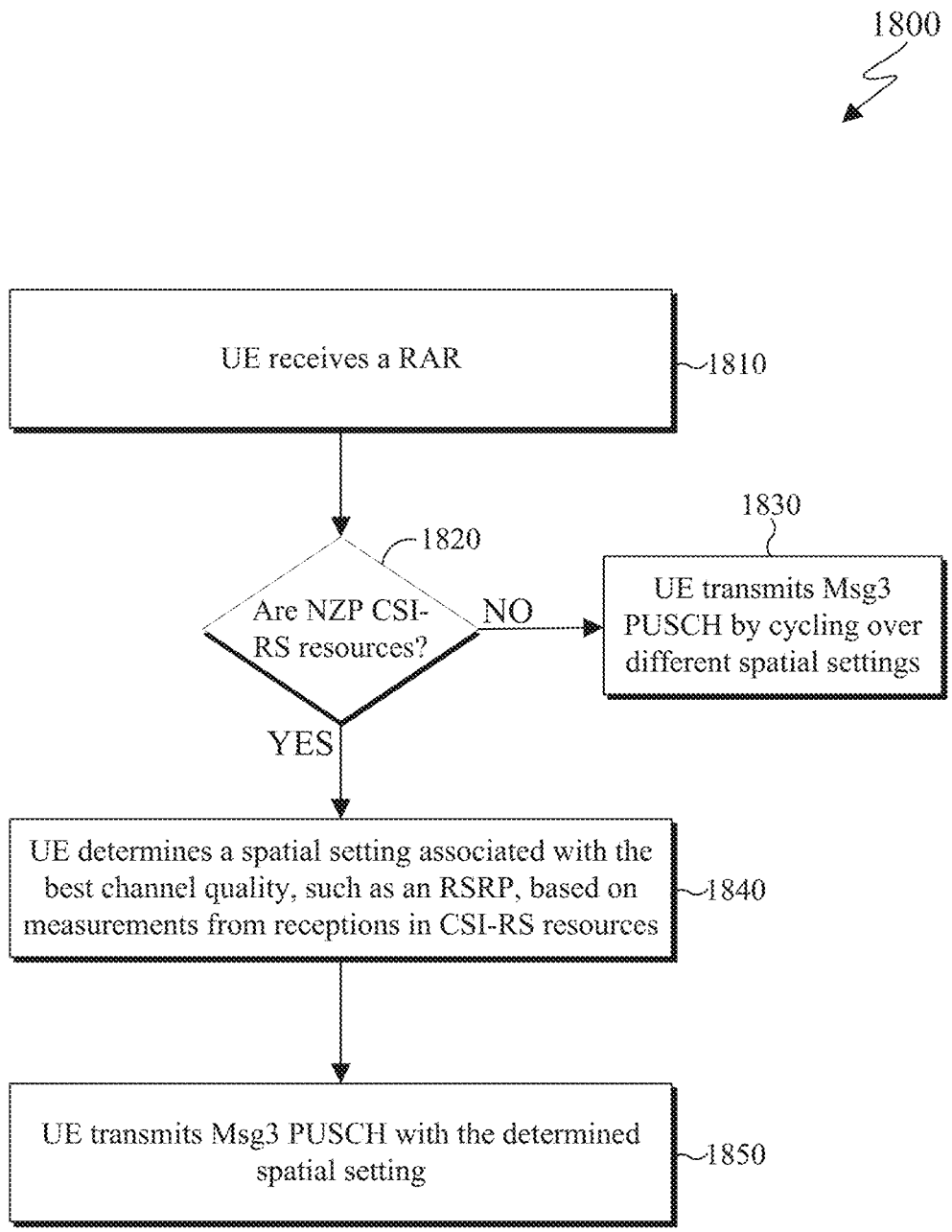
FIG. 18 illustrates an example method for a UE to determine whether to transmit Msg3 PUSCH using different spatial settings according to embodiments of the present disclosure.
Figure 19A:
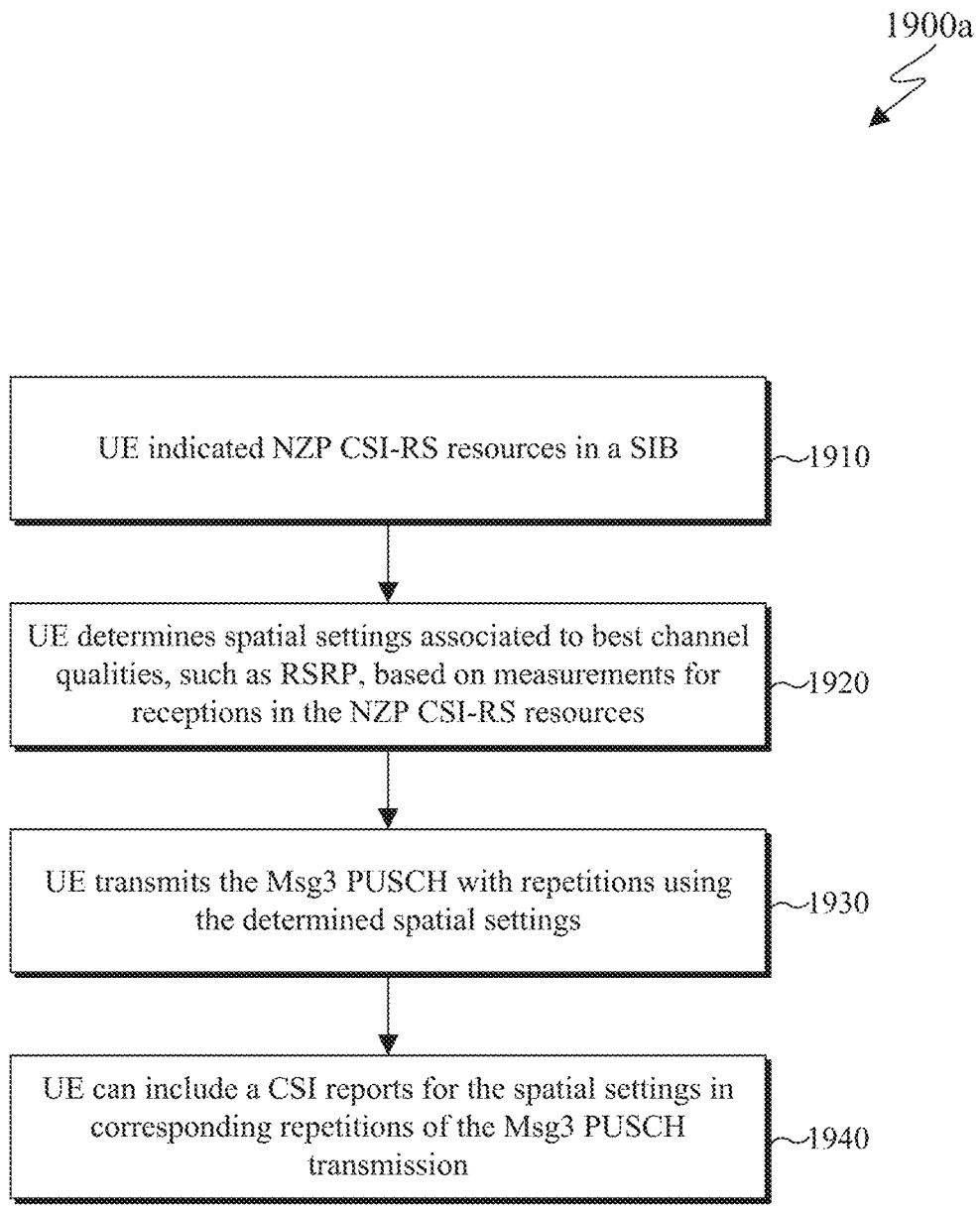
FIG. 19A illustrates an example method for a UE to transmit Msg3 PUSCH with repetitions by cycling over spatial settings determined by measurements for receptions in CSI-RS resources according to embodiments of the present disclosure.
Figure 19B:
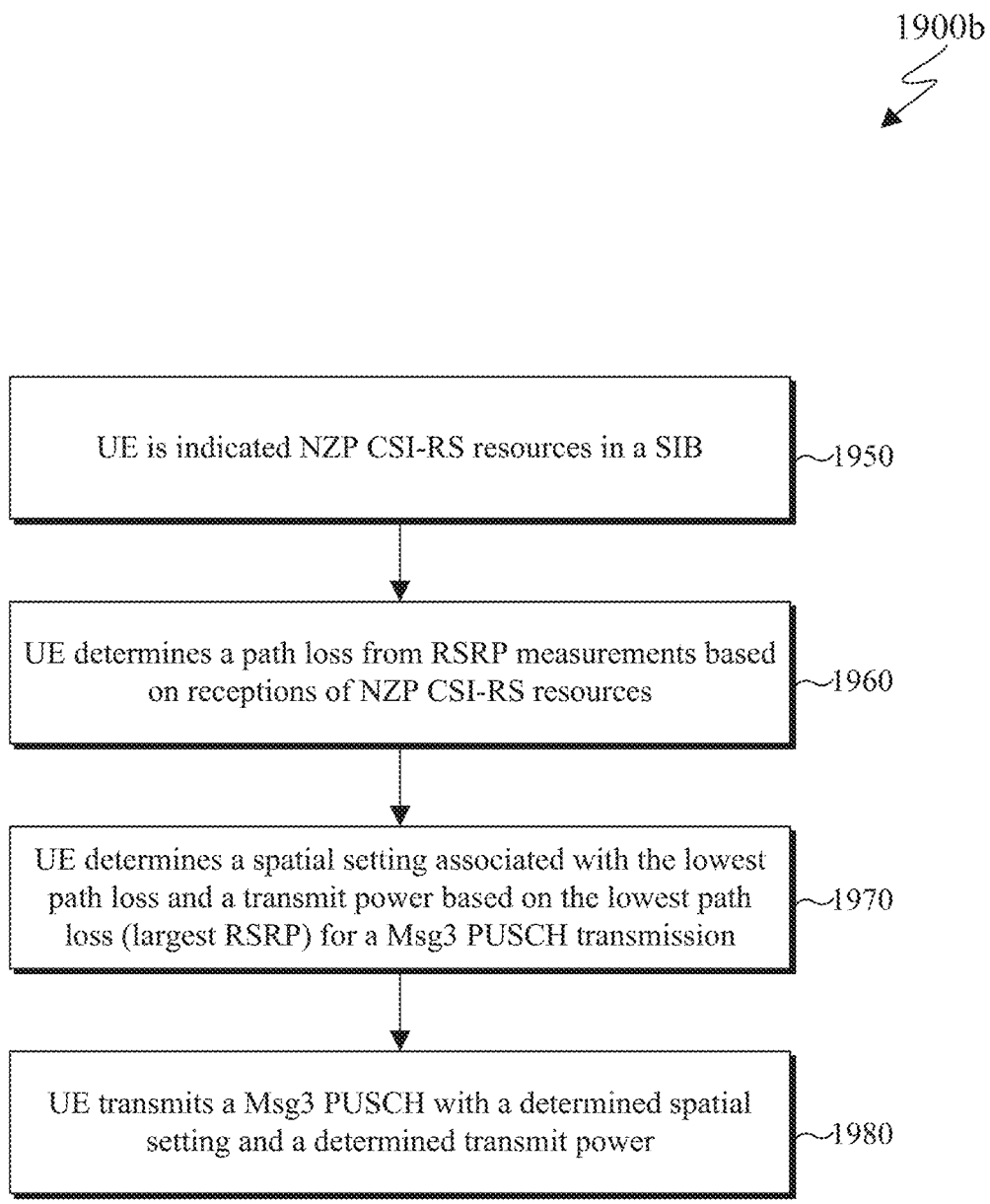
FIG. 19B illustrates an example method for a UE to estimate path loss according to embodiments of the present disclosure.

FIG. 18 illustrates an example method 1800 for a UE to determine whether to transmit Msg3 PUSCH using different spatial settings according to embodiments of the present disclosure. FIG. 19A illustrates an example method 1900a for a UE to transmit Msg3 PUSCH with repetitions by cycling over spatial settings determined by measurements for receptions in CSI-RS resources according to embodiments of the present disclosure. FIG. 19B illustrates an example method 1900b for a UE to estimate path loss according to embodiments of the present disclosure.

The steps of the methods 1800-1900b can be performed by any of the UEs 111-116 of FIG. 1, such as the UE 116 of FIGURE. The methods 1800-1900b of FIGS. 18-19B are for illustration only and other embodiments can be used without departing from the scope of the present disclosure.

In certain embodiments, when a gNB (such as the BS 102) configures NZP CSI-RS resources in a SIB, a UE (such as the UE 116) (i) determines a channel quality associated with different spatial setting by performing measurements based on receptions in CSI-RS resources and (ii) transmits a Msg3 PUSCH using the best spatial setting (in terms of a largest measured RSRP in corresponding CSI-RS resources). It is noted that the spatial settings can be configured in SIB or selected by the UE. If no CSI-RS resources are configured, a UE can transmit Msg3 PUSCH by cycling over different spatial settings.

As illustrated in FIG. 18, the method 1800 describes a procedure for a UE (such as the UE 116) to determine whether to transmit Msg3 PUSCH using different spatial settings. In step 1810, the UE receives a RAR. In step 1820, the UE determines whether there are NZP CSI-RS resources. When the UE determines that CSI-RS resources are not configured, then in step 1830, the UE transmits Msg3 PUSCH by cycling over different spatial settings. Alternatively, if the UE determines that determines that CSI-RS resources are configured, then in step 1840, the UE determines a spatial setting associated with the best channel quality, such as an RSRP, based on measurements from receptions in CSI-RS resources. Thereafter in step 1850, the UE transmits Msg3 PUSCH with the determined spatial setting.

In certain embodiments, when a gNB indicates configuration of NZP CSI-RS resources in a SIB, the gNB can also indicate whether a UE transmits Msg3 PUSCH using a spatial setting determined from measurements based on receptions in CSI-RS resources or whether the UE repeats a Msg3 PUSCH transmission by cycling over a number of spatial settings.

In certain embodiments, when a gNB indicates NZP CSI-RS resources in a SIB, a UE can also transmit Msg3 PUSCH with more than one spatial settings by repeating a Msg3 PUSCH transmission over different spatial settings. In this embodiment, the UE can determine the different spatial settings based on the measurements from receptions in the NZP CSI-RS resources. For example, a UE transmits a Msg3 PUSCH with (i) a best and a second best spatial setting (corresponding to the larger or second largest RSRP or SINR), (ii) a number of spatial settings indicated in a SIB, or (iii) a maximum number of spatial settings corresponding to the spatial settings (TCI states) of the CSI-RS resources indicated in the SIB. Alternatively, the maximum value can be determined by an indication of the number of Msg3 repetitions. For example, when a number of two repetitions for the Msg3 PUSCH transmission is indicated in the UL grant of the RAR scheduling the Msg3 PUSCH transmission or is indicated in the SIB, the UE transmits the Msg3 PUSCH with first and second spatial settings corresponding to the largest and second largest RSRP measurements that correspond to receptions in CSI-RS resources associated with the first and second spatial settings. It is also possible that a UE transmits Msg3 PUSCH with a number of repetitions determined from RSRP values of the received CSI-RS resources. For example, a UE transmits a Msg3 PUSCH with a spatial setting if a RSRP of CSI-RS resources corresponding to the spatial setting is above a threshold, wherein the threshold can be indicated by higher layers, for example in a SIB.

As illustrated in FIG. 19A, the method 1900a describes a procedure for a UE (such as the UE 116) to transmit Msg3 PUSCH with repetitions by cycling over spatial settings determined by measurements for receptions in CSI-RS resources. In step 1910, the UE is indicated NZP CSI-RS resources in a SIB. In step 1920, the UE determines spatial settings associated to best channel qualities (such as RSRP) based on measurements for receptions in the NZP CSI-RS resources. The determined number of spatial settings can be determined based on a threshold that is indicated by a SIB. In step 1930, the UE transmits the Msg3 PUSCH with repetitions using the determined spatial settings. In step 1940, the UE can include a CSI reports for the spatial settings in corresponding repetitions of the Msg3 PUSCH transmission.

As illustrated in FIG. 19B, the method 1900B describes a procedure for a UE (such as the UE 116) to estimate a path loss associated to the reception of NZP CSI-RS resources indicated in a SIB for determine a power for a Msg3 PUSCH transmission. In certain embodiments, the UE can use the path loss estimate to determine a number of repetitions for a Msg3 PUSCH transmission.

In step 1950, the UE is indicated NZP CSI-RS resources in a SIB. In step 1960, UE determines a path loss from RSRP measurements based on receptions of NZP CSI-RS resources. The path loss can be derived from RSRP measurements and information for a CSI-RS transmission power. The information for the CSI-RS transmission power can be the power or can be an offset relative to a power of a SS/PBCH block that the UE detects prior to receiving the SIB (the SIB also provides the SS/PBCH block power and the offset). In step 1970, the UE determines a spatial setting associated with the lowest path loss and a transmit power based on the lowest path loss (largest RSRP) for a Msg3 PUSCH transmission. In step 1980, the UE transmits a Msg3 PUSCH with a determined spatial setting and a determined transmit power.

In certain embodiments, a similar procedure described in FIG. 19B for Msg3 PUSCH transmission can be applied to the transmission of PRACH preambles.

Although FIGS. 18-19B illustrates the methods 1800-1900b, respectively, various changes may be made to these FIGURES. For example, while the method 1800 of FIG. 18, is shown as a series of steps, various steps could overlap, occur in parallel, occur in a different order, or occur multiple times. In another example, steps may be omitted or replaced by other steps. For example, steps of the methods 1800-1900b can be executed in a different order.

Embodiments of the present disclosure also describe reporting a channel quality associated to a spatial setting in Msg1 or MsgA. The following examples and embodiments, describe reporting a channel quality associated to a spatial setting in Msg1 or MsgA.

In certain embodiments, when a UE performs measurements for reception in NZP CSI-RS resources using different spatial settings in order to determine a spatial setting for a PRACH transmission (wherein the spatial settings can be (i) provided by a gNB in a SIB, (ii) selected by the UE, or (iii) a combination thereof) the UE can also provide a CSI report to the gNB. The UE can report a channel quality, such as an RSRP of a CSI report, associated with the best spatial setting (for example, the spatial setting resulting to the largest measured RSRP) and/or a channel quality associated with multiple spatial settings, based on measurements for receptions in the NZP CSI-RS resources. For example, a CSI report can be associated to the best and second best spatial settings (resulting to respective largest and second largest RSRP measurements). The CSI report(s) associated to one or more spatial settings can be included in a Msg1/PRACH transmission for a 4-step RA procedure (or in a MsgA transmission for a 2-step RA procedure), wherein the UE transmits the Msg1 (or the MsgA) using the best spatial setting. It is also possible that the CSI reports associated to multiple spatial settings are included in corresponding PRACH preamble transmissions. The PRACH preambles transmitted with different spatial settings can be same preamble or different preambles. The number of PRACH preamble transmissions, which can correspond to the number of CSI reports to a gNB, can be configured by higher layers, for example in a SIB.

A UE can estimate a channel quality by measuring an RSRP of SSB receptions using a spatial setting. A gNB can configure in a SIB whether a UE uses receptions of CSI-RS or SSB to determine a channel quality associated to a spatial setting. A configuration in a SIB of CSI-RS resources can be an indication to the UE to use receptions in CSI-RS resources to determine a channel quality associated to a spatial setting. A UE can also use both SSB and CSI-RS receptions, when available, to determine a channel quality associated to a spatial setting.

Embodiments of the present disclosure also describe PRACH preamble transmission. The following examples and embodiments, such as those described in FIGS. 20-26, describe procedures for PRACH preamble transmission.

Figure 20:
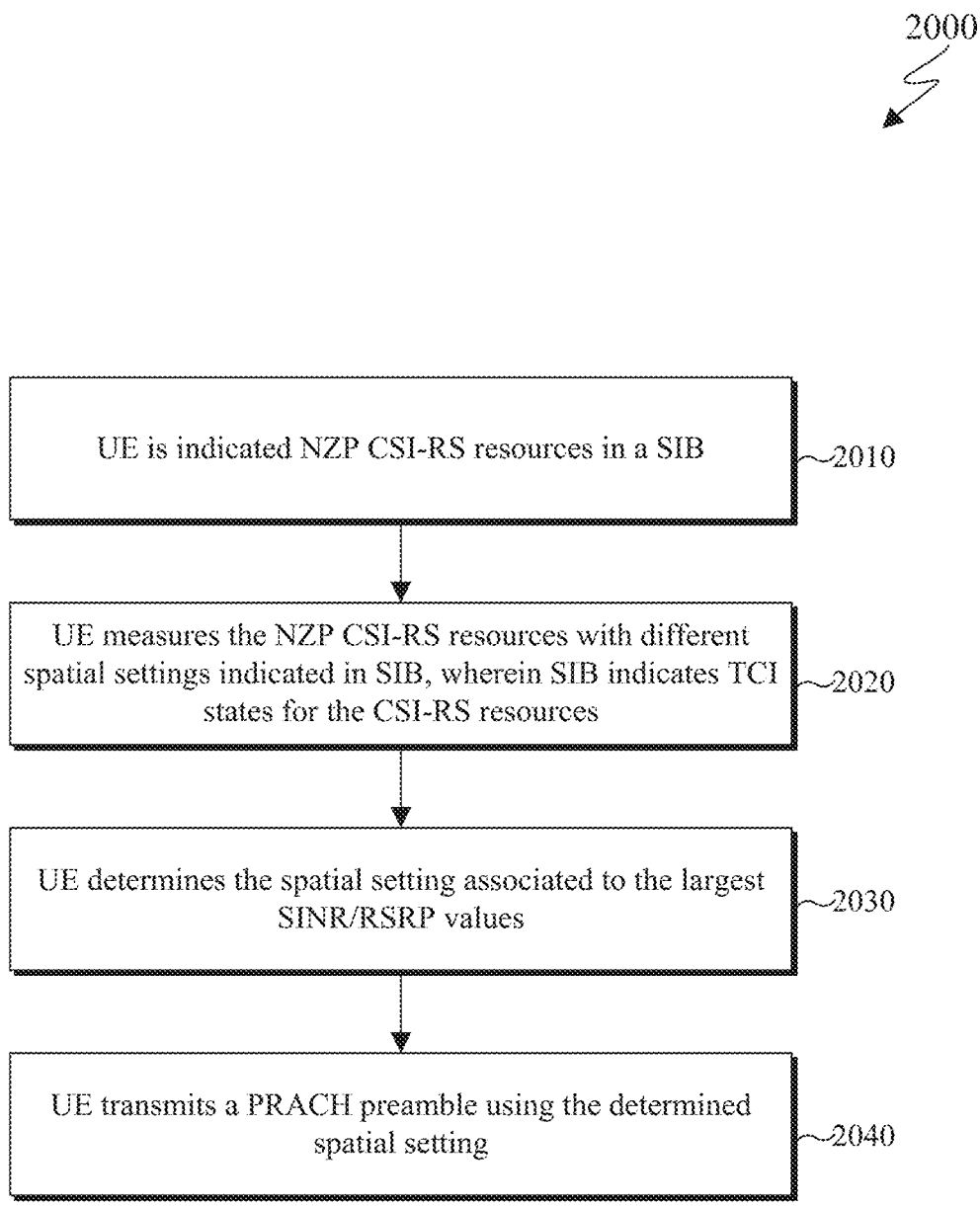
FIG. 20 illustrates an example method for a UE to estimate path loss associated with the reception of a non-zero power (NZP) CSI-RS resources indicated in a SIB for determining a power for a PRACH transmission according to embodiments of the present disclosure.
Figure 21:
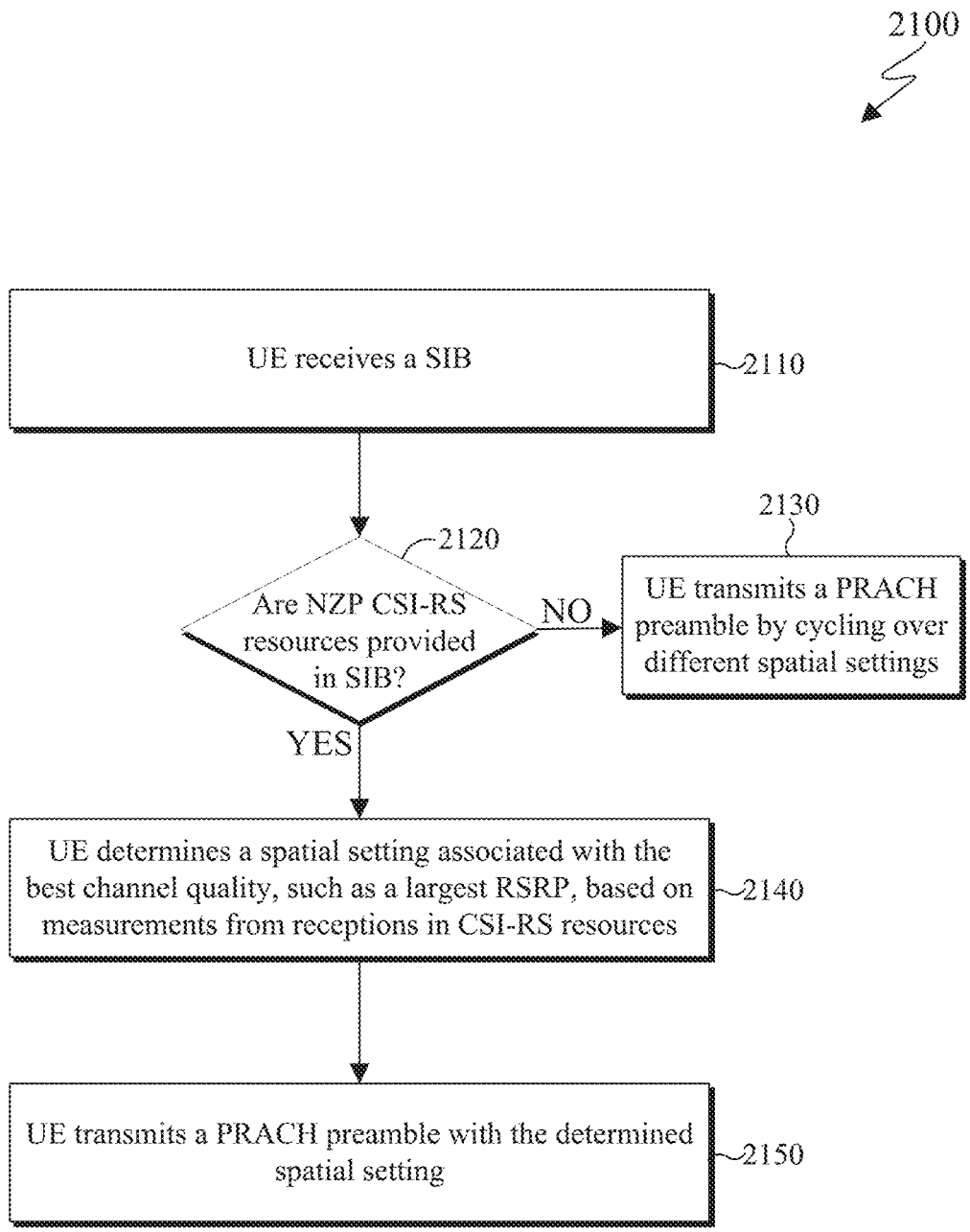
FIG. 21 illustrates an example method for a UE to (i) transmit a PRACH preamble with a spatial setting determined form measurements of receptions in CSI-RS resources or (ii) transmit a PRACH preamble by cycling over different spatial settings according to embodiments of the present disclosure.
Figure 22:
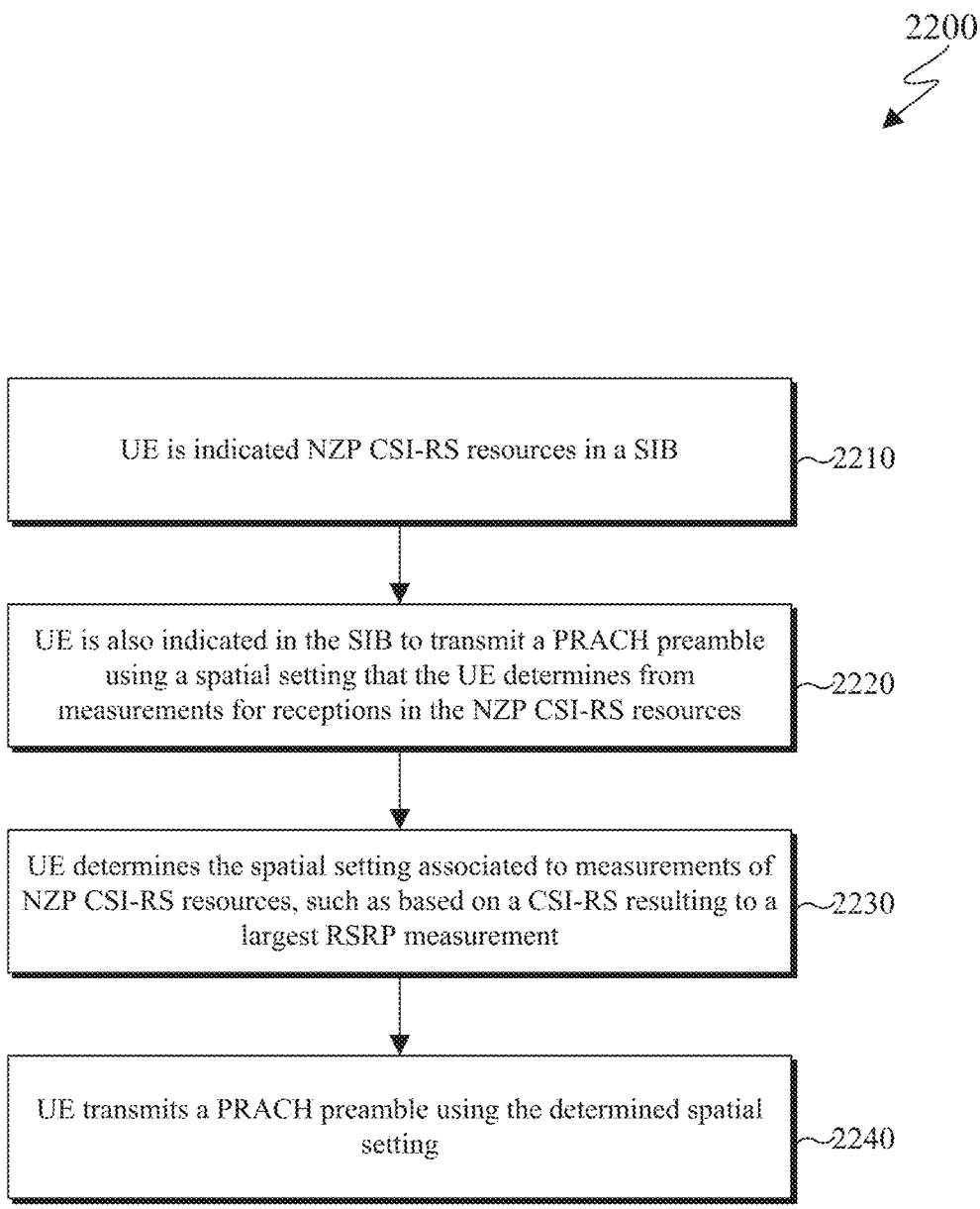
FIG. 22 illustrates an example method for a UE to transmit a PRACH preamble based on an indication in SIB for transmitting a PRACH preamble using a spatial setting that the UE determines from measurements for receptions in the NZP CSI-RS resources according to embodiments of the present disclosure.
Figure 23:
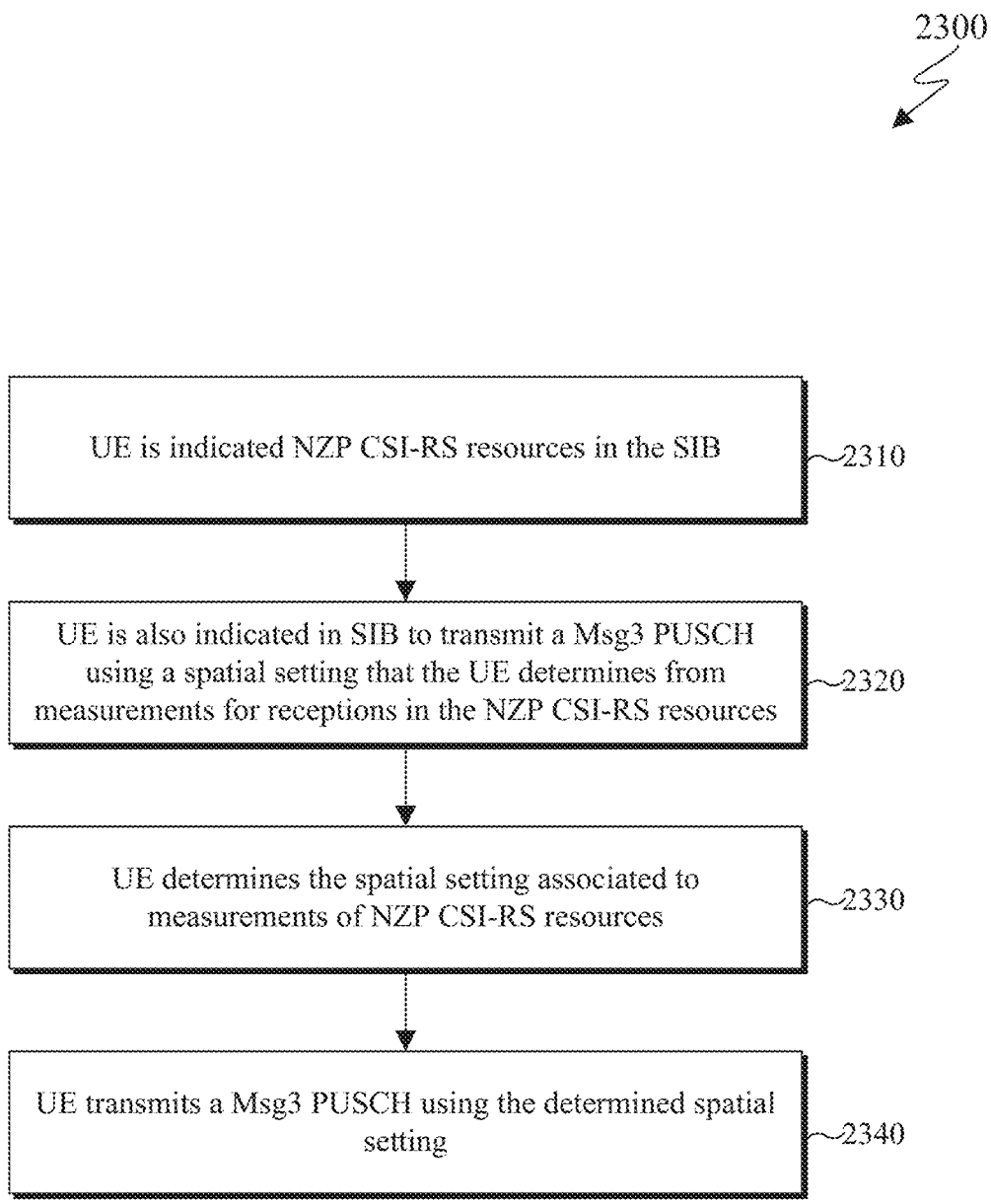
FIG. 23 illustrates an example method for a UE to transmit a PRACH preamble based on an indication in SIB to transmit a Msg3 PUSCH using a spatial setting that the UE determines from measurements for receptions in the NZP CSI-RS resources according to embodiments of the present disclosure.
Figure 24:
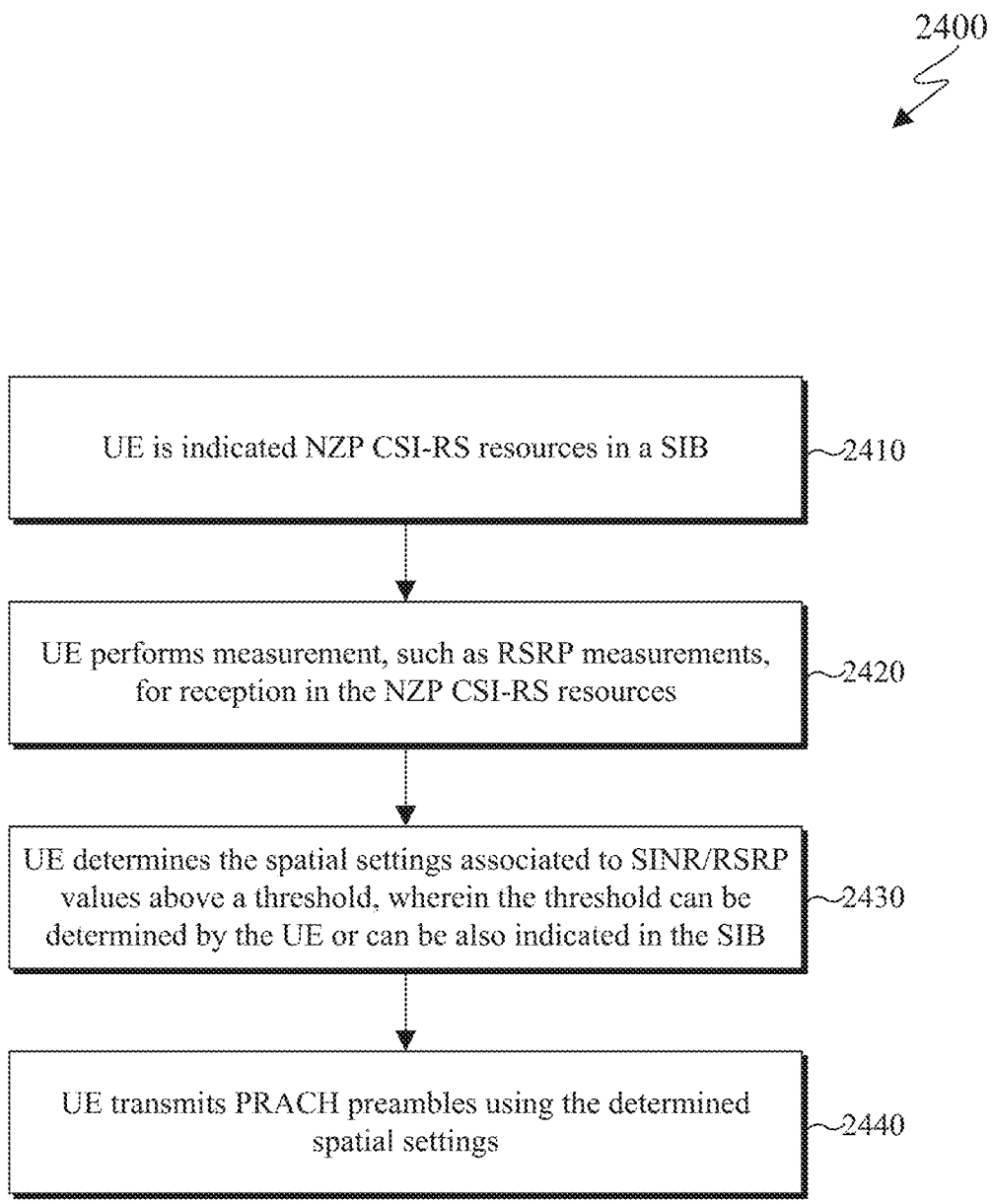
FIG. 24 illustrates an example method for a UE to transmit PRACH preambles with different spatial settings that the UE determines from measurements of receptions in CSI-RS resources according to embodiments of the present disclosure.
Figure 25:
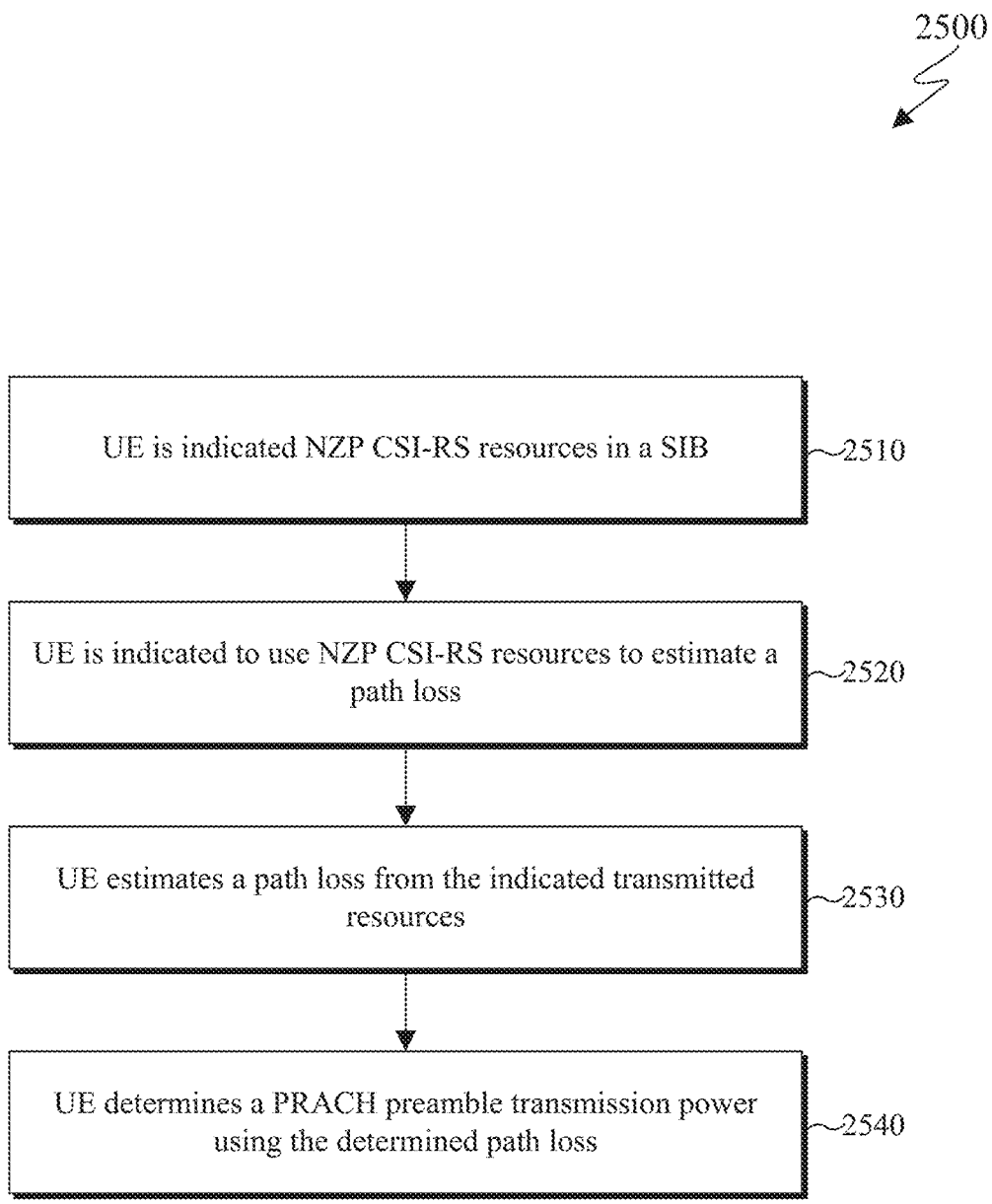
FIG. 25 illustrates an example method for a UE to transmit a PRACH preamble based on an indication in a SIB whether the UE uses a path loss estimate from synchronization signal physical broadcast channel block (SSB) resources or from CSI-RS resources according to embodiments of the present disclosure.
Figure 26:
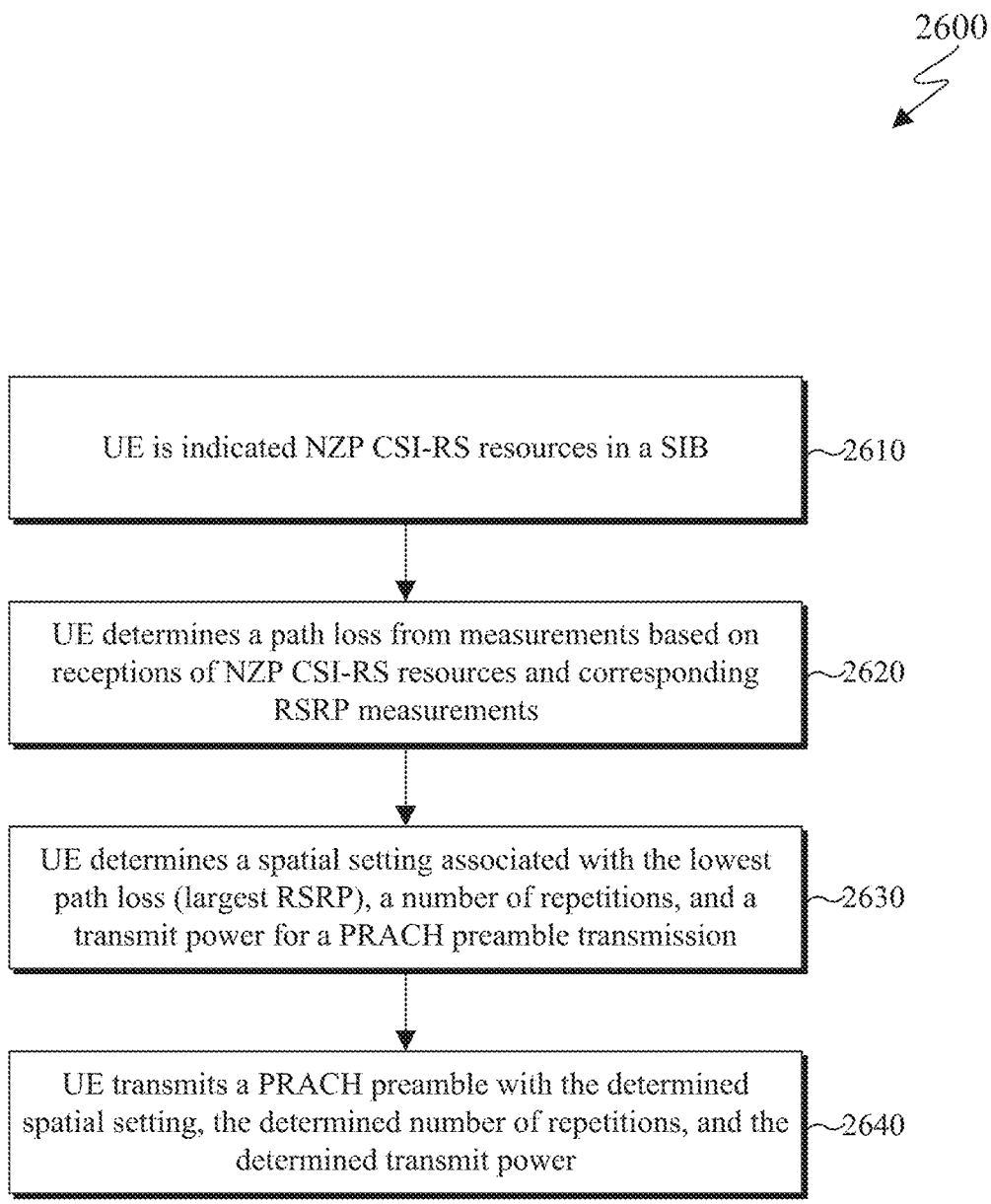
FIG. 26 illustrates an example method for a UE to estimate a path loss associated to the reception of NZP CSI-RS resources indicated in a SIB according to embodiments of the present disclosure.

FIG. 20 illustrates an example method 2000 for a UE to estimate path loss associated with the reception of a non-zero power (NZP) CSI-RS resources indicated in a SIB for determining a power for a PRACH transmission according to embodiments of the present disclosure. FIG. 21 illustrates an example method 2100 for a UE to (i) transmit a PRACH preamble with a spatial setting determined form measurements of receptions in CSI-RS resources or (ii) transmit a PRACH preamble by cycling over different spatial settings according to embodiments of the present disclosure. FIG. 22 illustrates an example method 2200 for a UE to transmit a PRACH preamble based on an indication in SIB for transmitting a PRACH preamble using a spatial setting that the UE determines from measurements for receptions in the NZP CSI-RS resources according to embodiments of the present disclosure. FIG. 23 illustrates an example method 2300 for a UE to transmit a PRACH preamble based on an indication in SIB to transmit a Msg3 PUSCH using a spatial setting that the UE determines from measurements for receptions in the NZP CSI-RS resources according to embodiments of the present disclosure. FIG. 24 illustrates an example method 2400 for a UE to transmit PRACH preambles with different spatial settings that the UE determines from measurements of receptions in CSI-RS resources according to embodiments of the present disclosure. FIG. 25 illustrates an example method 2500 for a UE to transmit a PRACH preamble based on an indication in a SIB whether the UE uses a path loss estimate from synchronization signal physical broadcast channel block (SSB) resources or from CSI-RS resources according to embodiments of the present disclosure. FIG. 26 illustrates an example method 2600 for a UE to estimate a path loss associated to the reception of NZP CSI-RS resources indicated in a SIB according to embodiments of the present disclosure.

The steps of the methods 2000-2600 can be performed by any of the UEs 111-116 of FIG. 1, such as the UE 116 of FIG. 3. The methods 2000-2600 of FIGS. 20-26 are for illustration only and other embodiments can be used without departing from the scope of the present disclosure.

In certain embodiments, when a gNB (such as the BS 102) indicates NZP CSI-RS resources in a SIB, a UE (such as the UE 116) determines a channel quality associated with different spatial settings by performing measurements based on receptions in the NZP CSI-RS resources. After determining a channel quality, the UE transmits a PRACH preamble with the best spatial setting (the one resulting to the largest RSRP), The spatial settings included in the PRACH preamble can be indicated in the SIB. For example through an indication of TCI states for the CSI-RS resources or selected by the UE. If NZP CSI-RS resources are not indicated by the SIB, a UE can transmit a PRACH preamble by cycling over different spatial settings that are determined by the UE.

As illustrated in FIG. 20, the method 2000 describes a procedure for a UE (such as the UE 116) to estimate a path loss associated to the reception of NZP CSI-RS resources indicated in a SIB to be used for determining a power for a PRACH transmission. In certain embodiments, the UE can use the path loss estimate to determine a number of repetitions for a PRACH transmission.

In step 2010, the UE is indicated NZP CSI-RS resources in a SIB. In step 1020, the UE determines a path loss from RSRP measurements based on receptions of NZP CSI-RS resources. For example, the UE can determine the path loss can be from RSRP measurements and information for a CSI-RS transmission power. Additionally, the information for the CSI-RS transmission power can be the power or can be an offset relative to a power of a SS/PBCH block that the UE detects prior to receiving the SIB (the SIB also provides the SS/PBCH block power and the offset). In step 2030, the UE determines a spatial setting associated with the lowest path loss and a transmit power based on the lowest path loss (largest RSRP) for a PRACH transmission. In step 2040, the UE transmits a PRACH with a determined spatial setting and a determined transmit power.

As illustrated in FIG. 21, the method 2100 describes a procedure for a UE (such as the UE 116) to transmit either (i) a PRACH preamble with a spatial setting determined from measurements of receptions in CSI-RS resources or (ii) a PRACH preamble by cycling over different spatial settings (that are determined by the UE).

In step 2110, the UE receives a SIB. In step 2120, the UE determines whether NZP CSI-RS resources are provided in the received SIB. When NZP CSI-RS resources are not provided in the SIB, then in step 2130, the UE transmits a PRACH preamble by cycling over different spatial settings determined by the UE. Alternatively, when NZP CSI-RS resources are provided in the SIB, then in step 2140, the UE determines a spatial setting associated with the best channel quality (such as a largest RSRP) based on measurements from receptions in CSI-RS resources (such as described above in FIG. 20). Thereafter, in step 2150, the UE transmits a PRACH preamble with the determined spatial setting.

In certain embodiments, it is possible that the UE fails to detect CSI-RS resources. In this embodiment, the UE transmits a PRACH preamble by cycling over different spatial settings determined by the UE as described in step 2130, above.

In certain embodiments, when a gNB (such as the BS 102) indicates NZP CSI-RS resources in a SIB, the gNB also indicates in the SIB whether a UE transmits a PRACH preamble using a spatial setting that the UE determines from measurements for receptions in the NZP CSI-RS resources (such as the spatial setting corresponding to a measured RSRP with largest value). Alternatively, when the gNB indicates NZP CSI-RS resources in a SIB, the gNB also indicates in the SIB whether the UE repeats a PRACH preamble transmission over a number of spatial settings.

In certain embodiments, the indication in SIB is for the transmission of a PRACH preamble, and the transmission of a Msg3 PUSCH, if present, can be done with the same spatial setting determined by the UE for a PRACH preamble transmission. In certain embodiments, a gNB indicates in the SIB whether a UE transmits Msg3 PUSCH using (i) a spatial setting that the UE determines from measurements for receptions in the NZP CSI-RS or (ii) the same spatial setting as used for a PRACH transmission associated with the Msg3 PUSCH transmission. If the gNB indicates in the SIB to use CSI-RS measurements to (i) determine a PRACH preamble transmission and (ii) determine a Msg3 PUSCH transmission, then UE can perform measurements before PRACH transmission and before Msg3 PUSCH transmission. In the latter case, the UE would start the measurements after reception of a RAR message and a spatial setting for the Msg3 PUSCH transmission can be different than a spatial setting for the corresponding PRACH transmission.

As illustrated in FIG. 22, the method 2200 describes a procedure for a UE (such as the UE 116) to UE to transmit a PRACH preamble based on an indication in SIB for transmitting a PRACH preamble using a spatial setting that the UE determines from measurements for receptions in the NZP CSI-RS resources.

In step 2210, the UE is indicated NZP CSI-RS resources in a SIB. In step 2220, the UE is also indicated in the SIB to transmit a PRACH preamble using a spatial setting that the UE determines from measurements for receptions in the NZP CSI-RS resources. In step 2230, the UE determines the spatial setting associated to measurements of NZP CSI-RS resources. For example the determined spatial setting associated to measurements of NZP CSI-RS resources can be based on a CSI-RS resulting to a largest RSRP measurement. In step 2240, the UE transmits a PRACH preamble using the determined spatial setting.

As illustrated in FIG. 23, the method 2300 describes a procedure for a UE (such as the UE 116) to transmit a PRACH preamble based on an indication in SIB to transmit a Msg3 PUSCH using a spatial setting that the UE determines from measurements for receptions in the NZP CSI-RS resources.

In step 2310, the UE is indicated NZP CSI-RS resources in a SIB. In step 2320, the UE is also indicated in the SIB to transmit a Msg3 PUSCH using a spatial setting that the UE determines from measurements for receptions in the NZP CSI-RS resources. In step 2330, the UE determines the spatial setting associated to measurements of NZP CSI-RS resources. In step 2340, the UE transmits a Msg3 PUSCH using the determined spatial setting.

In certain embodiments, the indications in SIB described above in FIGS. 22 and 23 can be a same indication for both PRACH preamble transmission and Msg3 PUSCH transmission. Alternatively, the indications in SIB described above in FIGS. 22 and 23 can be different indications.

In certain embodiments, for PRACH preamble transmission, the indication can be whether the UE transmits a PRACH preamble with a number of repetitions using a same spatial setting or repeats a PRACH preamble over multiple spatial settings. In this embodiment, one or more spatial settings are determined by the UE from measurements for receptions in the NZP CSI-RS resources. This indication is an alternative to the indication described above (which describe whether (i) the UE transmits a PRACH preamble using a spatial setting that the UE determines from measurements for receptions in the NZP CSI-RS resources or (ii) the UE repeats a PRACH preamble transmission over a number of spatial settings).

In certain embodiments, for Msg3 PUSCH transmission, the indication can be whether the UE transmits a Msg3 PUSCH with a number of repetitions using a same spatial setting or repeats a Msg3 PUSCH over multiple spatial settings. In this embodiment, the UE determines the one or more spatial settings from measurements for receptions in the NZP CSI-RS resources. This indication is an alternative to the indication described above (which describe whether (i) a UE transmits a Msg3 PUSCH using a spatial setting that the UE determines from measurements for receptions in the NZP CSI-RS resources or (ii) the UE uses a same spatial setting used for PRACH preamble transmission).

In certain embodiments, when a gNB indicates NZP CSI-RS resources in a SIB, a UE also transmit PRACH preambles with more than one spatial settings. For example, the UE can transmit the same preamble or a different preambles over different spatial settings. It is noted that the UE can determine the different spatial settings based on measurements for receptions in the NZP CSI-RS resources. For example, a UE transmits a PRACH preamble with a spatial setting if a corresponding RSRP for NZP CSI-RS resources associated with the spatial setting is above a threshold. The threshold can be indicated by higher layers. For example the threshold can eb indicated in the SIB.

For example, as illustrated in FIG. 24, the method 2400 describes a procedure for a UE (such as the UE 116) to transmit PRACH preambles with different spatial settings that the UE determines from measurements of receptions in CSI-RS resources.

In step 2410, the UE is indicated NZP CSI-RS resources in a SIB. In step 2420, the UE performs measurement (such as RSRP measurements) for reception in the NZP CSI-RS resources. In step 2430, the UE determines spatial settings associated to RSRP values above a threshold. The threshold can be determined by the UE or can be indicated in the SIB. In step 2440, the UE transmits PRACH preambles using the determined spatial settings.

In certain embodiments, a UE can also estimate a channel quality by measuring an RSRP corresponding to SSB receptions. A gNB can configure in a SIB whether a UE uses receptions of NZP CSI-RS resources or of SSBs to determine a channel quality associated to a spatial setting. The channel quality can be a RSRP value of a path loss estimate value.

As illustrated in FIG. 25, the method 2500 describes a procedure for a UE (such as the UE 116) to transmit a PRACH preamble based on an indication in a SIB whether a UE uses a path loss estimate from SSB resources or from NZP CSI-RS resources.

In step 2510, the UE is indicated NZP CSI-RS resources in a SIB. In step 2520, the UE is indicated to use NZP CSI-RS resources to estimate a path loss. In step 2330, the UE estimates a path loss from the indicated transmitted resources. Then in step 2540, the UE determines a PRACH preamble transmission power using the determined path loss (of step 2530).

As illustrated in FIG. 26, the method 2600 describes a procedure for a UE (such as the UE 116) to estimate a path loss associated to the reception of NZP CSI-RS resources indicated in a SIB.

In step 2610, the UE is indicated NZP CSI-RS resources in a SIB. In step 2620, the UE determines a path loss from measurements based on receptions of NZP CSI-RS resources and corresponding RSRP measurements. In step 2630, the UE determines (i) a spatial setting associated with the lowest path loss (largest RSRP), (ii) a number of repetitions, and (iii) a transmit power for a PRACH preamble transmission. Then in step 2640, the UE transmits a PRACH preamble with (i) the determined spatial setting, (ii) the determined number of repetitions, and (iii) the determined power.

Although FIGS. 20-26 illustrates the methods 2000-2600, respectively, various changes may be made to these FIGURES. For example, while the method 2000 of FIG. 20, is shown as a series of steps, various steps could overlap, occur in parallel, occur in a different order, or occur multiple times. In another example, steps may be omitted or replaced by other steps. For example, steps of the methods 2000-2600 can be executed in a different order.

Embodiments of the present disclosure also describe determining transmit power for PRACH transmission from path loss estimated from NZP CSI-RS resources. The following examples and embodiments describe procedures for determining transmit power for PRACH transmission from path loss estimated from NZP CSI-RS resources.

In certain embodiments, a UE determines a transmission power for a physical random access channel (PRACH), $P_{PRACH,b,f,c}(i)$, on active UL BWP b of carrier f of serving cell c based on DL RS for serving cell c in transmission occasion i as:

$$P_{PRACH,f,c}(i) = \min\{P_{CMAX,f,c}(i), P_{PRACH target,f,c} + PL_{b,f,c}\}[dB\ m] \quad (1)$$

In Equation (1), above, $P_{CMAX,f,c}(i)$ is the UE configured maximum output power as defined in [3GPP TS 38.101-1], [3GPP TS 38.101-2] and [3GPP TS 38.101-3] for carrier f of serving cell c within transmission occasion i. The expression $P_{PRACH,target,f,c}$ is the PRACH target reception power PREAMBLE_RECEIVED_TARGET_POWER provided by higher layers [3GPP TS 38.321] for the active UL BWP b of carrier f of serving cell c, Additionally, the expression $PL_{b,f,c}$ is a pathloss for the active UL BWP b of carrier f based on the DL RS associated with the PRACH transmission on the active DL BWP of serving cell c. The expression $PL_{b,f,c}$ is calculated by the UE in dB as referenceSignalPower—higher layer filtered RSRP in dBm, where RSRP is defined in [3GPP TS 38.215] and the higher layer filter configuration is defined in [3GPP TS 38.331].

In certain embodiments, if the active DL BWP is the initial DL BWP and for SS/PBCH block and CORESET multiplexing pattern 2 or 3, as described in Clause 13 in [3GPP TS 38.213], then the UE determines $PL_{b,f,c}$ based on the SS/PBCH block associated with the PRACH transmission or based on the NZP CSI-RS resources configured by a gNB in a SIB.

In certain embodiments, if a PRACH transmission from a UE is (i) not in response to a detection of a PDCCH order by the UE, (ii) in response to a detection of a PDCCH order by the UE that triggers a contention based random access procedure, (iii) associated with a link recovery procedure where a corresponding index $q_{new}$ is associated with a SS/PBCH block, or (iv) associated to resources for a CSI-RS reception configured by a gNB in a SIB, as described in Clause 6 of [TS 38.213], then the referenceSignalPower is provided by ss-PBCH-BlockPower.

In certain embodiments, if a PRACH transmission from a UE is in response to a detection of a PDCCH order by the UE that triggers a contention-free random access procedure and depending on the DL RS that the DM-RS of the PDCCH order is quasi-collocated with as described in Clause 10.1 in [3GPP TS 38.213], then the referenceSignalPower is provided by ss-PBCH-BlockPower. Alternatively, if the UE is configured resources for a periodic CSI-RS reception or the PRACH transmission is associated with a link recovery procedure where a corresponding index $q_{new}$ is associated with a periodic CSI-RS configuration as described in Clause 6 in [3GPP TS 38.213], then the referenceSignalPower is obtained by ss-PBCH-BlockPower and powerControlOffsetSS where powerControlOffsetSS provides an offset of CSI-RS transmission power relative to SS/PBCH block transmission power [3GPP TS 38.214]. If powerControlOffsetSS is not provided to the UE, then the UE assumes an offset of 0 dB. If the active TCI state for the PDCCH that provides the PDCCH order includes two RS, then the UE expects that one RS has QCL-TypeD properties, and the UE uses the one RS when applying a value provided by powerControlOffsetSS.

In certain embodiments, if within a random access response window, as described in Clause 8.2 in [3GPP TS 38.213], the UE does not receive a random access response that contains a preamble identifier corresponding to the preamble sequence transmitted by the UE, then the UE determines a transmission power for a subsequent PRACH transmission, if any, as described in [3GPP TS 38.321].The UE can determine the path loss based on the SS/PBCH block associated with the PRACH transmission or based on the NZP CSI-RS resources configured by a gNB in a SIB.

In certain embodiments, if prior to a PRACH retransmission, a UE changes the spatial domain transmission filter, based on (i) the determination of a new spatial setting from the SS/PBCH block associated with the PRACH transmission or (ii) the NZP CSI-RS resources configured by a gNB in a SIB, then Layer 1 notifies higher layers to suspend the power ramping counter as described in [3GPP TS 38.321].

Embodiments of the present disclosure also describe determining transmit power for PRACH preambles transmitted by cycling over different spatial settings. The following examples and embodiments, such as those described in FIG. 27, describe procedures for determining transmit power for PRACH preambles transmitted by cycling over different spatial settings.

Figure 27:
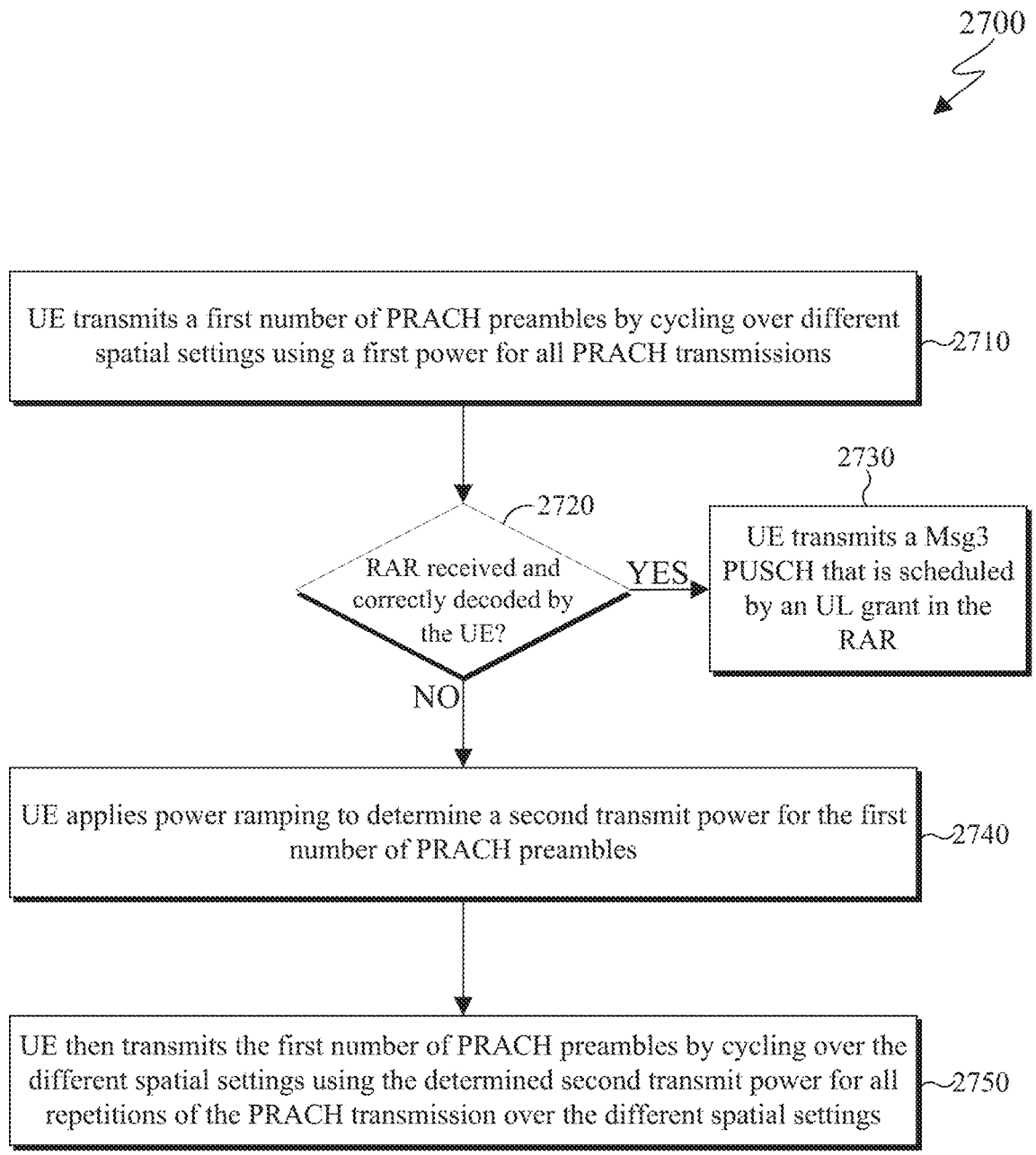
FIG. 27 illustrates an example method for a UE to estimate a path loss associated to the reception of NZP CSI-RS resources indicated in a SIG according to embodiments of the present disclosure.

FIG. 27 illustrates an example method 2700 for a UE to estimate a path loss associated to the reception of NZP CSI-RS resources indicated in a SIG according to embodiments of the present disclosure. The steps of the method 2700 can be performed by any of the UEs 111-116 of FIG. 1, such as the UE 116 of FIG. 3. The method 2700 of FIG. 27 is for illustration only and other embodiments can be used without departing from the scope of the present disclosure.

Referring to the procedure described in FIG. 27, above, a UE either (i) transmits a PRACH preamble with a spatial setting (wherein the spatial setting can be determined from measurements of receptions in NZP CSI-RS resources, if configured), or (ii) transmits a PRACH preamble by cycling over different spatial settings. The UE can determine a power for a PRACH transmission based on whether or not PRACH preambles are transmitted by cycling over different spatial settings. For example, when the UE transmits a number of PRACH preambles by cycling over different spatial settings before a RAR reception for the number of PRACH preambles, all transmissions can be within the same power, while when the UE transmits PRACH preambles after corresponding RAR receptions (with incorrect decoding), the UE applies power ramping for transmission of PRACH preambles associated with different RAR receptions.

As illustrated in FIG. 27, the method 2700 describes a procedure for a UE (such as the UE 116) to estimate a path loss associated to the reception of NZP CSI-RS resources indicated in a SIB.

In step 2710, the UE transmits a first number of PRACH preambles by cycling over different spatial settings using a first power for all PRACH transmissions. A second number of one or more PRACH preambles can be transmitted with each spatial setting from the different spatial settings. The second number can be indicated in a SIB or determined by the UE. For example, the second number can be a ratio of a total number of repetitions for a PRACH preamble transmission and a number of spatial settings to be used for the PRACH preamble transmission. In step 2720, the UE determines whether RAR is received and is correctly decoded.

When the UE receives and correctly decodes a RAR, then in step 2730, the UE transmits a Msg3 PUSCH that is scheduled by an UL grant in the RAR. Alternatively, if the RAR was not received or incorrectly decoded, the UE in step 2740, applies power ramping to determine a second transmit power for the first number of PRACH preambles. Then in step 2750, the UE transmits the first number of PRACH preambles by cycling over the different spatial settings using the determined second transmit power for all repetitions of the PRACH transmission over the different spatial settings.

Although FIG. 27 illustrates the method 2700, various changes may be made to these FIGURES. For example, while the method 2700 of FIG. 27 is shown as a series of steps, various steps could overlap, occur in parallel, occur in a different order, or occur multiple times. In another example, steps may be omitted or replaced by other steps. For example, steps of the method 2700 can be executed in a different order.

In order to improve UL resource allocation and reduce a UCI reporting latency, embodiments of the present disclosure consider enabling multiple repetitions of a PUCCH transmission in a slot or across slots in order to improve utilization of available resources and reduce a time required for completing a number of repetitions. Depending on a minimum number of symbols that can be used for a repetition of a PUCCH transmission, a PUCCH format can be same for all repetitions or can vary among repetitions. Moreover, it is beneficial to avoid dropping a PUSCH transmission when the PUSCH transmission overlaps with a repetition of a PUCCH transmission as it can be possible to multiplex the UCI information in the PUSCH transmission. Accordingly, there is a need to provide means for determining symbols for a number of repetitions of a PUCCH transmission over a number of slots. There is another need to provide signaling mechanisms to indicate a number of repetitions and a number of symbols per repetition for a PUCCH transmission or a total number of symbols for a PUCCH transmission. There is yet and additional need to define a UE behavior when repetitions of transmissions from the UE overlap in time. Although various embodiments are described for repetitions of a PUCCH transmission, these embodiments are also generally applicable for repetitions of a PUSCH transmission.

According to embodiments of the present disclosure a UE (such as the UE 116) can multiplex UCI in a PUCCH using different formats. A PUCCH transmission using PUCCH formats 0 and 2 is over at most 2 OFDM symbols, while a PUCCH transmission using PUCCH formats 1, 3, or 4 is over from 4 to 14 symbols. PUCCH formats with longer duration (number of symbols) are used for enhanced coverage. When a number of symbols in a slot are not sufficient for coverage, repetitions of a PUCCH transmission can apply to enhance coverage.

For example, a PUCCH transmission can be repeated over a number of slots. The repetition of the PUCCH transmission per slot starts from a same symbol in a slot and is over a same number of consecutive symbols in the slot. When (i) there are not enough available symbols in a slot for a repetition of the PUCCH transmission, (ii) the repetition cannot start from a configured or indicated first symbol, or (iii) the repetition cannot occur in consecutive symbols of a slot, then the UE does not transmit the PUCCH repetition in that slot. In such scenarios, either the UCI reception reliability is degraded when the UE does not transmit all configured repetitions of a PUCCH transmission or, when the UE postpones to a next slot a repetition of a PUCCH transmission that the UE cannot transmit in a current slot, the completion of the PUCCH transmission with repetitions requires a longer time, thereby causing a longer latency. Also, an efficiency of UL resource allocation can be affected because some symbols that are available for UL transmission in a slot may not be used for a repetition of the PUCCH transmission due to the aforementioned reasons. It is also possible that there are enough available symbols for more than one repetition of a PUCCH transmission in a slot, but the UE is restricted to transmit only one repetition of a PUCCH transmission per slot.

Figure 28:
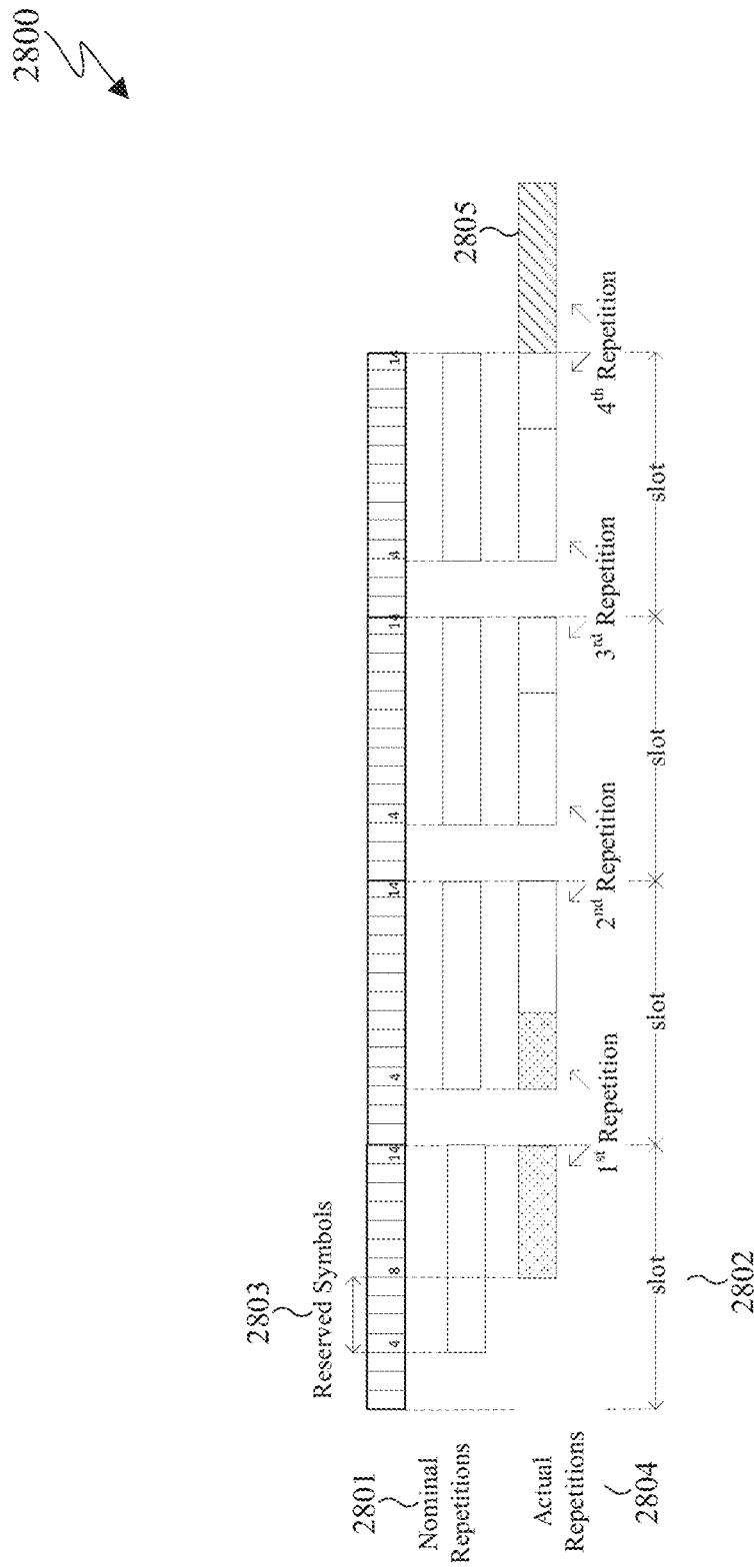
FIG. 28 illustrates an example diagram of a PUCCH with a number of repetitions over a number of slots according to embodiments of the present disclosure.
Figure 29:
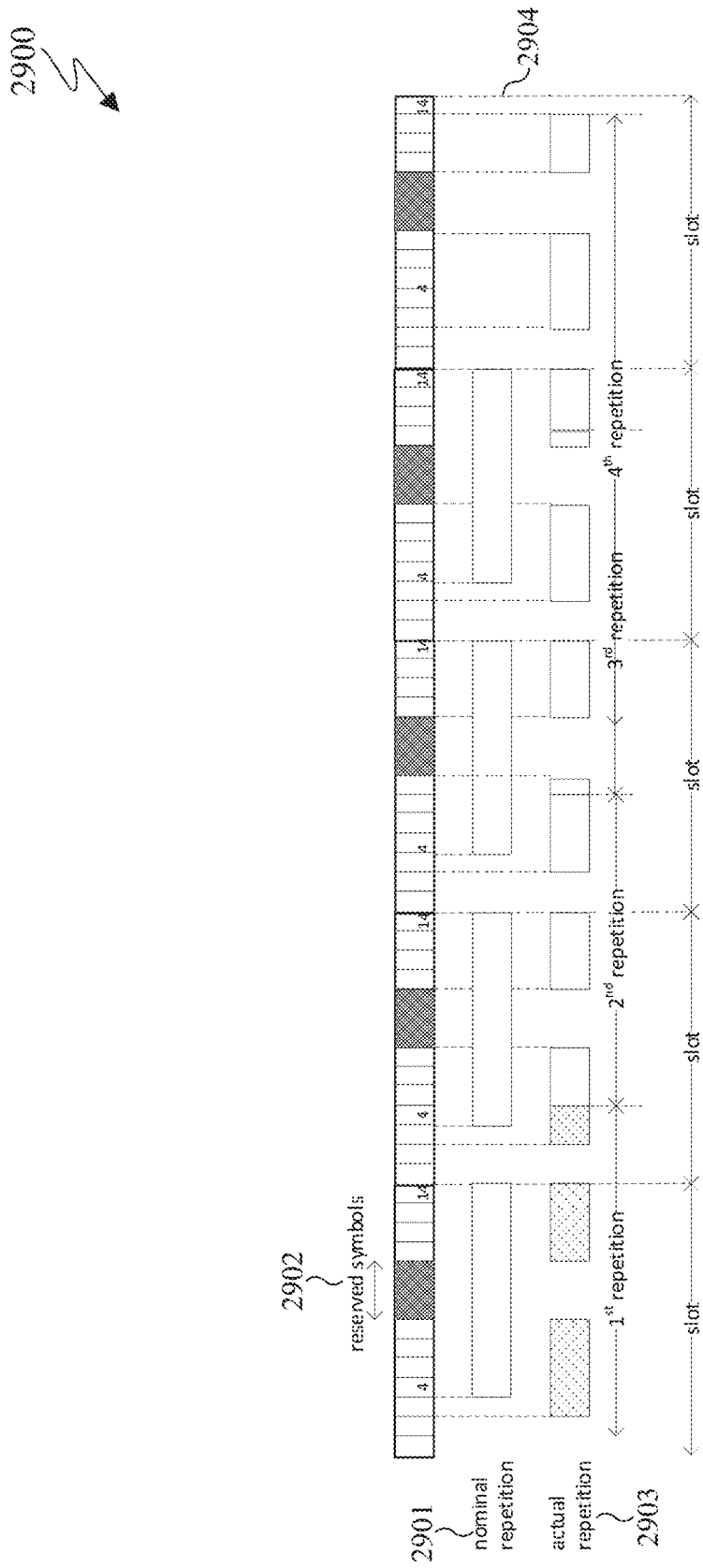
FIG. 29 illustrates an example diagram of a PUCCH with a number of repetitions over a number of slots according to embodiments of the present disclosure.
Figure 30A:
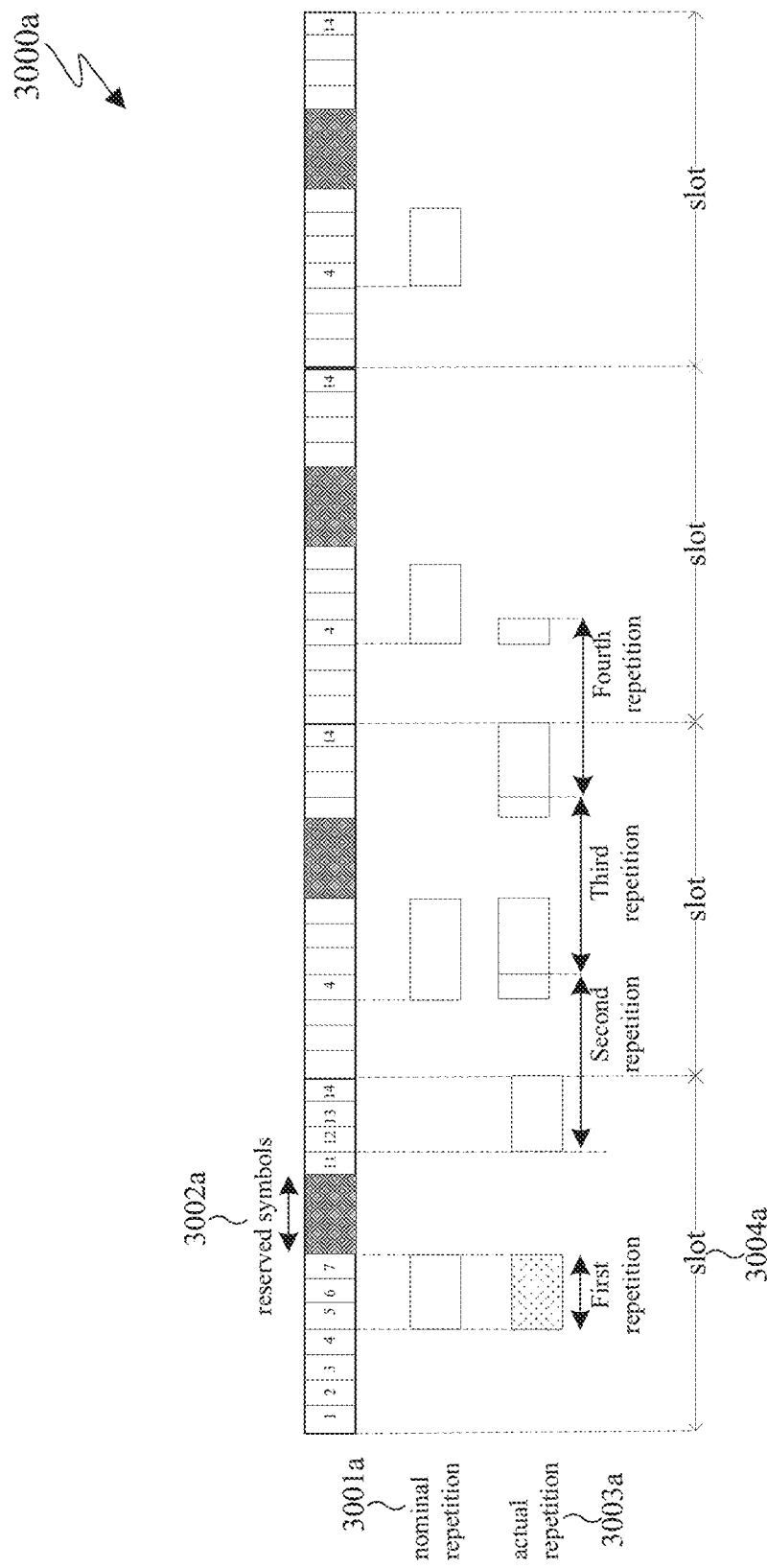
FIGS. 30A, 30B, and 30C illustrates an example diagram of a PUCCH with a number of repetitions over a number of slots according to embodiments of the present disclosure.
Figure 30B:
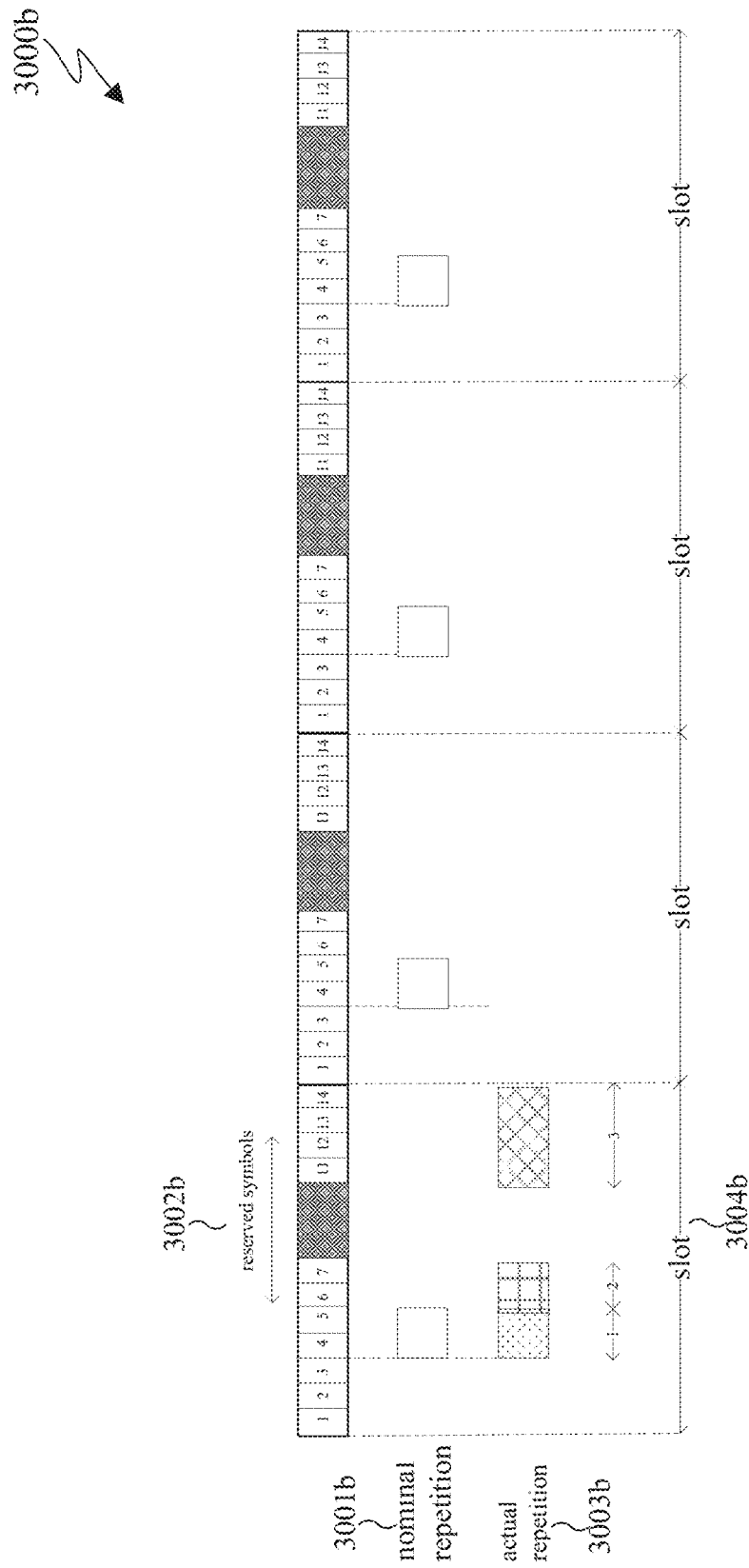
Figure 30C:
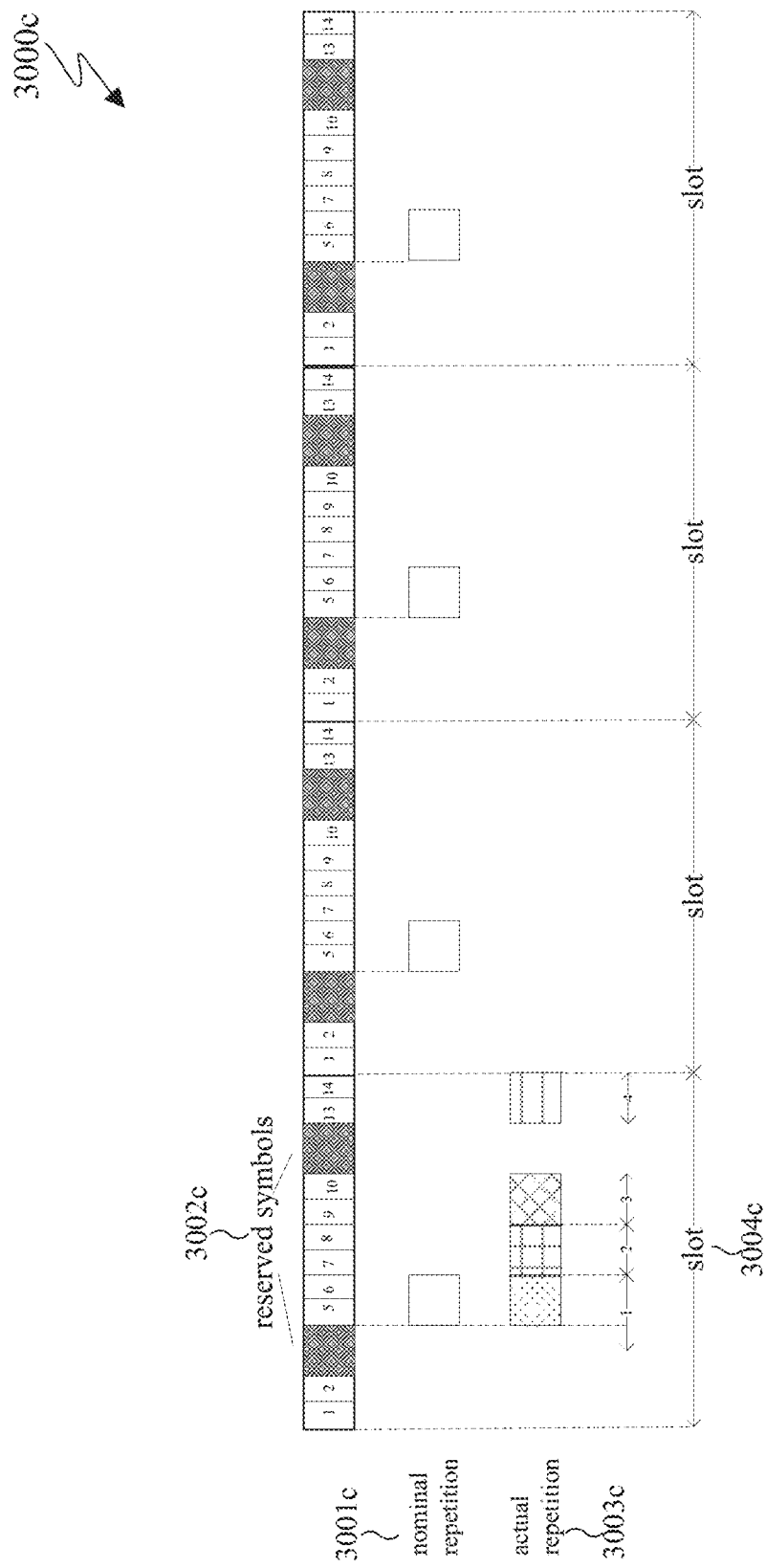

FIG. 28 illustrates an example diagram 2800 of a PUCCH with a number of repetitions over a number of slots according to embodiments of the present disclosure. FIG. 29 illustrates an example diagram 2900 of a PUCCH with a number of repetitions over a number of slots according to embodiments of the present disclosure. FIGS. 30A, 30B, and 30C illustrates an example diagram 3000a, 3000b, and 3000c, respectively, of a PUCCH with a number of repetitions over a number of slots according to embodiments of the present disclosure.

In certain embodiments, it is beneficial for a PUCCH transmission with repetitions to support more than one repetition within a slot. Each repetition is over a same number of symbols or, at least for UCI encoding using repetition coding or Reed-Mueller coding such as when a UCI payload is less than 12 bits, over different numbers of symbols as combining of corresponding receptions is then meaningful. This is because a maximum number of symbols for a PUCCH repetition is limited by the number of symbols per slot and that maximum number is often smaller than an available number of symbols in a slot for a repetition of a PUCCH transmission.

A PUCCH transmission that can be repeated more than once in a slot is referred to as a PUCCH transmission with Type-B repetitions. For example, for a UE configured with a number of repetitions, $N_{PUCCH}^{repeat}$, for a PUCCH transmission, if each repetition of the PUCCH transmission is over L=4 symbols and most of the symbols in a slot can be used for UL transmission, repeating the PUCCH transmission over the indicated $N_{PUCCH}^{repeat}$ slots increases unnecessarily a latency of the transmission while reducing resource utilization because a value of L that is larger than 4 would be more appropriate. Conversely, if each repetition of the PUCCH transmission is over L=12 symbols, it is likely that several repetitions of the PUCCH transmission would have to be dropped or postponed by a UE as only a small percentage of slots may have 12 or more consecutive UL or flexible symbols. Configuring a small number of symbols per repetition and allowing PUCCH repetitions within a slot would improve resource utilization and reduce latency. Further, allowing repetitions of a PUCCH transmission over different numbers of symbols would also improve resource utilization and reduce latency. A UE can be configured whether or not to use different numbers of symbols for different repetitions, that is, the UE can be configured whether to use Type-A PUCCH repetitions where there can be at most one repetition per slot over same symbols in a slot or to use Type-B PUCCH repetitions where a number of symbols can vary among repetitions or there can be more than one repetition per slot.

Type-B PUCCH repetitions of a PUCCH transmission that use a same number of symbols (where the number of symbols is provided by higher layers or is indicated by a DCI format) is referred to as nominal repetitions. Repetitions of a PUCCH transmission that use different number of symbols (depending on a number of available consecutive symbols for a repetition in a slot) is referred to as actual repetitions. Multiple (typically two) repetitions of a PUCCH transmission in a slot can be supported with both nominal and actual repetitions of a PUCCH transmission.

Further improvements can be obtained by using a total number of symbols for a PUCCH transmission $N_{PUCCH}^{symbols,total} = L \cdot N_{PUCCH}^{repeat}$, wherein L is a number of symbols for a nominal repetition and $N_{PUCCH}^{repeat}$ is a number of nominal repetitions of a PUCCH transmission, instead of a number of repetitions $N_{PUCCH}^{repeat}$ for the PUCCH transmission. For example, as illustrated in FIG. 28, the diagram 2800 describes a UE that is scheduled/configured to transmit a PUCCH with $N_{PUCCH}^{repeat} = 4$ nominal repetitions 2801 over 4 corresponding slots with the starting symbol in position S=4 in the slot and with length L=11. The slots 2802 can be the first 4 slots, starting from a slot indicated by a DCI format or configured by higher layers for a PUCCH transmission. When some of symbols 4 through 14 in a slot are not available for UL transmission, such as when those symbols as DL or reserved (such as the reserved symbols 2803) or used for DL-to-UL switching, an actual repetition 2804 of the PUCCH transmission in a corresponding slot can avoid those symbols as the length can be smaller than L=11 symbols of a nominal repetition. However, if the repetitions of the PUCCH transmission are limited to 4 slots, a total number of symbols used for the PUCCH transmission will be smaller than $N_{PUCCH}^{symbols,total} = 11 \cdot 4 = 44$ 2805 and, as a consequence, a reception reliability for the UCI provided by the PUCCH transmission is reduced. The gNB can account for a potential reduction in a number of symbols for the PUCCH repetitions over 4 slots by indicating more than 4 slots for repetitions. However, that may also result to unnecessary repetitions and increased resource overhead in cases when all/most symbols in each of the slots are available for PUCCH repetitions.

In certain embodiments, a UE that is configured for repetitions of a PUCCH transmission can also monitor PDCCH for detection of a DCI format indicating a slot structure, such as a DCI format 2_0. Based upon a detection of the DCI format, the UE can determine a modification to a slot structure over a number of slots, relative to a slot structure the UE was previously indicated by higher layers. The UE can then avoid transmission in symbols that are indicated as DL by the DCI format. The UE can also avoid transmission in symbols indicated as flexible by the DCI format as such symbols can be considered to be reserved in the system operation. The UE may also avoid transmission in a number of symbols after a last DL symbol in order to allow a required time to perform DL-to-UL switching at least when the UE needs to receive, for example a CSI-RS, during the last DL symbol. The UE can indicate the number of symbols for DL-to-UL switching to a gNB as a UE capability, or the gNB can provide the number of symbols to the UE by higher layer signaling, or the number of the symbols can be predetermined in the system operation.

Using a variable number of symbols for a PUCCH repetition (actual PUCCH repetition) enables a latency reduction for the PUCCH transmission because a use of corresponding available symbols per slot can improve. As for using nominal repetitions with a same number of symbols per repetition, there can be more than one PUCCH repetitions in a slot when, for example, there are DL or reserved symbols between two sets of consecutive UL or flexible symbols in the slot. Therefore, determining a number of slots for repetitions of a PUCCH transmission based on $N_{PUCCH}^{symbols,total}$ can enable full flexibility to a gNB to indicate flexible symbols of a TDD UL-DL configuration to be flexible (reserved) symbols or DL symbols while ensuring a desired reception reliability of a PUCCH transmission without additional resource overhead and without a material increase in a latency.

For example, as illustrated in FIG. 29, the diagram 2900 describes when a PUCCH transmission is indicated/configured to be with $N_{PUCCH}^{repeat} = 4$ repetitions over L=11 symbols per slot, starting from symbol S=4 in a slot 2901. Symbols 8 through 10 of each slot are indicated as DL 2902 by an UL-DL configuration or by DCI format, the actual repetitions 2903 of the PUCCH transmission can be in symbols 3 through 7 and 11 through 14 (or symbol 3 and symbol 11 can be additionally avoided to allow for DL-to-UL switching time of 1 symbol) while a nominal repetition over L=11 cannot be supported. Then, to accommodate for the absence of PUCCH transmission in the 3 symbols (symbols 8 through 10) over the four slots, the actual repetitions can continue in slots after the 4 slots until the PUCCH transmission is over an additional 12 symbols and over a total number of at least $N_{PUCCH}^{symbols,total} =$ symbols 604. Whether actual repetitions continue after the 4 slots, or in general after $N_{PUCCH}^{repeat}$ slots, in order to compensate for repetitions that were not possible to transmit can be enabled by a serving gNB, by higher layer signaling or by an indication in a DCI format triggering the PUCCH transmission, and that can also apply in case of nominal repetitions of a PUCCH transmission.

For example, as illustrated in FIG. 30A, the UE can be scheduled to transmit a PUCCH with $N_{PUCCH}^{repeat} = 4$ nominal repetitions over 4 corresponding slots with a starting symbol in location S=4 in a slot and over a number of L=4 symbols 3001a. If symbols 8 through 10 of the four slots are indicated as flexible or DL 3002a by the DCI format, the actual repetitions 3003a of the PUCCH transmission can be in symbols 3 through 7 and 11 through 14 (or symbol 3 and symbol 11 can be additionally avoided to allow for DL-to-UL switching time of 1 symbol). Then the PUCCH transmission of a total of $N_{PUCCH}^{symbols,total} = L \cdot N_{PUCCH}^{repeat} = 16$ sysmbol can be completed in two of the slots 3004a (or in 3 slots if symbol 3 and symbol 11 are avoided).

Therefore, based on an indication of $N_{PUCCH}^{repeat}$ nominal repetitions with starting symbol S and length L, a UE can determine a total number of symbols $N_{PUCCH}^{symbols,total} = L \cdot N_{PUCCH}^{repeat}$ and perform actual repetitions that can be over different numbers of consecutive symbols until the PUCCH transmission is over $N_{PUCCH}^{symbols,total}$ symbols. A starting symbol can be symbol S in a first slot or any symbol after symbol S in the first slot. A starting symbol in slots, other than a first slot for a first repetition of the PUCCH transmission, can be same as or different than symbol S as in the first slot and can be different in different slots. Starting symbols for PUCCH repetitions in a slot other than the first slot can be indicated to the UE by a DCI format, or configured to the UE by higher layers, or determined by the UE as a first symbol available for a repetition in the slot. For example, the UE can transmit a PUCCH repetition in a slot starting from the earliest symbol in the slot that is available for transmission and is configured as a starting symbol for PUCCH repetitions. It is also possible that starting symbols for PUCCH repetitions in slots other than the first slot are the same as the starting symbol of the first slot.

For another example, as illustrated in FIG. 30B, a UE can be scheduled to transmit a PUCCH with $N_{PUCCH}^{repeat} = 4$ nominal repetitions over 4 corresponding slots with a starting symbol in location S=4 in a slot and over a number of L=2 symbols 3001b. If symbols 8 through 10 of the four slots are indicated as flexible or DL 3002b by the DCI format, the actual repetitions 3003b of the PUCCH transmission can be in symbols 4 through 7 and 11 through 14. Then the PUCCH transmission of a total of $N_{PUCCH}^{symbols,total}=L \cdot N_{PUCCH}^{repeat}=8$ symbols can be completed in two of the slots 3004b with first and second repetitions over 2 symbols and third repetition over 4 symbols.

Therefore, based on an indication of $N_{PUCCH}^{repeat}$ nominal repetitions with starting symbol S and length L, a UE can determine a total number of symbols $N_{PUCCH}^{symbols,total}=L \cdot N_{PUCCH}^{repeat}$ and perform actual repetitions that can be over different numbers of consecutive symbols until the PUCCH transmission is over $N_{PUCCH}^{symbols,total}$ symbols. A starting symbol can be symbol S in a first slot. A starting symbol in slots other than a first slot for the first repetition of the PUCCH transmission, can be same as or different than symbol S as in the first slot and can be different in different slots. Starting symbols for PUCCH repetitions in slots other than the first slot can be indicated to the UE by a DCI format or configured to the UE by higher layers or determined by the UE as a first symbol available for a repetition in the slot. It is also possible that starting symbols for PUCCH repetitions in slots other than the first slot are the same as the starting symbol of the first slot.

For yet another example, as illustrated in FIG. 30C, a UE can be scheduled to transmit a PUCCH with $N_{PUCCH}^{repeat}=4$ nominal repetitions over 4 corresponding slots with a starting symbol in location S=5 in a slot and over a number of L=2 symbols 3001c. If symbols 3 and 4, and symbols 11 and 12 of the four slots are indicated as flexible or DL 3002c by the DCI format, the actual repetitions 3003c of the PUCCH transmission can be in symbols 5 through 10 and 13 through 14. The PUCCH transmission of a total of $N_{PUCCH}^{sysmbols,total}=L \cdot N_{PUCCH}^{repeat}=8$ symbols, can be transmitted with 4 repetitions and be completed in one of the slots 3004c.

Therefore, based on an indication of $N_{PUCCH}^{repeat}$ nominal repetitions with starting symbol S and length L, a UE can determine a total number of symbols $N_{PUCCH}^{symbols,total}=L \cdot N_{PUCCH}^{repeat}$ and perform actual repetitions that can be over different numbers of consecutive symbols and over a different number of symbols in each repetition until the PUCCH transmission is over $N_{PUCCH}^{symbols,total}$ symbols. A starting symbol can be symbol S in a first slot. A starting symbol in slots with PUCCH repetitions other than a first slot can be same as or different than symbol S and can be different in different slots. Starting symbols for PUCCH repetitions in slots other than the first slot can be indicated to the UE by a DCI format or configured to the UE by higher layers. It is also possible that starting symbols for PUCCH repetitions in slots other than the first slot are the same as the starting symbol in the first slot.

The following two procedures can apply to reduce a latency of a PUCCH transmission with repetitions, ensure a target reception reliability for UCI provided by the PUCCH transmission, and improve an UL resource utilization.

In the first procedure, the use of actual repetitions over a number of consecutive symbols is discussed. For example, the number of consecutive symbols can be smaller than or equal to a number of symbols of a nominal repetition or such restriction may not exist. The number of symbols of the nominal repetition is associated with a number of symbols of PUCCH resource that is indicated to the UE by a DCI format or is configured to the UE by higher layers. It is also possible that the number of symbols of the nominal repetition is, by default, equal to 14 and a repetition over any number of symbols from 4 to 14 is allowed, or over any number of symbols from 1 to 14. When a number of consecutive UL or flexible symbols in a slot is smaller than or equal to the number of symbols for a nominal PUCCH repetition, such as 14 symbols, but is larger than or equal to a minimum number of symbols, such as 4 symbols, the UE transmits an actual repetition over the number of consecutive UL or flexible symbols in the slot. Allowing a minimum of 4 symbols and a maximum of 14 symbols to be used for repetitions of a PUCCH transmission enables use of a same PUCCH format. The minimum number of symbols can be specified in the system operation, such as for example 1 symbol when different PUCCH formats can be used for repetitions of a PUCCH transmission, or 4 symbols when a same PUCCH format is to be used across repetitions of a PUCCH transmission, that is equal to the smallest number of symbols for a set of PUCCH formats that can support repetitions, or can be configured to the UE by higher layers. Allowing for the minimum number of symbols for a PUCCH repetition to be 1 symbol is equivalent to not including any constraint for a number of symbols for the PUCCH repetition. The minimum number of symbols can be, by default, equal to 1, or can be, by default, equal to the smallest number of symbols of a PUCCH format in a set of one or more PUCCH formats that are specified in the system operation or configured to the UE by higher layers and for use for a PUCCH transmission with repetitions. The number of symbols can the be same for each actual repetition, or can be enabled to be different by configuration, or can be different by specifications of the system operation. It is also possible that the UE can be indicated by a DCI format a number of symbols for a repetition of a configured PUCCH transmission with repetitions. An indicated number of symbols equal to zero is equivalent to no transmission of the corresponding repetition. This can be applied to a nominal or to an actual repetition. Allowing use of a variable number of symbols for repetitions of a PUCCH transmission is applicable when a UCI payload is smaller than 12 bits because repetition coding or Reed-Mueller coding is then used and a gNB can combine repetitions that use different numbers of symbols. For UCI payloads that are equal to or larger than 12 bits, polar coding is used all repetitions need to be over a same number of symbols in order to enable the gNB to combine the repetitions.

In the second procedure, transmission of multiple repetitions of a PUCCH transmission in a slot is discussed. When a first number of consecutive UL or flexible symbols and a second number of consecutive UL (or flexible symbols in a slot) are separated by a DL symbols or reserved symbols (including symbols used for DL-to-UL switching), the UE can transmit a first actual PUCCH repetition over a first number of consecutive symbols that is same as or a subset of the first number of symbols and a second actual PUCCH repetition over a second number of consecutive symbols that is same as or a subset of the second number of symbols. The first number of consecutive symbols can be predefined to be same as the second number of consecutive symbols or different numbers can be enabled either by specification of the system operation or by higher layer configuration. A UE can be configured by higher layers or can be indicated as part of the PUCCH resource whether a first actual repetition and a second actual repetition are over same resource blocks (RBs) or over different RBs. Also, multiple actual repetitions in a same slot can be restricted to be over same RBs by specification.

Figure 32:
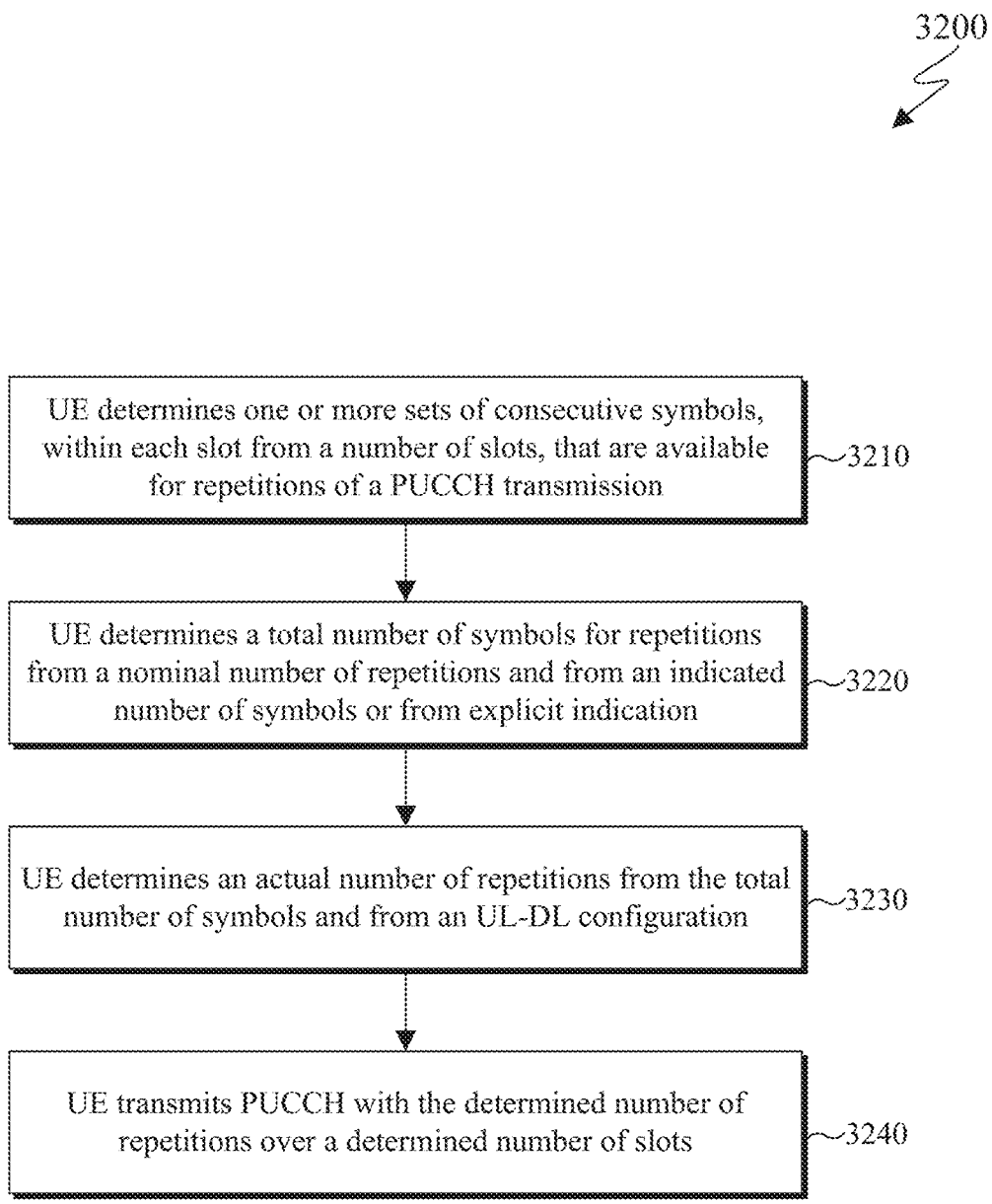
FIG. 32 illustrates an example method for a UE to determine repetitions for a PUCCH transmission according to embodiments of the present disclosure.

Embodiments of the present disclosure also describe a configuration of PUCCH with repetitions. The following examples and embodiments, such as those described in FIGS. 31 and 32 describe procedures for configuring of PUCCH with repetitions FIG. 31 illustrates example PUCCH configurations 3101 and 3102 according to embodiments of the present disclosure. FIG. 32 illustrates an example method 3200 for a UE to determine repetitions for a PUCCH transmission according to embodiments of the present disclosure. The steps of the method 3200 can be performed by any of the UEs 111-116 of FIG. 1, such as the UE 116 of FIG. 3. The method 3200 of FIG. 32 are for illustration only and other embodiments can be used without departing from the scope of the present disclosure.

For a PUCCH transmission with repetitions, a gNB (such as the BS 102) can configure a UE (such as the UE 116) with a number of slots $N_{PUCCH}^{repeat}$ and a number of symbols per slot L, or with a total number of symbols $N_{PUCCH}^{symbols,total}$, for repetitions of a PUCCH transmission. For example, higher layer parameter nrofSymbols-rep-typeB can indicate $N_{PUCCH}^{symbols,total}$ and can be added to the PUCCH configuration as indicated in the exemplary configuration 1 below. If nrofSymbols-rep-typeB is not provided to a UE, the UE can determine $N_{PUCCH}^{symbols,total} = L \cdot N_{PUCCH}^{repeat}$, wherein L is a number of symbols for a PUCCH repetitions and $N_{PUCCH}^{repeat}$ is a total number of repetitions and each is either indicated by a DCI format or is configured by higher layers.

As illustrated in FIG. 31, the configuration 3101 describes that a UE can be additionally provided a maximum number of slots for actual repetitions (such as by higher layer parameter nrofSlots-rep-typeB) in order for a serving gNB to control a maximum number of slots where a UE would transmit repetitions (configure an upper limit to the number of slots). If the UE is not provided nrofSlots-rep-typeB, the UE transmits PUCCH with actual repetitions until a total number of symbols for the PUCCH transmission $N_{PUCCH}^{symbols,total}$ is achieved and, when each repetition is over same symbols in a slot, until a total number of repetitions is achieved. If nrofSlots-rep-typeB is provided to the UE, it indicates a maximum number of slots for actual repetitions of a PUCCH transmission, unless additional signaling is provided to the UE indicating the maximum number of slots, such as by a field in a DCI format associated with the PUCCH transmission. Therefore, when nrofSlots-rep-typeB is provided, a number of slots available for the repetitions of the PUCCH transmission is $N_{PUCCH}^{repeat}$ and a slot/repetition is counted regardless of whether or not the UE transmits a corresponding repetition. When nrofSlots-rep-typeB is not provided, a number of slots available for the repetitions of the PUCCH transmission can be larger $N_{PUCCH}^{repeat}$ as a slot/repetition is not counted when the UE cannot transmit the repetition. Each repetition of the PUCCH transmission can be over L symbols per slot or over a variable number of symbols per slot.

Alternatively, as illustrated in FIG. 31, the configuration 3102 describes an indication for a number of slots and for a total number of symbols for actual repetitions of a PUCCH transmission can be jointly configured in one field.

For example, for actual repetitions of a PUCCH transmission by a UE in symbols 3 through 7 and in symbols 11 through 14 of a slot, and for nrofSlots-rep-typeB equal to 4, nrofSymbols-typeB equal to 44, and L equal to 11, the total number of symbols for PUCCH repetitions is $N_{PUCCH}^{sumbols,total}=44$ while the actual number of symbols per slot for PUCCH repetitions is 8 (not 11). This would require transmitting PUCCH over 6 slots, wherein for the last slot, only the first actual repetition can be transmitted (total number of symbols is then 44) or both actual repetitions can be transmitted (total number of symbols is then 48) as determined by the specifications of the system operation or as configured by higher layers to the UE. If the maximum number of slots nrofSlots-rep-typeB is equal to 4, the UE would transmit PUCCH with 3 repetitions over 4 slots and the effective length of the PUCCH transmission would be 33 symbols. If nrofSlots-rep-typeB is not provided to the UE, a limit on the number of slots where the UE can transmit repetitions of a PUCCH transmission does not exists, and the UE can transmit actual repetitions of the PUCCH transmission over 6 slots.

For another example, considering actual repetitions of a PUCCH transmission by a UE in symbols 3 through 7 and in symbols 11 through 14 of a slot, if nrofSymbols-typeB is $N_{PUCCH}^{symbols,total}=32$ and L=4, a number of repetitions for the PUCCH transmission would be 8. This would require the UE to transmit PUCCH repetitions over 4 slots. If nrofSlots-rep-typeB of 4, a UE would transmit PUCCH with 8 repetitions over 4 slots and the effective length of the PUCCH transmission would be 32 symbols. In this case the PUCCH transmission occupies the indicated number of symbols, nrofSymbols-typeB.

As illustrated in FIG. 32, the method 3200 describes a procedure for a UE (such as the UE 116) to determine repetitions for a PUCCH transmission.

In step 3210, the UE determines one or more sets of consecutive symbols within each slot from a number of slots that are available for repetitions of a PUCCH transmission. For example, the determination can be based only on UL-DL configurations provided by higher layers. For another example, the determination can additionally be based on an update of the UL-DL configurations by a DCI format. In step 3220, the UE determines a nominal number of repetitions for the PUCCH transmission from an indicated total number of symbols for the PUCCH transmission and an indicated number of symbols per nominal repetition. Alternatively, the UE can be indicated the nominal number of repetitions for the PUCCH transmission and the number of symbols per nominal repetition, for example as part of the indicated PUCCH resource, and determine the total number of symbols for the PUCCH transmission. In step 3230, the UE determines an actual number of repetitions from the total number of symbols and the UL-DL configuration over a number of slots. In step 3240, the UE transmits PUCCH with the determined number of actual repetitions over a determined number of slots.

Although FIG. 32 illustrates the method 3200, various changes may be made to FIG. 32. For example, while the method 3200 of FIG. 32, is shown as a series of steps, various steps could overlap, occur in parallel, occur in a different order, or occur multiple times. In another example, steps may be omitted or replaced by other steps. For example, steps of the method 3200 can be executed in a different order.

Embodiments of the present disclosure also describe an indication of whether an actual number of slots for repetitions of a PUCCH transmission can be different than a configured number. The following examples and embodiments, such as those described in FIG. 33, describe an indication of whether an actual number of slots for repetitions of a PUCCH transmission can be different than a configured number.

Figure 33:
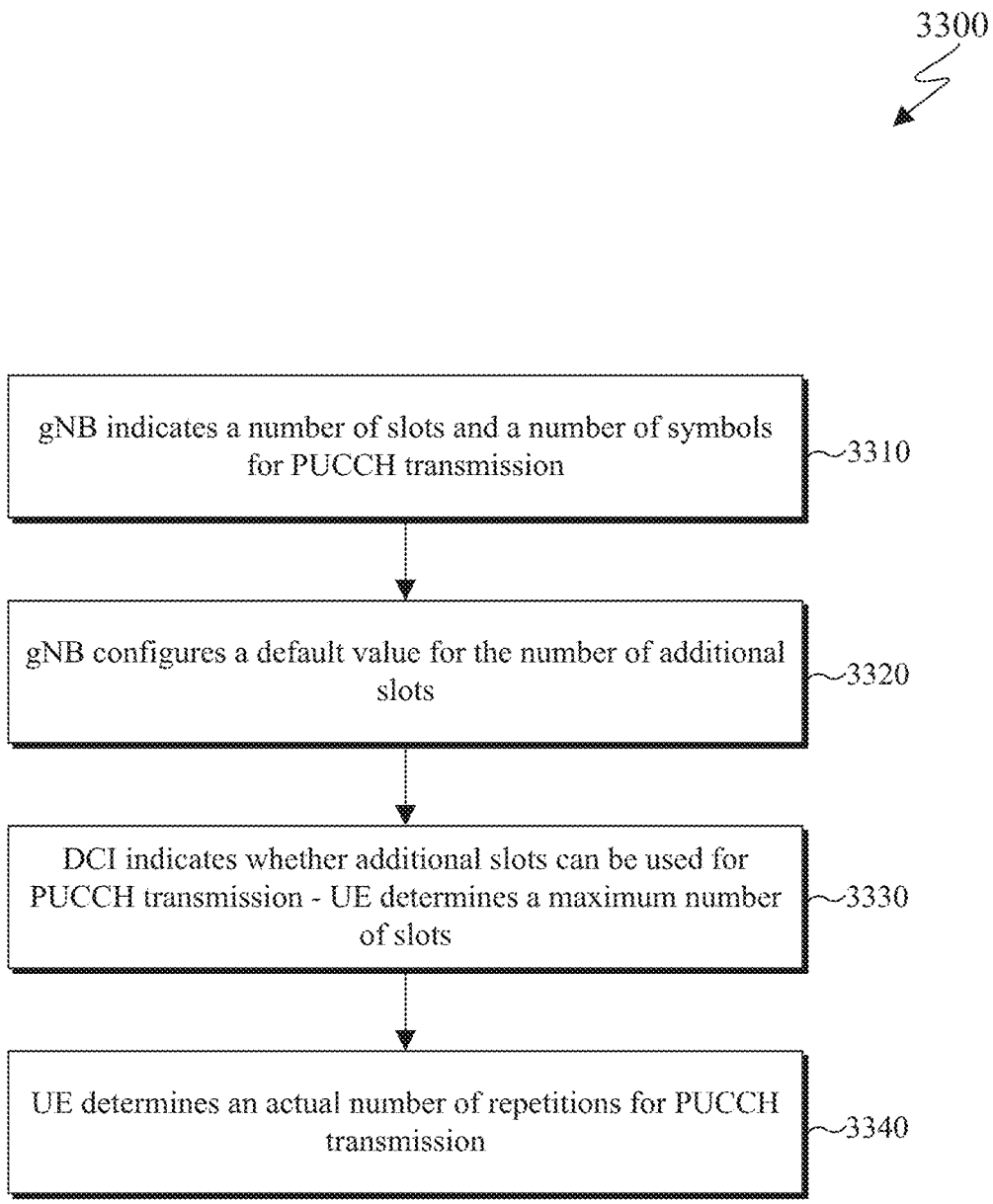
FIG. 33 illustrates an example method for a UE to determine the number of repetitions for a PUCCH transmission according to embodiments of the present disclosure.

FIG. 33 illustrates an example method 3300 for a UE to determine the number of repetitions for a PUCCH transmission according to embodiments of the present disclosure. The steps of the method 3300 can be performed by any of the UEs 111-116 of FIG. 1, such as the UE 116 of FIG. 3. The method 3300 of FIG. 33 is for illustration only and other embodiments can be used without departing from the scope of the present disclosure.

In certain embodiments, a gNB (such as the BS 102) can indicate whether a number of slots for repetitions of a PUCCH transmission can exceed a number of slots indicated by nrofSlots-typeB. In case the indication is that nrofSlots-typeB can be exceeded, a PUCCH transmission with repetitions uses the indicated, by nrofSymbols-typeB, total number of symbols $N_{PUCCH}^{symbols,total}$. Alternatively, $N_{PUCCH}^{symbols,total}=L \cdot N_{PUCCH}^{repeat}$ as previously described and, when each repetition is over same L symbols in a slot, until a total number of $N_{PUCCH}^{repeat}$ repetitions or a total number of $N_{PUCCH}^{repeat}$ slots is achieved as configured by the gNB.

In certain embodiments, a gNB can also indicate a number of additional slots, nrofSlots-typeB_add (in addition to nrofSlots-typeB slots) that the UE can use for repetitions of a PUCCH transmission. In this case the length of the PUCCH transmission can be limited by the maximum number of repetitions that can be transmitted in (nrofSlots-typeB+nrofSlots-typeB_add) slots.

In certain embodiments, a gNB can configure a UE with one or more numbers of additional slots, and use physical layer signaling to dynamically indicate the number of additional slots or to change a value of a total number of slots or of the additional slots. For example, a gNB can indicate the UE behavior by a 1-bit field in the DCI format scheduling PUCCH. A 1-bit field signaling can be used to indicate whether additional slots can be used for PUCCH transmission in the DCI format. For example, a value of "0" indicates that no additional slots can be used for PUCCH transmission and a number of PUCCH repetitions is one that can be achieved over $N_{PUCCH}^{repeat}$ consecutive slots, and a value of "1" indicates that a configured value of additional number of slots can be used and a number of PUCCH repetitions is $N_{PUCCH}^{repeat}$. The configured value of number of additional slots can be set to zero. It is also possible that the 1-bit DCI field indicates whether one additional slot can be used. For example, a value "0" indicates that the configured or default value can be used, and a value of "1" indicates that the configured or default value increased by x can be used (for example x=1 indicates one additional slot respect to the configured or default value, x=2 indicates two additional slots, and so on, until any number of slots required to achieve $N_{PUCCH}^{repeat}$ repetitions). A gNB can also configure multiple values for the number of additional slots and use a field in DCI to indicate which value to use. For example, the gNB can configure by higher layers 4 values for the number of additional slots that the UE can use to transmit symbols for repetitions of the PUCCH transmissions and indicate which value to use with a 2-bit field in DCI format.

As illustrated in FIG. 33, the method 3300 describes a procedure for a UE (such as the UE 116) to determine the number of repetitions for a PUCCH transmission. In step 3310 gNB indicates a number of symbols and a number of slots for a PUCCH transmission. For example, the UE can receive the indication from the gNB. In step 3320, the gNB configures a default value for the number of additional slots. For example, the UE identify the default value for the number of additional slots. In step 3330, the UE receives an indication in DCI format for whether to use additional slots for repetitions of a PUCCH transmission and determines a maximum number of slots to use for the repetitions of the PUCCH transmission. In step 3340, the UE determines an actual number of repetitions for the transmission of PUCCH and transmits PUCCH over a determined number of slots.

Although FIG. 33 illustrates the method 3300, various changes may be made to FIG. 33. For example, while the method 3300 of FIG. 33, is shown as a series of steps, various steps could overlap, occur in parallel, occur in a different order, or occur multiple times. In another example, steps may be omitted or replaced by other steps. For example, steps of the method 3300 can be executed in a different order.

Embodiments of the present disclosure also describe an indication of whether the number of symbols for PUCCH transmission with repetitions can be other than the configured value. The following examples and embodiments, such as those described in FIG. 34 describe procedures for indication of whether the number of symbols for PUCCH transmission with repetitions can be other than the configured value.

Figure 34:
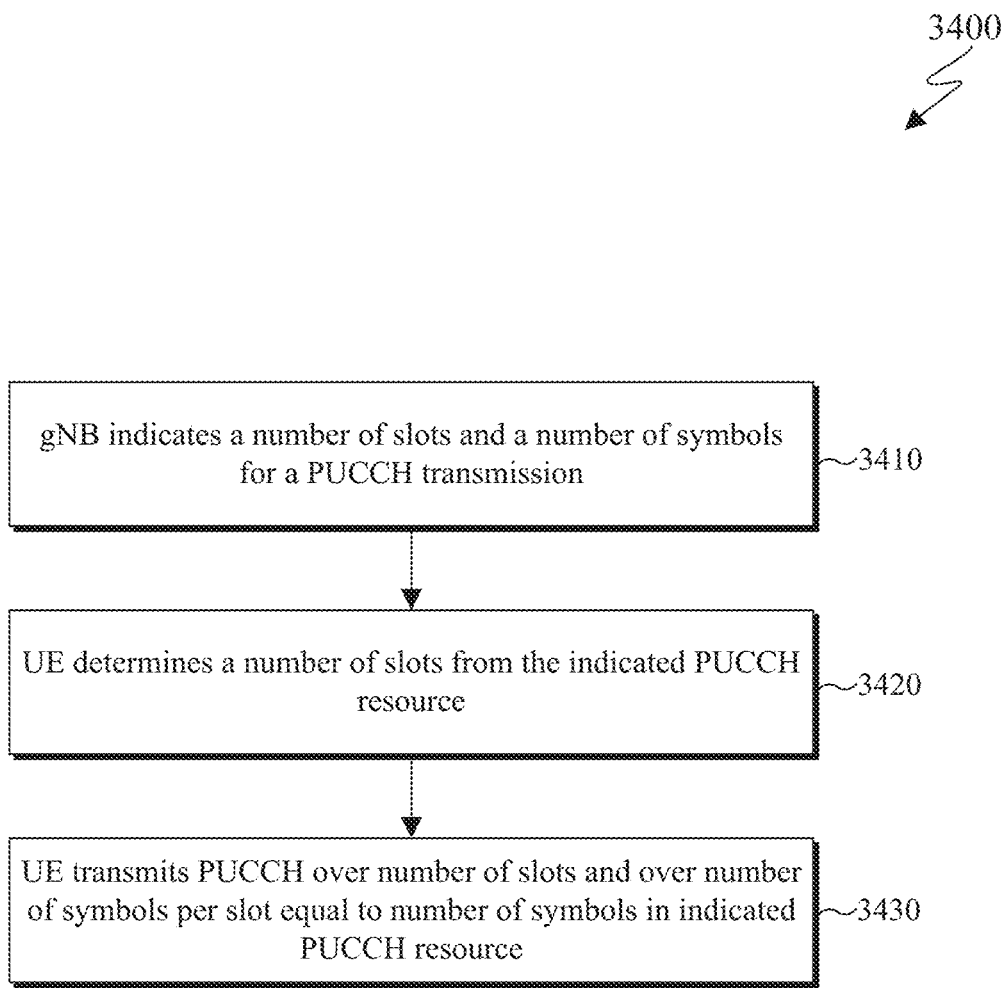
FIG. 34 illustrates an example method for a UE to determine PUCCH resource for transmission of repetitions according to embodiments of the present disclosure.

FIG. 34 illustrates an example method 3400 for a UE to determine PUCCH resource for transmission of repetitions according to embodiments of the present disclosure. The steps of the method 3400 can be performed by any of the UEs 111-116 of FIG. 1, such as the UE 116 of FIG. 3. The method 3400 of FIG. 34 is for illustration only and other embodiments can be used without departing from the scope of the present disclosure.

In certain embodiments, based on a UCI type that a UE multiplexes in a PUCCH transmission (such as HARQ-ACK, SR or CSI), the UE determines a PUCCH resource and a PUCCH format. The determination can be based on a PUCCH resource indicator field in a DCI format or based on a configuration by higher layers. A PUCCH resource includes a configuration for a PUCCH format and for a number of symbols for a PUCCH transmission. A same PUCCH format and a same number of PUCCH symbols are used by the UE for all repetitions of a PUCCH transmission. For example, an indicated PUCCH resource can include PUCCH format 3 and a number of 6 consecutive symbols for repetitions of the PUCCH transmission.

Using a same number of repetitions and a same number of symbols per repetition of a PUCCH transmission for all PUCCH formats, for all possible numbers of UCI bits, and for all possible sub-carrier spacing (SCS) configurations of the PUCCH transmission is not meaningful. For example, a number of repetitions when a number of UCI bits is 4 needs to be about twice a number of repetitions when a number of UCI bits is 2 and, in general, for a same target reception reliability for UCI, a number of PUCCH repetitions needs to increase with a number of UCI bits that is provided by the PUCCH transmission. For example, a number of repetitions when a number of symbols per repetition is 6 needs to be twice a number of repetitions when a number of symbols per repetition is 12. For example, as a symbol duration for 15 kHz SCS is twice a symbol duration for 30 kHz SCS, a number of repetitions for a PUCCH transmission using 30 kHz SCS needs to be twice a number of repetitions using 15 kHz SCS assuming that all other parameters such as PUCCH format, number of symbols for PUCCH transmission, UCI payload, and so on are same. For example, as a PUCCH format 4 is similar to a PUCCH format 3 with the exception of FDM PUCCH transmissions from more than one UEs (FDM is equivalent to orthogonal multiplexing using orthogonal cover codes prior to DFT operation), a number of repetitions for a PUCCH format 4 needs to be larger than a number of repetitions for a PUCCH format 3 when all remaining transmission parameters are same. Given the above dependencies of a number of repetitions for a PUCCH transmission for achieving a target BLER, it is beneficial that a number of repetitions for a PUCCH transmission is indicated by a DCI format together with or independently from a resource for the PUCCH transmission.

A DCI format can include a field ("number of PUCCH repetitions") that indicates a number of repetitions for a PUCCH transmission that can be separate from a PUCCH resource indication (PRI) field that indicates a PUCCH resource for the repetitions of the PUCCH transmission. The "number of PUCCH repetitions" field can directly indicate the number of repetitions for the PUCCH transmission. For example, a field using 2 bits can indicate 1, 2, 4, or 8 repetitions with values of '00', '01', '10' and '11', respectively. It is also possible that the field is used to scale a reference number of repetitions provided by higher layers. For example, when a UE is provided by higher layer a reference number of 4 PUCCH repetitions, a field of 2 bits in the DCI format can indicate a scaling of the reference number by 0.5, 1, 2, or 4. The size of the "number of PUCCH repetitions" field can be configurable including with 0 bits (in which case the field does not exist).

In certain embodiments, to avoid an overhead in the DCI format that is associated with introducing a "number of PUCCH repetitions" field and to avoid a modification in existing DCI formats, a number of PUCCH repetitions can be indicated together with a PUCCH resource, either as a separate parameter or as a joint parameter with another parameter such as a number of symbols for a PUCCH transmission per slot or for a nominal repetition of a PUCCH transmission. When a number of repetitions is a separate parameter in a configuration of a PUCCH resource, the PUCCH resource can also provide a value for a "nrofRepetitions" parameter. For example, Syntax (1), below describes a PUCCH resource

```
Syntax                                           (1)
PUCCH-format3 ::=      SEQUENCE {
    nrofPRBs               INTEGER (1..16),
    nrofSymbols            INTEGER (4..14),
    nrofRepetitions        INTEGER (1, 2, 4, 8),
    startingSymbolIndex    INTEGER(0..10)
}
```

In certain embodiments, a number of repetitions for a PUCCH transmission can be jointly provided with a number of symbols in a configuration of a PUCCH resource, the number of symbols can exceed a maximum number of symbols per slot (14 symbols). For example, a PUCCH resource, as shown in Syntax (2), below, wherein the PUCCH resource includes 56 symbols. A joint indication is suitable in case a PUCCH transmission is with Type-B repetitions where a transmission over 56 symbols can be for example over 14 symbols per slot in 4 slots, or over 7 symbols per slot in 4 slots and over 14 symbols per slot in 2 slots, or over 4 symbols per slot in 14 slots, and so on. It is also possible that a separate "nrofRepetitions" parameter is provided in case that each PUCCH repetition is over a same number of symbols in a slot and a total number of symbols for the PUCCH transmission (that can be more than 14) is provided in case of a PUCCH transmission with Type-B repetitions.

```
Syntax                                           (2)
PUCCH-format3 ::=      SEQUENCE {
    nrofPRBs               INTEGER (1..16),
    nrofSymbols            INTEGER (4..56),
    startingSymbolIndex    INTEGER(0..10)
}
```

As illustrated in FIG. 34, the method 3400 describes a procedure for a UE (such as the UE 116) to determine the PUCCH resource for transmission of repetitions. In step 3410, a gNB indicates to a UE using a PUCCH resource indicator (PRI) field in a DCI format a PUCCH resource for a PUCCH transmission wherein the PUCCH resource includes a number of slots and a number of symbols. In step 3420, the UE determines a number of slots for repetitions for the PUCCH transmission of PUCCH from the indicated PUCCH resource. For example, the determination can be based on an UL-DL configuration provided by higher layers for a number of slots or additionally indicated/adjusted by a DCI format. In step 3430, the UE transmits the PUCCH over a number of slots equal to the number of repetitions and over a number of symbols equal to the number of symbols in the indicated PUCCH resource.

Although FIG. 34 illustrates the method 3400, various changes may be made to FIG. 34. For example, while the method 3400 of FIG. 34, is shown as a series of steps, various steps could overlap, occur in parallel, occur in a different order, or occur multiple times. In another example, steps may be omitted or replaced by other steps. For example, steps of the method 3400 can be executed in a different order.

Embodiments of the present disclosure also describe an indication of a set of PUCCH resources with at least different numbers of symbols. The following examples and embodiments, such as those described in FIG. 35 describe an indication of a set of PUCCH resources with at least different numbers of symbols.

Figure 35:
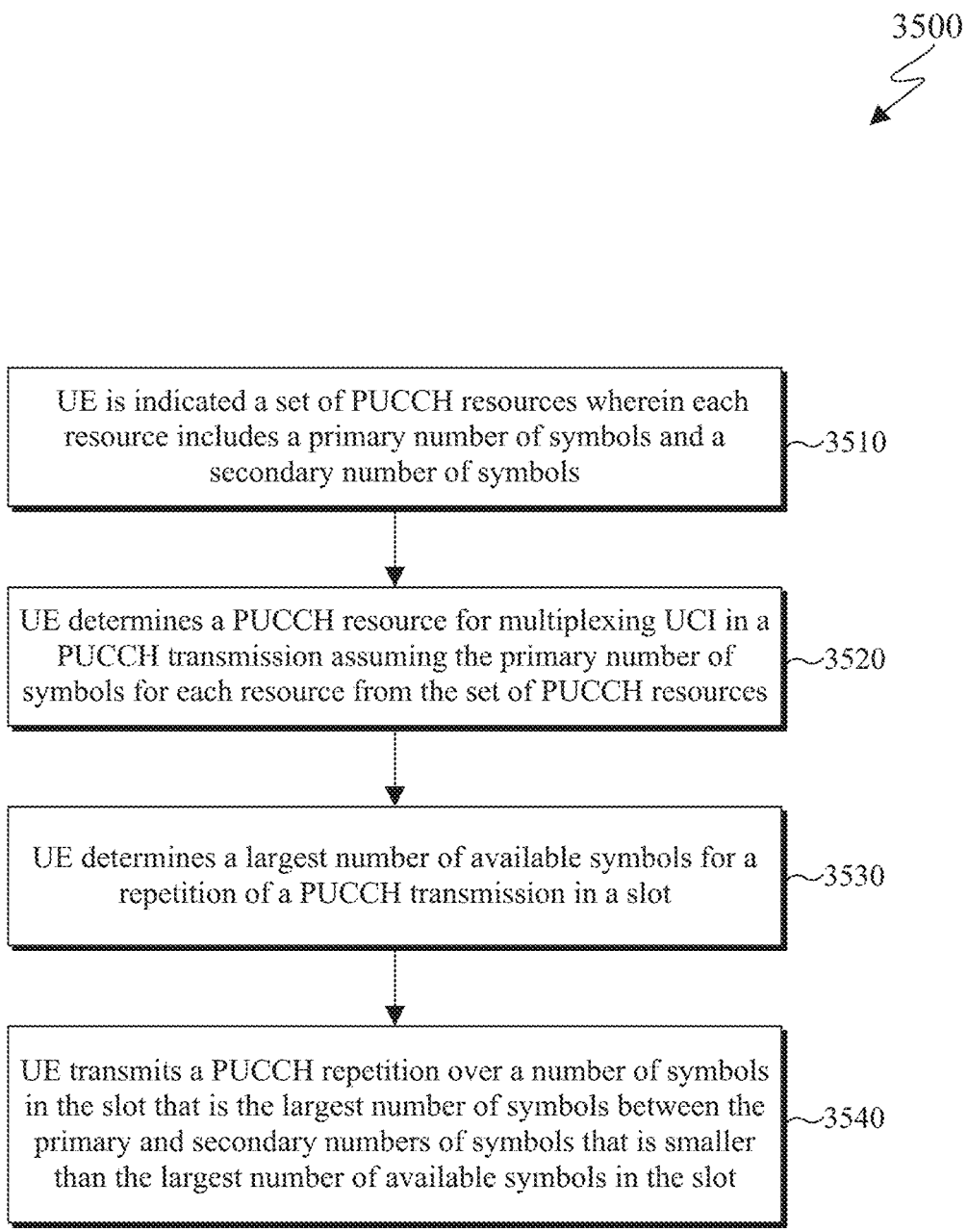
FIG. 35 illustrates an example method for a UE to determine a PUCCH resource, from a set of PUCCH resources, for a repetitions of a PUCCH transmission according to embodiments of the present disclosure.

FIG. 35 illustrates an example method 3500 for a UE to determine a PUCCH resource, from a set of PUCCH resources, for a repetition of a PUCCH transmission according to embodiments of the present disclosure. The steps of the method 3500 can be performed by any of the UEs 111-116 of FIG. 1, such as the UE 116 of FIG. 3. The method 3500 of FIG. 35 is for illustration only and other embodiments can be used without departing from the scope of the present disclosure.

In certain embodiments, when a number of symbols that are available for each repetition of a PUCCH transmission is small, a UE can adapt a number of symbols for each repetition. For example, the UE can be provided multiple symbols for each resource from a set of PUCCH resources. The first number of symbols is the primary number of symbols and the remaining numbers of symbols are secondary. The UE determines a PUCCH resource to multiplex UCI assuming the primary number of symbols for each resource in the set of PUCCH resources. After determining a PUCCH resource for UCI multiplexing, the UE can select among the primary number of symbols and the secondary numbers of symbols to transmit a repetition of a PUCCH transmission in a slot depending on an availability of consecutive symbols that the UE can determine, for example, based on an UL-DL configuration that is provided by higher layers or additionally indicated/adjusted by a DCI format. For a repetition of a PUCCH transmission in a slot, the UE can select the largest number of symbols for the PUCCH resource that is smaller than or equal to a maximum number of consecutive UL or flexible symbols in the slot. For example, a UE can be provided two numbers of symbols for each PUCCH resource in a set of PUCCH resources. The UE determines a PUCCH resource for UCI multiplexing that includes 12 symbols and has a secondary number of 6 symbols. Based on an UL-DL configuration, the UE determines that a maximum of 8 consecutive symbols are available for a repetition of the PUCCH transmission in a slot. Then, the UE transmits the repetition of the PUCCH transmission in the slot using 6 symbols.

As illustrated in FIG. 35, the method 3500 describes a procedure for a UE (such as the UE 116) to determine a PUCCH resource, from a set of PUCCH resources, for a repetition of a PUCCH transmission.

In step 3510, a UE is indicated a set of PUCCH resources wherein each resource includes a primary number of symbols and a secondary number of symbols. In step 3520, the UE determines a PUCCH resource for multiplexing UCI in a PUCCH transmission assuming the primary number of symbols for each resource from the set of PUCCH resources. In step 3530, the UE determines the largest number of available symbols for a repetition of a PUCCH transmission in a slot. For example, the UE can determine the largest number of available symbols based on an UL-DL configuration or based on a further adjustment by a DCI format. In step 3540, the UE transmits a PUCCH repetition over a number of symbols in the slot that is the largest number of symbols between the primary and secondary numbers of symbols that is smaller than the largest number of available symbols in the slot.

Although FIG. 35 illustrates the method 3500, various changes may be made to FIG. 35. For example, while the method 3500 of FIG. 35, is shown as a series of steps, various steps could overlap, occur in parallel, occur in a different order, or occur multiple times. In another example, steps may be omitted or replaced by other steps. For example, steps of the method 3500 can be executed in a different order.

Embodiments of the present disclosure also describe dropping overlapping PUCCH repetitions with CSI. The following examples and embodiments, such as those described in FIG. 36, describe dropping overlapping PUCCH repetitions with CSI.

Figure 36:
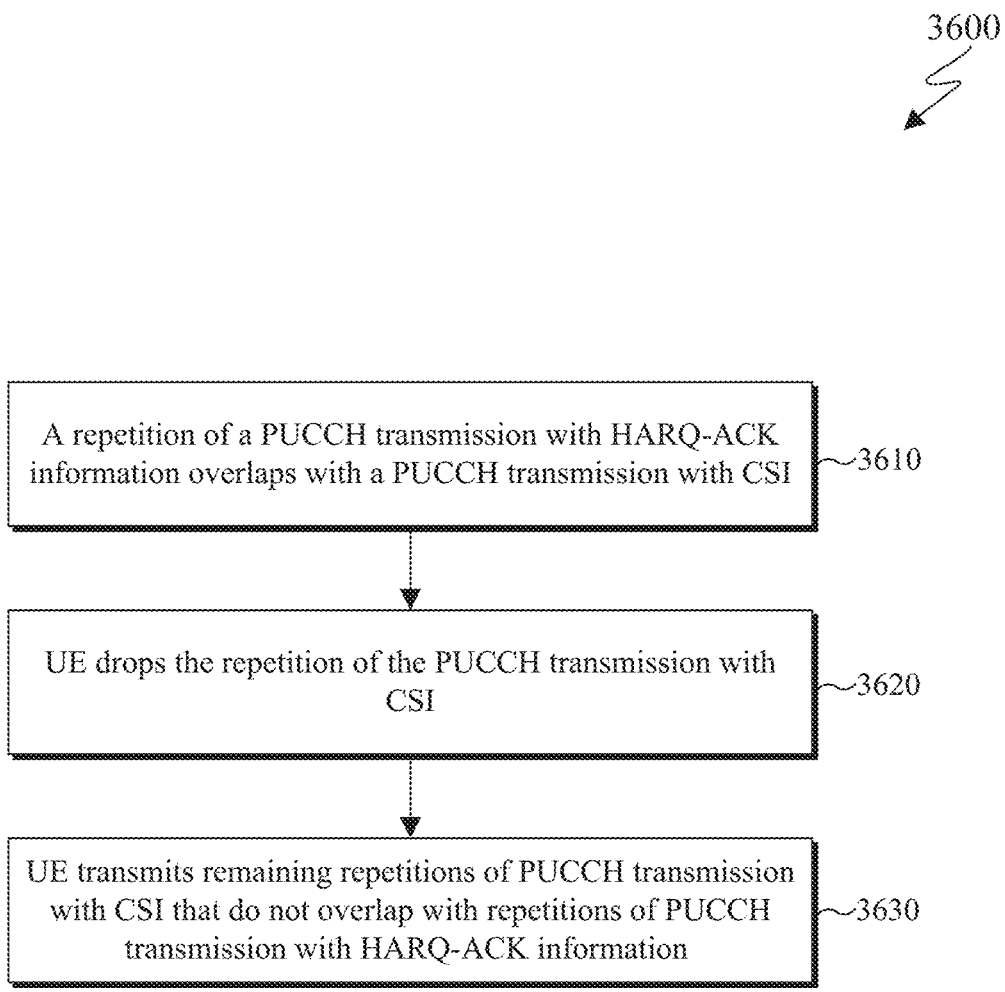
FIG. 36 illustrates an example method for a UE to drop a repetition of a PUCCH transmission according to embodiments of the present disclosure.

FIG. 36 illustrates an example method 3600 for a UE to drop a repetition of a PUCCH transmission according to embodiments of the present disclosure. The steps of the method 3600 can be performed by any of the UEs 111-116 of FIG. 1, such as the UE 116 of FIG. 3. The method 3600 of FIG. 36 is for illustration only and other embodiments can be used without departing from the scope of the present disclosure.

In certain embodiments, overlapping of PUCCH transmissions with repetitions can occur over the duration of a PUCCH transmission with repetitions. The overlapping can be between repetitions with same number of symbols and same starting symbol or can be partial between some of the symbols for repetitions of different PUCCH transmissions. For example, a repetition of a PUCCH transmission with HARQ-ACK information that is triggered by a DCI format can overlap with a PUCCH transmission, with or without repetitions, with CSI or SR. For example, the latter PUCCH transmission starts prior to the former PUCCH transmission. In such case, a UE can drop the overlapping repetitions of the PUCCH transmission with CSI or SR (including a single transmission without repetitions). Similar, when a repetition of a PUSCH transmission without UCI overlaps with a repetition of a PUCCH transmission, the UE does not transmit the PUSCH. When a PUSCH with UCI overlaps with a repetition of a PUCCH transmission, the UE does not transmit the PUSCH if the UCI of the PUCCH repetition is HARQ-ACK or SR and transmits the PUSCH if the UCI of the PUCCH repetition is CSI.

As illustrated in FIG. 36, the method 3600 describes a procedure for a UE (such as the UE 116) to drop a repetition of a PUCCH transmission.

In step 3610, a repetition of a PUCCH transmission with HARQ-ACK information from a UE overlaps with a PUCCH transmission (with or without repetitions) with CSI from the UE. In step 3620, the UE drops the repetition of the PUCCH transmission with CSI. In step 3630, the UE continues transmitting the remaining repetitions of the PUCCH transmission with CSI that do not overlap with repetitions of the PUCCH transmission with HARQ-ACK information.

Although FIG. 36 illustrates the method 3600, various changes may be made to FIG. 36. For example, while the method 3600 of FIG. 36, is shown as a series of steps, various steps could overlap, occur in parallel, occur in a different order, or occur multiple times. In another example, steps may be omitted or replaced by other steps. For example, steps of the method 3500 can be executed in a different order.

Embodiments of the present disclosure also describe an indication of a number of repetitions for an UCI type. The following examples and embodiments, such as those described in FIGS. 37 and 38 describe an indication of a number of repetitions for a UCI type.

Figure 37:
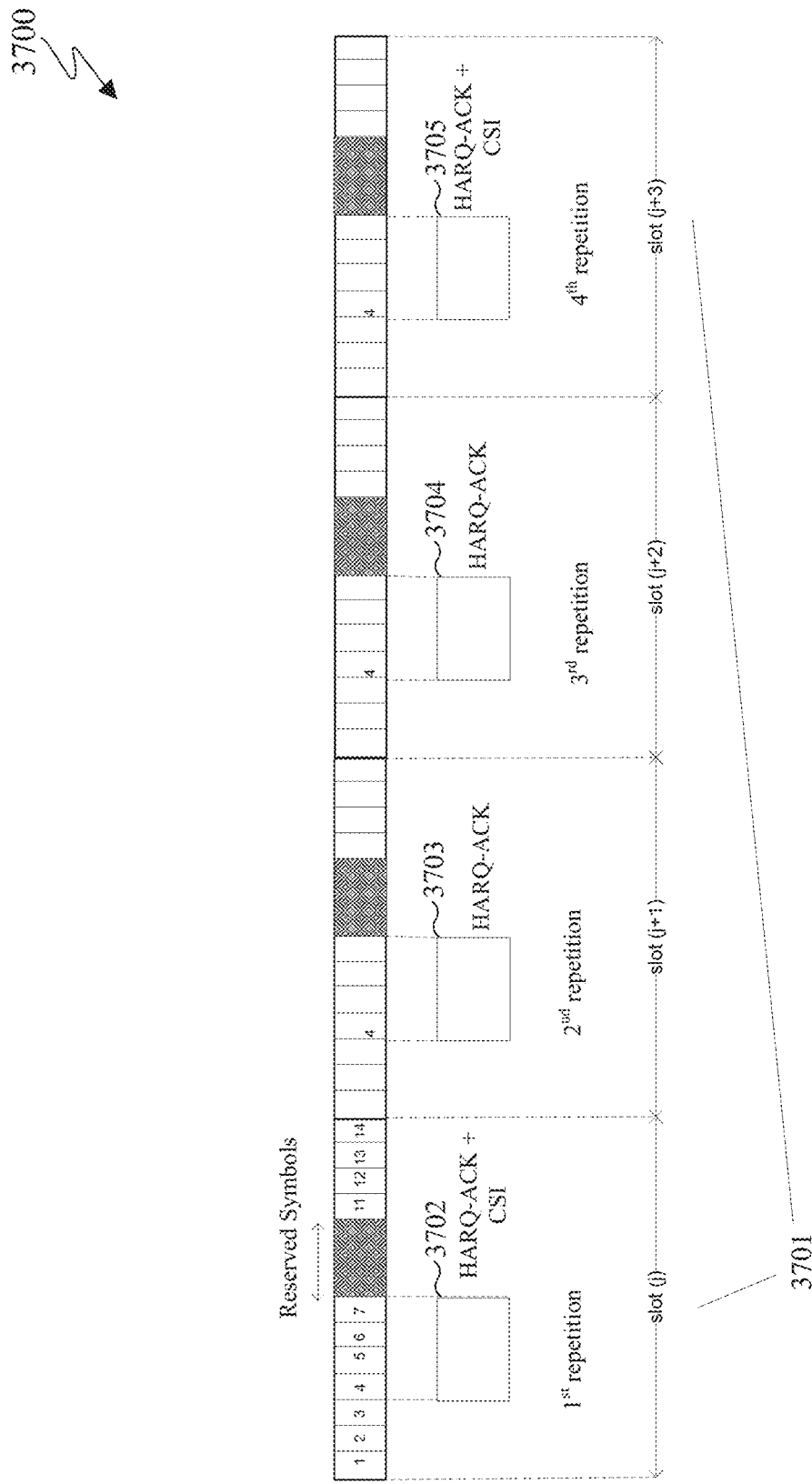
FIG. 37 illustrates a diagram of a PUCCH that is transmitted with CSI according to embodiments of the present disclosure.
Figure 38:
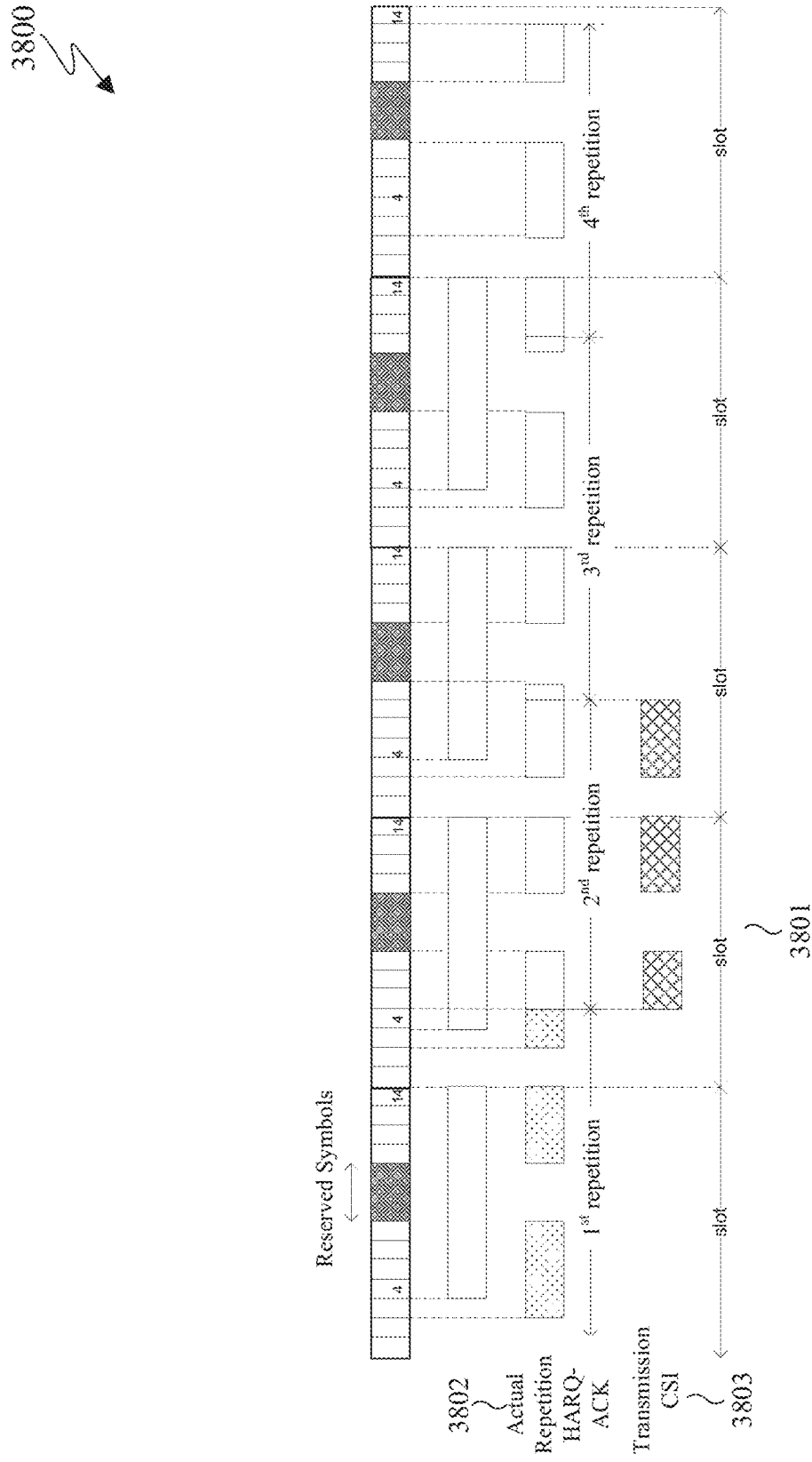
FIG. 38 a diagram where a PUCCH is transmitted with CSI according to embodiments of the present disclosure.

FIG. 37 illustrates a diagram 3700 of a PUCCH that is transmitted with CSI according to embodiments of the present disclosure. FIG. 38 a diagram 3800 where a PUCCH is transmitted with CSI according to embodiments of the present disclosure.

In certain embodiments, using a same number of repetitions for all UCI types is detrimental because different UCI types can have different reliability requirements (target BLERs) and latency requirements. For example, a HARQ-ACK information reliability requirement can be larger than a CSI report reliability requirement. Also a number of CSI report bits can be different than a number of HARQ-ACK information bits, for example HARQ-ACK information includes 1-bit and a CSI report includes 4 bits. To adapt a number of repetitions for a PUCCH transmission according to a UCI type while retaining a constraint for a same number of symbols in each repetition, a first repetition of the PUCCH transmission can include HARQ-ACK information and CSI that are jointly encoded, and a subsequent repetition can include only HARQ-ACK information. For example, for 4 repetitions over 4 symbols per repetition, a UE can multiplex HARQ-ACK information and CSI in first and second repetitions, and multiplex only HARQ-ACK information in third and fourth repetitions. For another example, for PUCCH transmissions with CSI reports that are configured by higher layers, a UE can multiplex HARQ-ACK information and CSI in a PUCCH repetition in a slot where a PUCCH transmission with CSI is configured, and multiplex only HARQ-ACK information in PUCCH repetitions in other slots.

As illustrated in FIG. 37, if a PUCCH with CSI is configured to be transmitted by a UE every three of the slots 3701 (such as in slot (j) and slot (j+3)), and the UE is configured to transmit the PUCCH with 4 repetitions over 4 symbols (and over 4 slots), the UE multiplexes HARQ-ACK information and CSI 3702 in a PUCCH repetition in slot (j).The UE also multiplexes the HARQ-ACK 3703 and 3704 information in PUCCH repetitions over slots (j+1) and (j+2), respectively. The UE further multiplexes jointly encoded HARQ-ACK information and CSI 3705 in a PUCCH repetition in slot(j+3).

Alternatively, when a PUCCH transmission with CSI is configured to be as in the above example and a first PUCCH transmission with HARQ-ACK information is in a same slot as a PUCCH transmission with CSI, a first PUCCH with HARQ-ACK information and a second PUCCH with CSI are transmitted in same time resources.

In certain embodiments, the above multiple PUCCH transmission procedure can also apply when UCI includes HARQ-ACK information and SR or when UCI includes HARQ-ACK information, CSI and SR. In the latter case, for example, HARQ-ACK information and CSI are multiplexed over 4 PUCCH repetitions while SR is multiplexed only in a first PUCCH repetition. In another example, a transmission of PUCCH with CSI and SR is configured by higher layers to be without repetitions while multiplexing of HARQ-ACK information is in a PUCCH that is transmitted with repetitions.

In certain embodiments, the above applies also when actual PUCCH repetitions (Type-B) are used. When a PUCCH transmission with CSI or SR is configured by higher layers to a UE, and for example slot (j) is a slot where the UE transmits a PUCCH with CSI or SR, if the PUCCH is transmitted without repetitions, then CSI or SR is multiplexed in the PUCCH transmission having a first symbol in slot (j). For example, if a first PUCCH with CSI or SR is configured to be transmitted in the second slot of FIG. 29, where there is the second repetition of a second PUCCH transmission with HARQ-ACK information starting at symbol S=5, the UE transmits the first PUCCH with the same starting symbol and length as for the second PUCCH transmission.

FIG. 38, illustrates this example, such as where a first PUCCH transmission with CSI is configured in a second slot 3801, and a starting symbol and length of the first PUCCH transmission 3803 are same as for a repetition of a second PUCCH transmission with HARQ-ACK information 3802. Alternatively, HARQ-ACK information and CSI are jointly encoded and multiplexed in the repetition of the second PUCCH transmission. It is also possible that the first PUCCH transmission is dropped.

In certain embodiments, the indication of the number of repetitions can be associated with the UCI type. A gNB can configure a number of repetitions for a first PUCCH carrying a HARQ-ACK report and independently configure another number of repetitions for a second PUCCH carrying a CSI report. A first PUCCH transmission with a HARQ-ACK report can be triggered by a first DCI format that indicates a first PUCCH resource and a first number of repetitions for the first PUCCH transmission. A second PUCCH transmission with a CSI report can be triggered by a second DCI format that indicates a second PUCCH resource and a second number of repetitions for the second PUCCH transmission. The first DCI format can be same or different than the second DCI format. For example, a number of PUCCH repetitions can be indicated together with a PUCCH resource. The PUCCH resource can provide a value for a "nrofRepetitions-HARQ-ACK" parameter, a value for "nrofRepetitions-CSI" parameter and a value for "nrofRepetitions-SR" parameter, for respectively configuring a number of PUCCH repetitions for HARQ-ACK information, CSI, and SR. For example, as shown in Syntax (3), below, a PUCCH resource can be as follows:

```
Syntax                                              (3)
PUCCH-format3 ::=         SEQUENCE {
    nrofPRBs                  INTEGER (1..16),
    nrofSymbols               INTEGER (4..14),
    nrofRepetitions-HARQ-ACK  INTEGER (1, 2, 4, 8),
    nrofRepetitions-CSI       INTEGER (1, 2, 4, 8),
    nrofRepetitions-SR        INTEGER (1, 2, 4, 8),
    startingSymbolIndex       INTEGER(0..10)
}
```

In case a PUCCH is transmitted with a same number of repetitions for each of the UCI types, the PUCCH resource can provide a value for a "nrofRepetitions" parameter, as previously described, without configuring the UE with the parameters of number of repetitions per UCI type fields.

Embodiments of the present disclosure also describe PUCCH transmission power configuration per PUCCH format and per UCI type. The following examples and embodiments describe PUCCH transmission power configuration per PUCCH format and per UCI type.

In certain embodiments, when there are multiple configured values of a parameter $P_{o,PUCCH}$ for determining a power of a PUCCH transmission, for example one $P_{o,PUCCH}$ value is separately configured per PUCCH format and another $P_{o,PUCCH}$ value is separately configured per UCI type, a UE determines a PUCCH transmission power according to the largest value of the two configured values, regardless of whether or not the PUCCH transmission is configured with repetitions.

Embodiments of the present disclosure also describe an indication of a number of repetitions by a field in a downlink control information (DCI) format. The following examples and embodiments, such as those described in FIGS. 39 and 40 describe an indication of a number of repetitions by a field in a DCI format.

Figure 39:
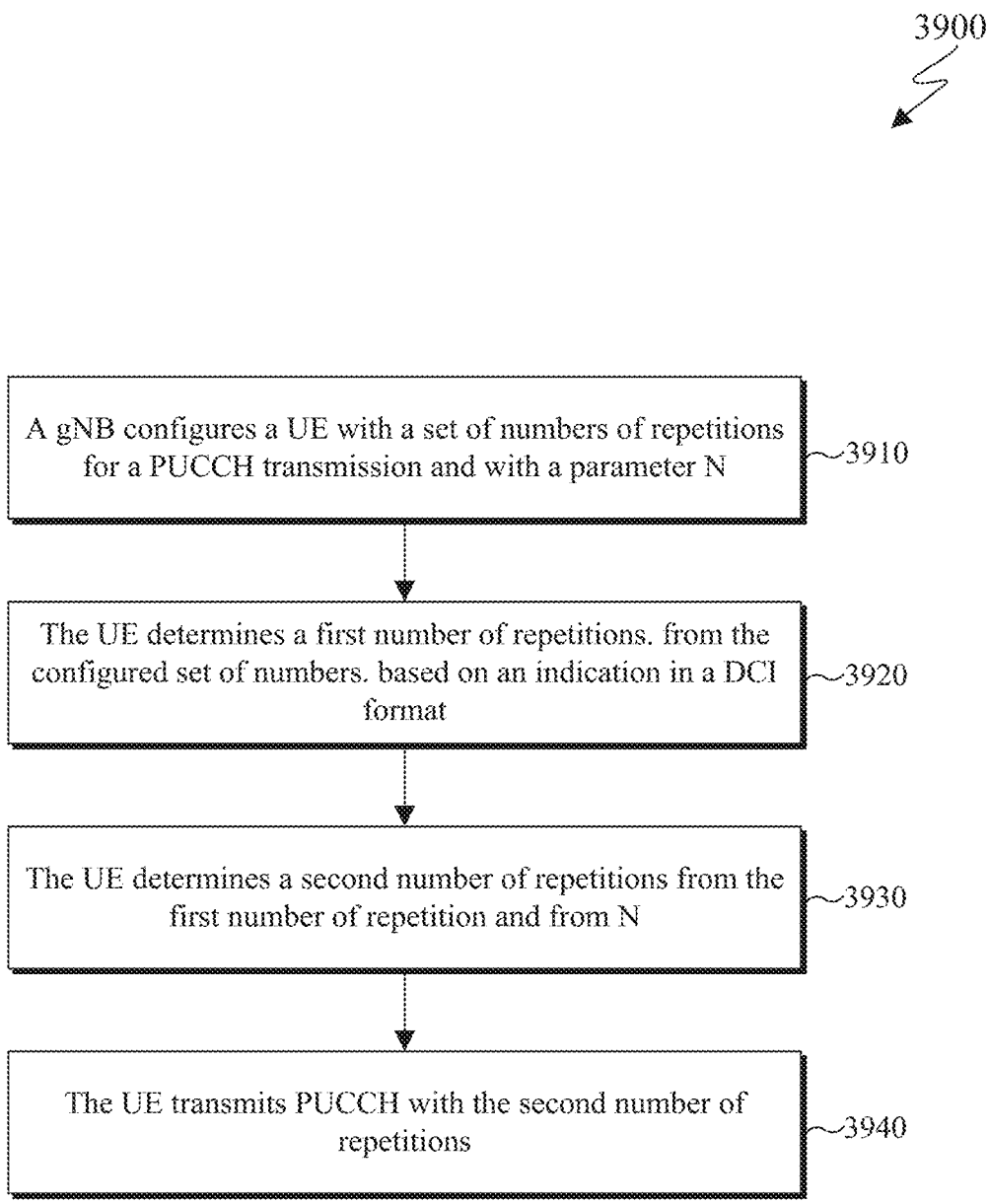
FIG. 39 illustrates an example method for a UE to determine a number of repetitions for a PUCCH transmission depending on a hybrid automatic repeat request acknowledgement (HARQ-ACK) payload size according to embodiments of the present disclosure.
Figure 40:
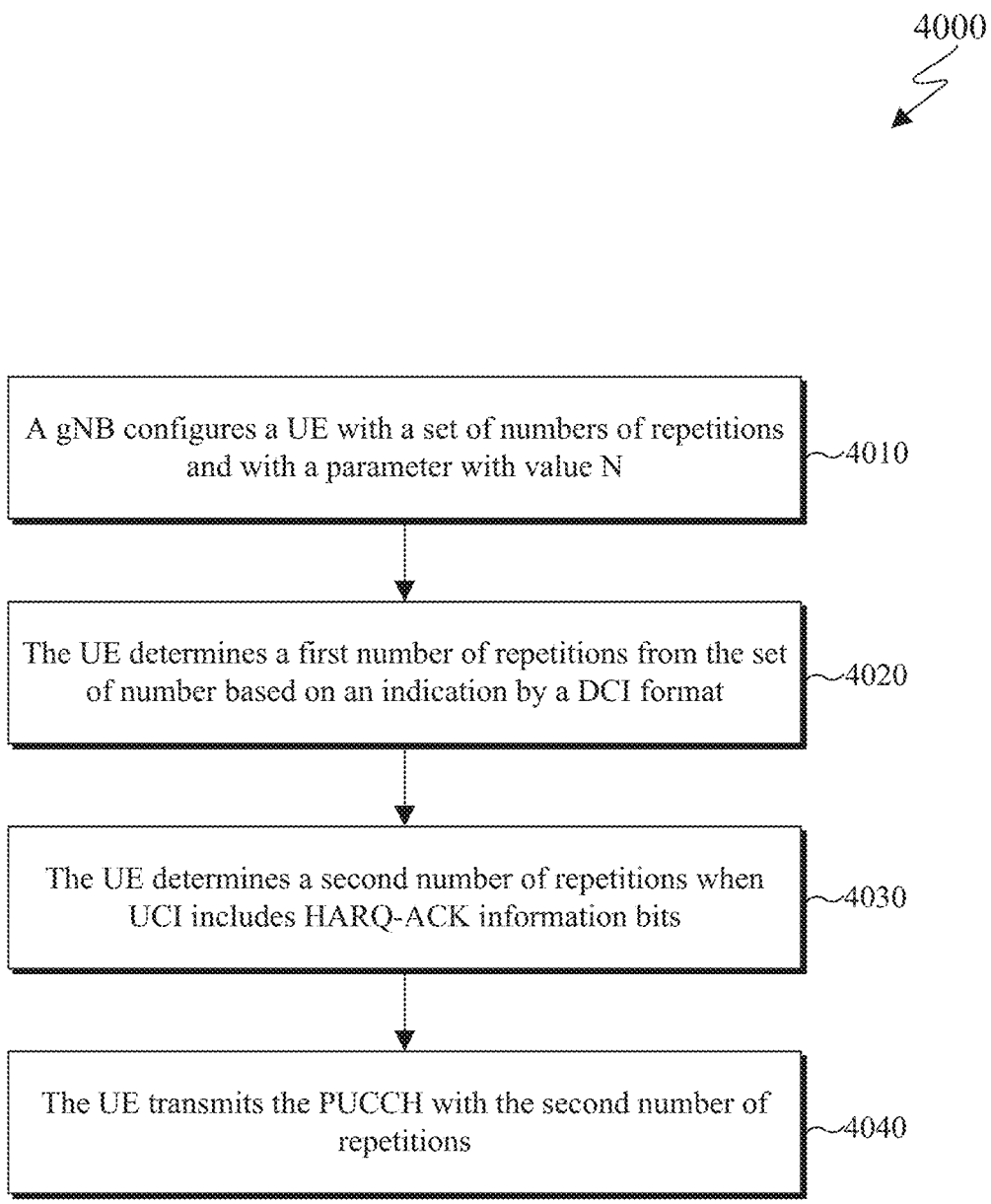
FIG. 40 illustrates an example method for a UE to determine a number of repetitious for a PUCCH transmission depending on an uplink control information (UCI) type according to embodiments of the present disclosure.

FIG. 39 illustrates an example method 3900 for a UE to determine a number of repetitions for a PUCCH transmission depending on a hybrid automatic repeat request acknowledgement (HARQ-ACK) payload size according to embodiments of the present disclosure. FIG. 40 illustrates an example method 4000 for a UE to determine a number of repetitious for a PUCCH transmission depending on an UCI type according to embodiments of the present disclosure.

The steps of the methods 3900 and 4000 can be performed by any of the UEs 111-116 of FIG. 1, such as the UE 116 of FIG. 3. The methods 3900 and 4000 of FIGS. 39 and 40 are for illustration only and other embodiments can be used without departing from the scope of the present disclosure.

In certain embodiments, a DCI format can include a field ("number of PUCCH repetitions") that indicates a number of repetitions for a PUCCH transmission. The "number of PUCCH repetitions" field can directly indicate the number of repetitions for the PUCCH transmission, or the field is used to scale a reference number of repetitions provided by higher layers.

In certain embodiments, a gNB (such as the BS 102) can configure a UE (such as the UE 116) with a set of numbers of repetitions and use a field in a DCI format to indicate to the UE a number of repetitions among the values in a set of values configured by higher layers. For example, a field of 2 bits in a DCI format can be used to indicate a number of repetitions in a configured set of 4 numbers of repetitions. It is also possible to use 3 bits or 4 bits to indicate a number of repetitions from a larger number of configured values.

In certain embodiments, a gNB can configure a UE with two or more sets of numbers of repetitions. The sets of numbers of repetitions can be associated with a UCI payload size of a PUCCH transmission, for example payload size of HARQ-ACK information, or with different sets of numbers of symbols for each repetition for a PUCCH transmission. Such sets of numbers of repetitions can be different or one set can be associated with more than one characteristic of the PUCCH transmission. A gNB can use a same number of DCI bits to indicate a number of repetitions from the configured numbers of repetitions regardless of the association of the sets of numbers of repetitions to a PUCCH format, or to a type of information carried by a PUCCH transmission, or to a payload size of a PUCCH transmission or to a payload size of a type of information in a PUCCH transmission.

In certain embodiments, a DCI format can provide an indication for a number of repetitions for a PUCCH transmission. Thereafter the UE can determine the set of numbers of repetitions for the indication based on a corresponding UCI payload or based on a corresponding number of symbols for each nominal repetition (or simply for each repetition, if PUCCH repetitions Type-B are not supported) of the PUCCH transmission. A reason for configuring multiple sets of repetitions is to reduce a number of bits required in the DCI format to indicate a number of repetitions or to improve a flexibility for indicating a PUCCH resource and also indicating a number of repetitions through the PUCCH resource. For example, a number of repetitions for a PUCCH transmission with a UCI payload of 11 bits can be about ten times larger than a number of repetitions for a PUCCH transmission with a UCI payload of 1 bit. For example, ignoring a difference in a coding gain as a function of the UCI payload, a number of repetitions for a PUCCH transmission with repetitions over 4 symbols can be about three times larger than a number of repetitions for a PUCCH transmission with repetitions over 12 symbols. In general, to account for a variability over all possible UCI payloads for which repetitions of a PUCCH transmission are supported or over all possible numbers of symbols per repetition, a "number of PUCCH repetitions" field in a DCI format indicating a number of repetitions would need to have 5 or 6 or possibly more than 6 bits. Similar, if the indication for a number of repetitions is through an indication of a PUCCH resource, a same PUCCH resource would need to be associated with several different numbers of repetitions, thereby diminishing a capability for a gNB to actually select from different PUCCH resources for a UE to transmit a PUCCH. By configuring different sets of numbers of repetitions for different ranges of UCI payloads or for different number of symbols per repetition, the number of bits in the "number of PUCCH repetitions" field can be reduced.

For example, a first set of 4 repetition values is associated with multiplexing of a HARQ-ACK payload up to X bits in a PUCCH transmission, set_A=(1,2,4,8), and a second set is associated with multiplexing of a HARQ-ACK payload larger than X bits set_B=(4,8,16,32). A UE can be configured with set_A and set_B and an indication by a "number of PUCCH repetitions" field in a DCI format is for a value from either set_A or set_B depending on the HARQ-ACK payload size. A UE can be configured with set_A and set_B as part of a PUCCH resource configuration and an indication by a "number of PUCCH repetitions" field in a DCI format is for a value from either set_A or set_B depending on the HARQ-ACK payload size. It is also possible that a UE is configured with one set of values and with a parameter N. A UE can interpret the field in the DCI format to indicate a number of repetitions equal to the indicated value of the set multiplied by N if the HARQ-ACK payload size is up to X bits or multiplied by M if the HARQ-ACK payload size is larger than X bits. The values N and M can be predetermined or configured, or there can be a fixed relationship between the two values, for example M=2·N, and only one parameter can be predetermined or configured.

As illustrated in FIG. 39, the method 3900 describes a procedure for a UE (such as the UE 116) to determine a number of repetitions for a PUCCH transmission depending on a HARQ-ACK payload size.

In step 3910, a gNB configures a UE with a set of numbers of repetitions for a PUCCH transmission and a parameter N. In step 3920, a UE determines a first number of repetitions among the configured values by an indication provided by a DCI format. In step 3930, the UE determines a second number of repetitions from a first number of repetition and from N. For example, when a number of HARQ-ACK information bits the UE multiplexes in the PUCCH transmission is larger than or equal to a value (where the value can be predetermined or configured to the UE by a serving gNB), the UE determines a second number of repetitions by multiplying a first number of repetitions by N. Alternatively, when a number of HARQ-ACK information bits the UE multiplexes in the PUCCH transmission is less than the value, a second number of repetitions is equal to the first number. In step 3940, the UE transmits the PUCCH with the second number of repetitions.

As illustrated in FIG. 40, the method 4000 describes a procedure for a UE (such as the UE 116) to determine a number of repetition for a PUCCH transmission depending on a UCI type.

In step 4010, a gNB configures a UE with a set of numbers of repetitions and a parameter with value N. in step 4020, the UE determines a first number of repetitions among the configured values by an indication in a DCI format. In step 4030, the UE determines a second number of repetitions from the first number of repetition and from the value N depending on whether or not a UCI comprises HARQ-ACK bits. For example, when the UCI includes HARQ-ACK bits, a second number of repetitions is determined from a first number of repetitions and from N. Alternatively, when the UCI does not include HARQ-ACK bits, a second number of repetitions is equal to a first number of repetitions. In step 4040, the UE transmits PUCCH with the second number of repetitions.

In certain embodiments, aspects of methods 3900 and 4000 of in FIGS. 39 and 40 can be combined. For example, when a UCI comprises HARQ-ACK information bits an in FIG. 40, a UE determines a number of repetitions for the PUCCH transmission based on whether or not the number of HARQ-ACK information bits is larger than or equal to a value X that can be predetermined in the system operation or provided to the UE by higher layers. It is also possible that depending on whether or not the number of HARQ-ACK information bits is smaller than or equal to X, the UE determines a number of repetitions for a PUCCH transmission by scaling an indicated value, from a configured set of values, by a different N value. For example, the UE can use $N_1$ and $N_2$ to scale the indicated number of repetitions when the number of HARQ-ACK information bits is not or is, respectively, larger than X.

Figure 41:
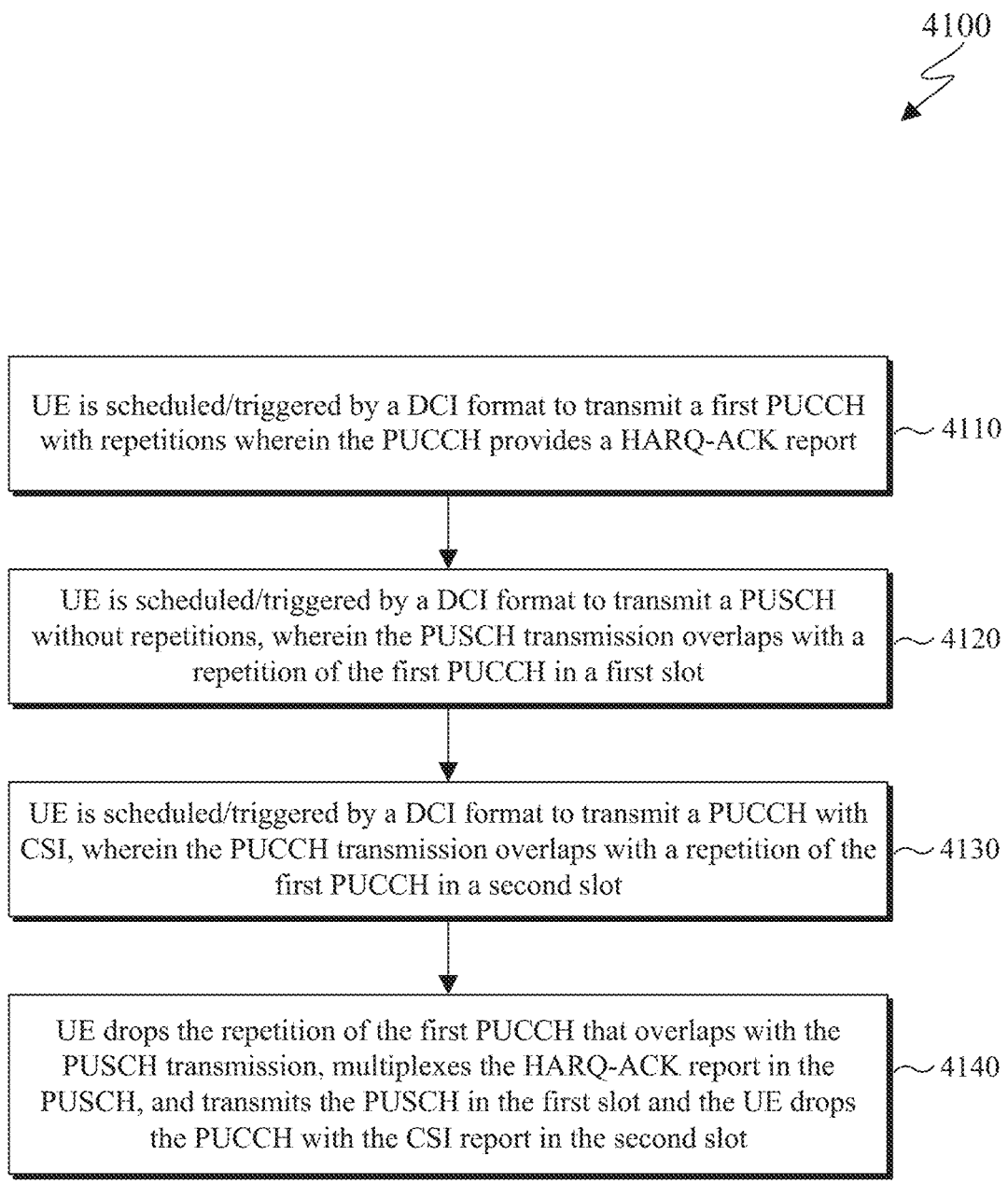
FIG. 41 illustrates an example method for a UE to determine an uplink transmission when PUCCH repetitions that provide a HARQ-ACK report overlap with a PUSCH without repetitions or with a PUCCH transmission that provides a CSI report.

FIG. 41 illustrates an example method 4100 for a UE to determine an uplink transmission when PUCCH repetitions that provide a HARQ-ACK report overlap with a PUSCH without repetitions or with a PUCCH transmission that provides a CSI report according to embodiments of the present disclosure. The steps of the method 4100 can be performed by any of the UEs 111-116 of FIG. 1, such as the UE 116 of FIG. 3. The method 4100 of FIG. 41 are for illustration only and other embodiments can be used without departing from the scope of the present disclosure.

In this illustrative example, a UE determines an uplink transmission when PUCCH repetitions that provide a HARQ-ACK report overlap with a PUSCH without repetitions or with a PUCCH transmission that provides a CSI report. When a repetition of the PUCCH transmission with the HARQ-ACK report overlaps with a PUSCH transmission without repetitions, the UE drops the PUCCH repetition, multiplexes the HARQ-ACK report in the PUSCH, and transmits the PUSCH. When a repetition of the PUCCH transmission with the HARQ-ACK report overlaps with a PUCCH transmission without repetitions with the CSI report, the UE drops the PUCCH transmission with the CSI report. A reason for multiplexing the HARQ-ACK report in the PUSCH is because sufficient resources can be allocated for the HARQ-ACK report in the PUSCH. A reason for not multiplexing a CSI report with the HARQ-ACK report in a PUCCH used for the HARQ-ACK report is because that would reduce a number of resources in the PUCCH that are available for the HARQ-ACK report. When a first PUCCH transmission overlaps with a PUSCH transmission or with a second PUCCH transmission, and as a result a repetition of the first PUCCH transmission is cancelled, PUCCH repetitions of the first PUCCH transmission that are subsequent repetitions of the cancelled PUCCH repetition are not affected by the cancellation.

In step 4110, a UE is scheduled/triggered by a DCI format to transmit a first PUCCH with repetitions wherein the PUCCH provides a HARQ-ACK report. In step 4120, the UE is scheduled by a DCI format to transmit a PUSCH without repetitions, wherein the PUSCH transmission overlaps with a repetition of the first PUCCH in a first slot. In step 4130, the UE is scheduled/triggered by a DCI format to transmit a PUCCH with CSI, wherein the PUCCH transmission overlaps with a repetition of the first PUCCH in a second slot. In step 4140, the UE drops the repetition of the first PUCCH that overlaps with the PUSCH transmission, multiplexes the HARQ-ACK report in the PUSCH, and transmits the PUSCH in the first slot and the UE drops the PUCCH with the CSI report in the second slot.

Although FIGS. 39-41 illustrate the methods 3900-4100, respectively, various changes may be made to FIGS. 39-41. For example, while the methods 3900-4100 are shown as a series of steps, various steps could overlap, occur in parallel, occur in a different order, or occur multiple times. In another example, steps may be omitted or replaced by other steps. For example, steps of the methods 3900-4100 can be executed in a different order.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
first information indicating a configuration for directions of symbols, and
second information indicating whether a repetition of a transmission for a physical uplink control channel (PUCCH) is counted when the repetition is canceled, wherein the PUCCH includes an uplink control information (UCI) payload; and
a processor operably coupled to the transceiver, the processor configured to determine:
that a first repetition of the PUCCH transmission includes a symbol with a downlink direction based on the first information, and
a counter number of repetitions based on the second information,
wherein the transceiver is further configured to cancel the first repetition of the PUCCH transmission
wherein all repetitions of the PUCCH transmission are over a same number of symbols when the UCI payload is larger than a predetermined number of bits, and
wherein a second repetition of the PUCCH transmission is over a different number of symbols than a third repetition of the PUCCH transmission when the UCI payload is not larger than the predetermined number of bits.

2. The UE of claim 1, wherein:
the transceiver is further configured to receive:
third information indicating first and second sets of numbers of repetitions, wherein:
the first set is associated with a first range of UCI payloads, and
the second set is associated with a second range of UCI payloads; and
fourth information providing an indication for a number of repetitions; and
the processor is further configured to determine the number of repetitions from the first set or the second set based on the indication and the UCI payload.

3. The UE of claim 1, wherein:
the transceiver is further configured to receive:
third information indicating first and second sets of numbers of repetitions, wherein:
the first set is for PUCCH transmissions with hybrid automatic repeat request acknowledgement (HARQ-ACK) information, and
the second set is for PUCCH transmissions with channel state information (CSI), and
a downlink control information (DCI) format, wherein the DCI format:
triggers the PUCCH transmission, and
provides an indication for a number of repetitions; and
the processor is further configured to determine, based on the indication:
a number of repetitions from the first set when the PUCCH transmission includes HARQ-ACK information, and
a number of repetitions from the second set of when the PUCCH transmission includes CSI.

4. The UE of claim 1, wherein:
the transceiver is further configured to receive third information indicating:
a first number of repetitions when the first number of repetitions are with a first PUCCH format and over a first number of consecutive symbols, and
a second number of repetitions when the second number of repetitions are with a second PUCCH format and over a second number of consecutive symbols.

5. The UE of claim 1, wherein:
the transceiver is further configured to receive third information for a first number of symbols per repetition;
the processor is further configured to determine, for a second repetition, a maximum number of consecutive symbols that:

does not include a symbol with a downlink direction,
is equal to or smaller than the first number of symbols, and
is equal to or larger than a predetermined number of symbols; and the transceiver is further configured to transmit the second repetition over the maximum number of consecutive symbols.

6. The UE of claim 1, wherein the predetermined number of bits is 12.

7. The UE of claim 1, wherein:
the UCI payload includes hybrid automatic repeat request acknowledgement (HARQ-ACK) information,
a repetition of the PUCCH transmission would overlap in time with a second transmission, and
the processor is further configured to determine to:
cancel the repetition and multiplex the HARQ-ACK information in the second transmission when the second transmission is for a physical uplink shared channel (PUSCH), and
cancel the second transmission when the second transmission is for a PUCCH with channel state information (CSI).

8. A base station (BS) comprising:
a transceiver configured to transmit:
first information indicating a configuration for directions of symbols, and
second information indicating whether a repetition of a transmission for a physical uplink control channel (PUCCH) is counted when the repetition is canceled, wherein the PUCCH includes an uplink control information (UCI) payload; and
a processor operably coupled to the transceiver, the processor configured to determine:
that a first repetition of the PUCCH transmission includes a symbol with a downlink direction based on the first information, and
a counter number of repetitions based on the second information,
wherein the transceiver is further configured to cancel a reception for the first repetition of the PUCCH transmission
wherein all repetitions of the PUCCH transmission are over a same number of symbols when the UCI payload is larger than a predetermined number of bits, and
wherein a second repetition of the PUCCH transmission is over a different number of symbols than a third repetition of the PUCCH transmission when the UCI payload is not larger than the predetermined number of bits.

9. The BS of claim 8, wherein:
the transceiver is further configured to transmit:
third information indicating first and second sets of numbers of repetitions, wherein:
the first set is associated with a first range of UCI payloads, and
the second set is associated with a second range of UCI payloads; and
fourth information providing an indication for a number of repetitions; and
the number of repetitions is from the first set or from the second set based on the indication and the UCI payload.

10. The BS of claim 8, wherein:
the transceiver is further configured to transmit:
third information indicating first and second sets of numbers of repetitions, wherein:

the first set is for PUCCH transmissions with hybrid automatic repeat request acknowledgement (HARQ-ACK) information, and
the second set is for PUCCH transmissions with channel state information (CSI), and
a downlink control information (DCI) format, wherein the DCI format:
triggers the PUCCH transmission, and
provides an indication for a number of repetitions;
the number of repetitions are from the first set when the PUCCH transmission includes HARQ-ACK information; and
the number of repetitions are from the second set of when the PUCCH transmission includes CSI.

11. The BS of claim 8, wherein:
the transceiver is further configured to transmit third information indicating:
a first number of repetitions when the first number of repetitions are with a first PUCCH format and over a first number of consecutive symbols, and
a second number of repetitions when the second number of repetitions are with a second PUCCH format and over a second number of consecutive symbols.

12. The BS of claim 8, wherein:
the transceiver is further configured to transmit third information for a first number of symbols per repetition;
the processor is further configured to determine, for a second repetition, a maximum number of consecutive symbols that:
does not include a symbol with a downlink direction,
is equal to or smaller than the first number of symbols, and
is equal to or larger than a predetermined number of symbols; and
the transceiver is further configured to receive the second repetition over the maximum number of consecutive symbols.

13. The BS of claim 8, wherein the predetermined number of bits is 12.

14. A method comprising:
receiving first information indicating a configuration for directions of symbols;
receiving second information indicating whether a repetition of a transmission for a physical uplink control channel (PUCCH) is counted when the repetition is canceled, wherein the PUCCH includes an uplink control information (UCI) payload;
determining that a first repetition of the PUCCH transmission includes a symbol with downlink direction based on the first information;
determining a counter number of repetitions based on the second information; and
canceling the first repetition of the PUCCH transmission,
wherein all repetitions of the PUCCH transmission are over a same number of symbols when the UCI payload is larger than a predetermined number of bits, and
wherein a second repetition of the PUCCH transmission is over a different number of symbols than a third repetition of the PUCCH transmission when the UCI payload is not larger than the predetermined number of bits.

15. The method of claim 14, further comprising:
receiving third information indicating first and second sets of numbers of repetitions, wherein:
the first set is associated with a first range of UCI payloads, and the second set is associated with a second range of UCI payloads;

receiving fourth information providing an indication for a number of repetitions; and determining the number of repetitions from the first set or the second set based on the indication and the UCI payload.

16. The method of claim 14, further comprising:

receiving third information indicating first and second sets of numbers of repetitions, wherein:
- the first set is for PUCCH transmissions with hybrid automatic repeat request acknowledgement (HARQ-ACK) information, and
- the second set is for PUCCH transmissions with channel state information (CSI);

receiving a downlink control information (DCI) format, wherein the DCI format:
- triggers the PUCCH transmission, and
- provides an indication for a number of repetitions; and determining, based on the indication:
- a number of repetitions from the first set when the PUCCH transmission includes HARQ-ACK information, and
- a number of repetitions from the second set of when the PUCCH transmission includes CSI.

17. The method of claim 14, further comprising receiving third information indicating:
- a first number of repetitions when the first number of repetitions are with a first PUCCH format and over a first number of consecutive symbols, and
- a second number of repetitions when the second number of repetitions are with a second PUCCH format and over a second number of consecutive symbols.

18. The method of claim 14, further comprising:

receiving third information indicating a first number of symbols per repetition;

determining, for a second repetition, a maximum number of consecutive symbols that:
- does not include a symbol with a downlink direction,
- is equal to or smaller than the first number of symbols, and
- is equal to or larger than a predetermined number of symbols; and transmitting the second repetition over the maximum number of consecutive symbols.

19. The method of claim 14, wherein the predetermined number of bits is 12.

20. The method of claim 14, wherein:
- the UCI payload includes hybrid automatic repeat request acknowledgement (HARQ-ACK) information,
- a repetition of the PUCCH transmission would overlap in time with a second transmission, and the method further comprises:
- canceling the repetition and multiplexing the HARQ-ACK information in the second transmission when the second transmission is for a physical uplink shared channel (PUSCH), and
- canceling the second transmission when the second transmission is for a PUCCH with channel state information (CSI).

* * * * *